United States Patent
Wu et al.

(10) Patent No.: US 10,591,617 B2
(45) Date of Patent: Mar. 17, 2020

(54) PEROVSKITE-TYPE HALIDES AND METHODS THEREOF

(71) Applicant: University of Tennessee Research Foundation, Knoxville, TN (US)

(72) Inventors: Yuntao Wu, Knoxville, TN (US); Mariya Zhuravleva, Knoxville, TN (US); Luis Stand, Knoxville, TN (US); Charles L. Melcher, Oak Ridge, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 154 days.

(21) Appl. No.: 15/970,581

(22) Filed: May 3, 2018

(65) Prior Publication Data

US 2018/0321393 A1 Nov. 8, 2018

Related U.S. Application Data

(60) Provisional application No. 62/500,671, filed on May 3, 2017.

(51) Int. Cl.
*G01T 1/20* (2006.01)
*G01T 1/202* (2006.01)
(Continued)

(52) U.S. Cl.
CPC ........ *G01T 1/2023* (2013.01); *C01F 17/0031* (2013.01); *C01G 25/006* (2013.01);
(Continued)

(58) Field of Classification Search
CPC ..... G01T 1/2023; G01T 1/208; G01T 1/2018; G01T 1/201; C01F 17/0031;
(Continued)

(56) References Cited

U.S. PATENT DOCUMENTS 5,874,056 A * 2/1999 Bludssus ................ C01G 41/00
423/594.13
9,624,429 B2 4/2017 Stand et al.
(Continued)

OTHER PUBLICATIONS

Alekhin et al., "Improvement of (-ray energy resolution of LaBr3:Ce3+ scintillation detectors by Sr2+ and Ca2+ co-doping," Appl. Phys. Lett., 102, 161915 (2013) (4 pages).
(Continued)

*Primary Examiner* — Kiho Kim
(74) *Attorney, Agent, or Firm* — Jenkins, Wilson, Taylor & Hunt, P.A.

(57) ABSTRACT

Metal halide optical materials (e.g., scintillator materials or persistent phosphors) are described. More particularly, the optical materials include codoped perovskite-type halides, wherein the codoping ion is present at a molar ratio of 5000 parts per million (ppm) or less with respect to all cations. For example, the optical material can be a codoped trihalide having the formula $ABX_3$ where A is one or more alkali metal, B is one or more alkali earth metal, and X is one or more halide that is doped with up to about 10 atomic percent of a dopant ion and codoped with up to about 5000 ppm of one or more isovalent or aliovalent codopant ion, such as a tetravalent ion (e.g., $Zr^{4+}$), a trivalent ion (e.g., $Sc^{3+}$, $Y^{3+}$, $Gd^{3+}$, or $La^{3+}$ ion) or a divalent ion (e.g., $Mg^{2+}$). The codoped material can have modified afterglow compared to a noncodoped material.

30 Claims, 28 Drawing Sheets

(51) Int. Cl.
C01G 25/00 (2006.01)
C01F 17/00 (2020.01)
G01T 1/208 (2006.01)
C09K 11/06 (2006.01)

(52) U.S. Cl.
CPC .............. C09K 11/06 (2013.01); G01T 1/201 (2013.01); G01T 1/208 (2013.01); G01T 1/2018 (2013.01); C01F 17/0012 (2013.01); C01P 2002/34 (2013.01); C01P 2002/52 (2013.01); C01P 2002/84 (2013.01)

(58) Field of Classification Search
CPC .............. C01F 17/0012; C01G 25/006; C01P 2002/84; C01P 2002/52; C01P 2002/34; C09K 11/06
See application file for complete search history.

(56) References Cited

U.S. PATENT DOCUMENTS

| 9,695,356 | B1 | 7/2017 | Stand et al. | |
| 9,896,462 | B1* | 2/2018 | Ma | C09K 11/06 |
| 2014/0183140 | A1* | 7/2014 | Atkins | C02F 5/12 210/701 |
| 2015/0353822 | A1 | 12/2015 | Tyagi et al. | |
| 2016/0124094 | A1 | 5/2016 | Melcher et al. | |
| 2016/0289554 | A1* | 10/2016 | Dohner | C09K 11/08 |
| 2016/0293858 | A1* | 10/2016 | Brandt | H01L 31/032 |
| 2017/0160405 | A1* | 6/2017 | Kim | G01T 1/2018 |
| 2017/0276836 | A1* | 9/2017 | Soci | C09K 11/664 |
| 2017/0355905 | A1* | 12/2017 | Bourret-Courchesne | G01T 1/2023 |
| 2018/0066383 | A1* | 3/2018 | Bakr | C30B 7/00 |
| 2018/0105745 | A1 | 4/2018 | Stand et al. | |
| 2018/0155624 | A1 | 6/2018 | Wu et al. | |
| 2018/0204682 | A1* | 7/2018 | Vela-Becerra | H01L 51/422 |

OTHER PUBLICATIONS

Anisimov et al., "First principles calculations of the electronic structure and spectra of strongly correlated systems: the LDA+U method," J. Phys. Condens. Matter., 9, 767-808 (1997).
Bizzari et al., "Scintillation and optical properties of BaBrI:Eu2+ and CsBa2I5:Eu2+," IEEE Trans. Nucl. Sci., 58, 3403-3410 (2011).
Brecher et al., "Suppression of afterglow in CsI:Tl by codoping with Eu2+—I: Experimental," Nucl. Instrum. Methods Phys. Res., Sect. A, 558, 450-457 (2006).
Cooke et al., "Thermally stimulated luminescence from x-irradiated porous silicon," Appl. Phys. Lett., 70, 3594 (1997).
Feng et al., "Annealing effects on Czochralski grown Lu2Si2O7:Ce3+ crystals under different atmospheres," J. Appl. Phys., 103 083109 (2008).
Feng and Biswas, "Ramifications of codoping SrI2:Eu with isovalent and aliovalent impurities," J. Appl. Phys., 120, 213104 (2016) (9 pages).
Kamada et al., "Alkali earth co-doping effects on luminescence and scintillation properties of Ce doped Gd3Ga3Al2O12:Ce," Opt. Mater., 41, 63-66 (2015).
Li et al., "Host structure dependence of light yield and proportionality in scintillators in terms of hot and thermalized carrier transport," Phys. Status Solidi RRL, 8, 346-348 (2012).
Li et al., Phys. Status Solidi (b), 250, 233-243 (2013).
Lindsey et al., "Crystal growth and characterization of europium doped KCaI3, a high light yield scintillator," Opt. Mater., 48, 1-6 (2015).
Liu et al., "Towards bright and fast Lu3Al5O12:Ce,Mg optical ceramics scintillators," Adv. Opt. Mater., 4, 731-739 (2016).
Moszynski et al., IEEE Trans. Nucl. Sci., 44, 1052 (1997).
Nagarkar et al., "Scintillation properties of CsI:Tl crystals codoped with Sm2+," IEEE Trans. Nucl., Sci., 55, 1270-1274 (2008).

Nikl et al., "Defect engineering in Ce-doped aluminum garnet single crystal scintillator," Cryst. Growth Des., 14, 4827-4833 (2014).
Nikl and Yoshikawa, Adv. Opt. Mater., 2, 464 (2015).
Quarati et al., Nucl. Instr. Meth. Phys. Res. A, 735, 655 (2014).
Spurrier et al., "Effects of Ca2+ co-doping on the scintillation properties of LSO:Ce," IEEE Trans. Nucl. Sci. 55, 1178-1182 (2008).
Stand et al., "Growth and characterization of potassium strontium iodide: a new high light yield scintillator with 2.4% energy resolution," Nucl. Instr. Meth. Phys. Res. A, 780, 40-44 (2015).
Wu et al., "Ultralow-concentration Sm codoping in CsI:Tl scintillators: A case of little things can make a big difference," Opt. Mater., 38, 297-300 (2014).
Wu et al., "Growth of inch-sized KCa0.8Sr0.2I3:Eu2+ scintillating crystals and high performance for gamma-ray detection," CrystEngComm., 18, 7435-7440 (2016).
Wu et al., "Large-size KCa0.8Sr0.2I3:Eu2+ crystals: growth and characterization of scintillation properties," Cryst. Growth Des., 16, 4129-4135 (2016).
Wu et al., "Toward high energy resolution in stoichiometry and Eu2+ concentration," Cryst. Growth Des., 16, 7186-7193 (2016).
Wu et al., Phys. Chem. Chem. Phys., 18, 8453-8461 (2016).
Wu et al., "Tailoring the properties of europium doped potassium calcium iodide scintillators through defect engineering" Phys. Status Solid (RRL), 12(2), 1700403 (Dec. 15, 2017).
Yang et al., "Crystal growth and characterization of CsSr1-xEuxI3 high light yield scintillators," Phys. Status Solidi (RRL), 5, 43-45 (2011).
Yang et al., "Scintillation kinetics and thermoluminescence of SrI2:Eu2+ single crystals," J. Lumin., 132, 1824-1829 (2016).
Yang and Menge, J. Appl. Phys., 118, 213106 (2015).
Aberg et al., "Origin of resolution enhancement by co-doping of scintillators: Insight from electronic structure calculations," Appl. Phys. Lett. 104, 211908 (2014) (4 pages).
Bourret-Courchesne et al., "Eu2+-doped Ba2CsI5, a new high-performance scintillator," Nucl. Instr. Meth. Phys. Res. A, 612, 138-142 (2009).
Cherepy et al., "Strontium and barium iodide high light yield scintillators," Appl. Phys. Lett., 92, 083508 (2008) (3 pages).
Dorenbos, "Fundamental limitations in the performance of Ce3+-, Pr3+-, and Eu2+- activated scintillators," IEEE Trans. Nucl. Sci, 57, 1162-1167 (2010).
Dudarev et al., "Electron-energy-loss spectra and the structural stability of nickel oxide: An LSDA1U study, " Phys. Rev. B, 57, 1505-1509 (1998).
Erhart et al., "Extrinsic point defects in aluminum antimonide," Phys. Rev. B, 81, 195216 (2010) (12 pages).
Erhart et al., "First-principles study of codoping in lanthanum bromide," Phys. Rev. B, 91, 165206 (2015) (12 pages).
Giannozzi et al., "Quantum Expresso: a modular and open-source software project for quantum simulations of materials," J. Phys. Condens. Matter, 21, 395502 (2009) (19 pages).
Melcher et al., "Scintillator design via codoping," JPS Conf. Proc., 11, 020001 (2016) (8 pages).
Meng et al., "Relationship between Ca2+ concentration and the properties of codoped Gd3Ga3Al2O2:Ce scintillators," Nucl. Instrum. Methods Phys. Res., Sect. A, 797, 138-143 (2015).
Monkhorst and Pack, "Special points for Brillouin-zone integrations," Phys. Rev. B, 13, 5188-5192 (1976).
Perdew et al., "Generalized gradient approximation made simple," Phys. Rev. Lett., 77, 3865-3868 (1996).
Sasioglu et al., "Effective Coulomb interaction in transition metals from constrained random-phase approximation," Phys. Rev. B, 83, 121101 (2011) (6 pages).
Sidletskiy et al., "Crystal composition and afterglow in mixed silicates: the role of melting temperature," Phys. Rev. Applied, 4, 024009 (2015) (36 pages).
Van Loef et al., "High-energy-resolution scintillator: Ce3+ activated LaBr3," Appl. Phys. Lett., 79, 1573-1575 (2001).
Wu et al., Role of Ce4+ in the scintillation mechanism of codoped Gd3Ga3Al2O12:Ce, Phys. Rev. Appl., 2, 044009 (2014) (13 pages).
Wu et al., "CsI:Tl+,Yb2+: ultra-high light yield scintillator with reduced afterglow," CrystEngComm, 16, 3312-3317 (2014).

(56) References Cited

OTHER PUBLICATIONS

Wu et al., "Defect engineering in SrI2:Eu2+ single crystal scintillators," Cryst. Growth Des., 15(8), 3929-3938 (2015).
Wu et al., "Quaternary iodide K(Ca,Sr)I3:Eu2+ single-crystal scintillators for radiation detection: crystal structure, electronic structure, and optical and scintillation properties," Adv. Optical Mater., 4(10), 1420-1420 (2016) (16 pages).
Wu et al., "Defect Engineering by Codoping in KCaI3:Eu2+ Single-Crystalline Scintillators," Phys. Rev. Appl., 8, 034011 (Sep. 15, 2017) (15 pages).

* cited by examiner

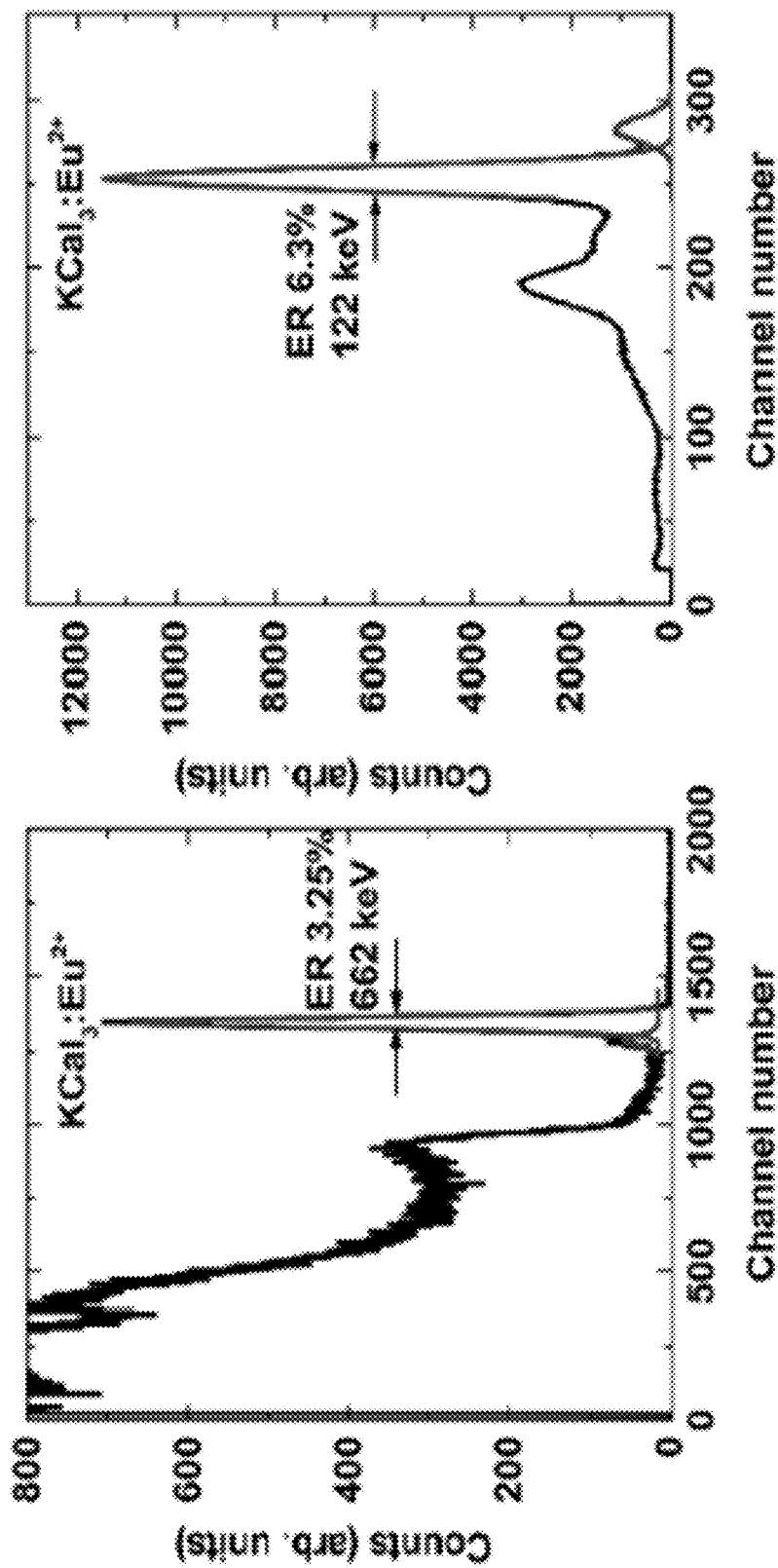

PEROVSKITE-TYPE HALIDES AND METHODS THEREOF

RELATED APPLICATIONS

The presently disclosed subject matter is based on and claims the benefit of U.S. Provisional Patent Application Ser. No. 62/500,671, filed May 3, 2017; the disclosure of which is incorporated herein by reference in its entirety.

GOVERNMENT INTEREST

This invention was made with government support from under Grant No. 2012-DN-077-ARI067 awarded by the U.S. Department of Homeland Security. The government has certain rights in the invention.

TECHNICAL FIELD

The presently disclosed subject matter relates to codoped perovskite-type halides, their optical (e.g., scintillation and phosphorescence properties), and their use as persistent phosphors or as scintillation materials in radiation detectors and/or in methods of detecting X-rays, gamma rays and/or neutrons. In particular, the presently disclosed subject matter relates to perovskite-type halides having the formula $ABX_3$, wherein A is alkali metal, B is alkali earth metal, and X is halide, and that are doped with a dopant, such as Eu, or another activator, and codoped with at least one type of mono-, di-, tri- or tetravalent ion.

ABBREVIATIONS

%=percentage
° C.=degrees Celsius
µs=microseconds
at =atomic
Ba=barium
Be=beryllium
Br=bromide
Ca=calcium
CBM=conduction band minimum
Ce=cerium
Cl=chloride
Cs=cesium
cm=centimeter
CT=computed tomography
Eu=europium
F=fluoride
g=grams
Gd=gadolinium
I=iodide
In=indium
K=potassium
keV=kiloelectron volts
La=lanthanum
Li=lithium
LO=light output
MeV=megaelectronvolt
Mg=magnesium
mol=mole
Na=sodium
nm=nanometer
ns=nanoseconds
PET=positron emission tomography
ph=photons
PL=photoluminescence
PMT=photomultiplier tube
Pr=praseodymium
Rb=rubidium
RL=radioluminescence
RT=room temperature
Sc=scandium
SPECT=single photon emission computed tomography
Sr=strontium
Tb=terbium
Tl=thallium
TL=thermoluminescence
VBM=valence bond maximum
Y=yttrium
Zr=zirconium

BACKGROUND

Optical materials include phosphors and scintillators, which can emit light pulses in response to impinging radiation, such as X-rays, gamma rays, and neutrons. Inorganic scintillators are widely used in radiation detectors that have a wide range of applications in medical imaging, particle physics, geological exploration, homeland security, and other related areas due to their high density and high atomic number compared to gas detectors and organic scintillators. These various applications use scintillators that have suitable luminescent properties when used in different areas. Considerations in selecting scintillator and other optical materials typically include, but are not limited to, luminosity, decay time, and emission wavelength.

As an example, X-ray based computed tomography (CT) ideally uses scintillators that have a fast response time. On the other hand, the growing deployment of nuclear detection systems for the detection of illicit trafficking of nuclear materials ideally uses materials with good radioisotope identification ability. The ever-changing detection technology triggers an increased demand for scintillators with enhanced energy resolution and light yield performance. See Knoll, Radiation Detection and Measurements, Wiley, 2010; and Nikl and Yoshikawa, Adv. Opt. Mater., 3, 464 (2015).

Accordingly, while a variety of optical materials have been made, there is a continuing need for additional optical materials, such as additional scintillator or phosphor materials, e.g., to meet one or more particular needs of different applications.

SUMMARY

In some embodiments, the presently disclosed subject matter provides an optical material comprising a composition of Formula (I):

$$[(A_{1-x}M_x)(B_{1-y}M'_y)]_{1-z}D_zX_3 \qquad (I),$$

wherein: $0 \le x \le 0.1$ and $0 \le y \le 0.1$, subject to the proviso that at least one of x and y is at least 0.0001; $0.0001 \le z \le 0.1$; A is Li, Na, K, Rb, Cs, or any combination thereof; B is Be, Mg, Ca, Sr, Ba, or any combination thereof; M is In, Tl, or a combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I, or any combination thereof.

In some embodiments, $0.0001 \le z \le 0.005$. In some embodiments, D is a trivalent cation or mixture thereof. In some embodiments, D is selected from the group comprising Mg, Sc, Y, Gd, La, Zr, and combinations thereof.

In some embodiments, the optical material comprises a composition of Formula (II):

$$(AB_{1-y}M'_y)_{1-z}D_zX_3 \quad (II),$$

wherein: $0.0001 \le y \le 0.1$; $0.0001 \le z \le 0.1$; A is Li, Na, K, Rb, Cs, or any combination thereof; B is Be, Mg, Ca, Sr, Ba, or any combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I or any combination thereof. In some embodiments, $0.01 \le y \le 0.05$. In some embodiments, $0.001 \le z \le 0.005$.

In some embodiments, A is K. In some embodiments, B is Ca, Sr, or a combination thereof. In some embodiments, M' is Eu. In some embodiments, y is 0.03.

In some embodiments, D is a trivalent cation or a combination thereof. In some embodiments, D is Mg, Sc, Y, Gd, La, Zr, or a combination thereof. In some embodiments, D is Sc. In some embodiments, D is Mg or Zr. In some embodiments, X is I.

In some embodiments, the optical material comprises a composition of Formula (III):

$$(KCa_{1-y}Eu_y)_{1-z}D_zX_3 \quad (III),$$

wherein: $0.01 \le y \le 0.1$; $0.0001 \le z \le 0.005$; D is Mg, Zr, one or more trivalent cations, or a combination thereof; and X is Cl, Br, I or any combination thereof.

In some embodiments, y is 0.03. In some embodiments, $0.001 \le z \le 0.005$. In some embodiments, X is I. In some embodiments, D is Mg, Sc, Y, Gd, La, Zr, or any combination thereof. In some embodiments, D is Sc, Zr, or Mg.

In some embodiments, the optical material has reduced afterglow compared to a scintillator material where D is absent. In some embodiments, the optical material has increased afterglow compared to a scintillator material where D is absent. In some embodiments, the optical material is a single crystal material.

In some embodiments, the presently disclosed subject matter provides a radiation detector comprising a photon detector and an optical material comprising a composition of Formula (I):

$$[(A_{1-x}M_x)(B_{1-y}M'_y)]_{1-z}D_zX_3 \quad (I),$$

wherein: $0 \le x \le 0.1$ and $0 \le y \le 0.1$, subject to the proviso that at least one of x and y is at least 0.0001; $0.0001 \le z \le 0.1$; A is Li, Na, K, Rb, Cs, or any combination thereof; B is Be, Mg, Ca, Sr, Ba, or any combination thereof; M is In, Tl, or a combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I, or any combination thereof. In some embodiments, the detector is a medical diagnostic device, a device for oil exploration, or a device for container or baggage scanning.

In some embodiments, the presently disclosed subject matter provides a method of detecting gamma rays, X-rays, cosmic rays and/or particles having an energy of 1 keV or greater, the method comprising using a radiation detector comprising a photon detector and an optical material comprising a composition of Formula (I):

$$[(A_{1-x}M_x)(B_{1-y}M'_y)]_{1-z}D_zX_3 \quad (I),$$

wherein: $0 \le x \le 0.1$ and $0 \le y \le 0.1$, subject to the proviso that at least one of x and y is at least 0.0001; $0.0001 \le z \le 0.1$; A is Li, Na, K, Rb, Cs, or any combination thereof; B is Be, Mg, Ca, Sr, Ba, or any combination thereof; M is In, Tl, or a combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I, or any combination thereof.

In some embodiments, the presently disclosed subject matter provides a method of preparing an optical material comprising a composition of Formula (I):

$$[(A_{1-x}M_x)(B_{1-y}M'_y)]_{1-z}D_zX_3 \quad (I),$$

wherein: $0 \le x \le 0.1$ and $0 \le y \le 0.1$, subject to the proviso that at least one of x and y is at least 0.0001; $0.0001 \le z \le 0.1$; A is Li, Na, K, Rb, Cs, or any combination thereof; B is Be, Mg, Ca, Sr, Ba, or any combination thereof; M is In, Tl, or a combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I, or any combination thereof; wherein the method comprises heating a mixture of raw materials above their respective melting temperatures.

In some embodiments, the method comprises: (a) providing a mixture of raw materials, wherein the raw materials are provided in a stoichiometric ratio according to the Formula (I):

$$[(A_{1-x}M_x)(B_{1-y}M'_y)]_{1-z}D_zX_3 \quad (I),$$

wherein: $0 \le x \le 0.1$ and $0 \le y \le 0.1$, subject to the proviso that at least one of x and y is at least 0.0001; $0.0001 \le z \le 0.1$; A is Li, Na, K, Rb, Cs, or any combination thereof; B is Be, Mg, Ca, Sr, Ba, or any combination thereof; M is In, Tl, or a combination thereof; M' is Ce, Pr, Nd, Sm, Eu, Gd, Tb, Yb, Bi, Sb, or any combination thereof; D is at least one type of monovalent, divalent, trivalent, or tetravalent cation; and X is F, Cl, Br, I, or any combination thereof; (b) sealing the mixture in a sealed container; (c) heating the mixture to about 20° C. above the melting point of the raw material having the highest melting point for a period of time; (d) cooling the mixture to about room temperature; and (e) optionally repeating steps (c) and (d).

Accordingly, it is an object of the presently disclosed subject matter to provide codoped metal halide optical materials; radiation detectors comprising the codoped metal halide optical materials; methods of detecting gamma rays, X-rays, cosmic rays and/or particles having an energy of 1 keV or greater with the radiation detectors; and methods of preparing the optical materials.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

FIG. 4A is a graph showing the pulse height spectra of noncodoped europium doped potassium calcium triiodide ($KCaI_3$:$Eu^{2+}$) single crystals under irradiation from a cesium 137 source ($^{137}Cs$). Counts are provided in arbitrary units (arb. units). The energy resolution (ER) at 662 kiloelectronvolts (keV) is 3.25%.

FIG. 4B is a graph showing the pulse height spectra of noncodoped europium doped potassium calcium triiodide ($KCaI_3$:$Eu^{2+}$) single crystals under irradiation from a cobalt 57 source ($^{57}Co$). Counts are provided in arbitrary units (arb. units). The energy resolution (ER) at 122 kiloelectronvolts (keV) is 6.3%.

DETAILED DESCRIPTION

Figure 1B:
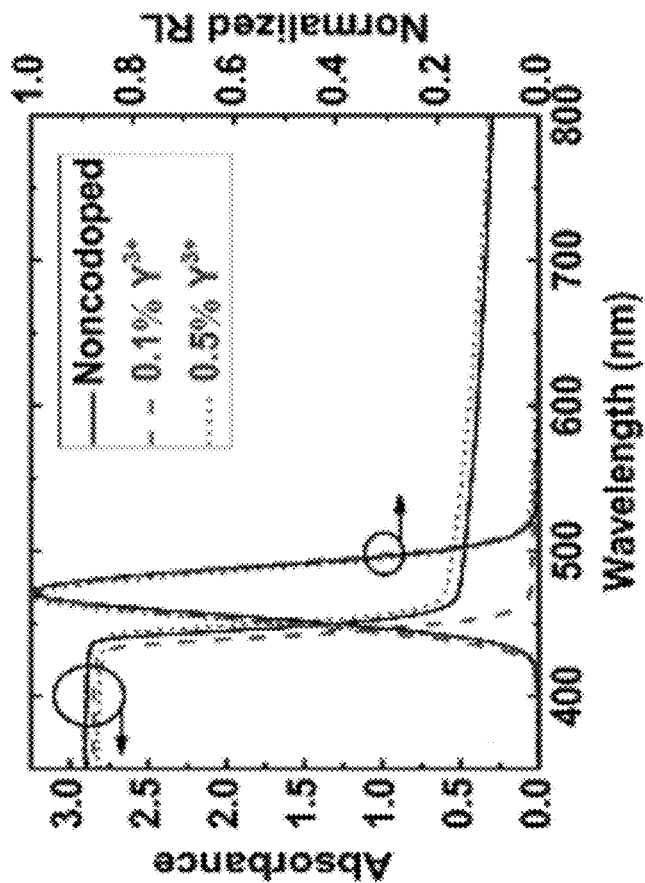
FIG. 1B is a graph showing the optical absorption (data circled with circle next to arrow pointing left) and radioluminescence (RL) (data circled with circle next to arrow pointing right) spectra of 2 millimeter (mm) thick potassium calcium triiodide (KCaI$_3$) single crystals doped with europium ions ($Eu^{2+}$) and codoped with 0.1 mole percent (%) yttrium ions (0.1% $Y^{3+}$, dashed lines) or 0.5 mole % yttrium ions (0.5% $Y^{3+}$, dotted lines). The absorption and RL spectra of noncodoped $KCaI_3$:$Eu^{2+}$ is shown for comparison (solid lines).
Figure 1A:
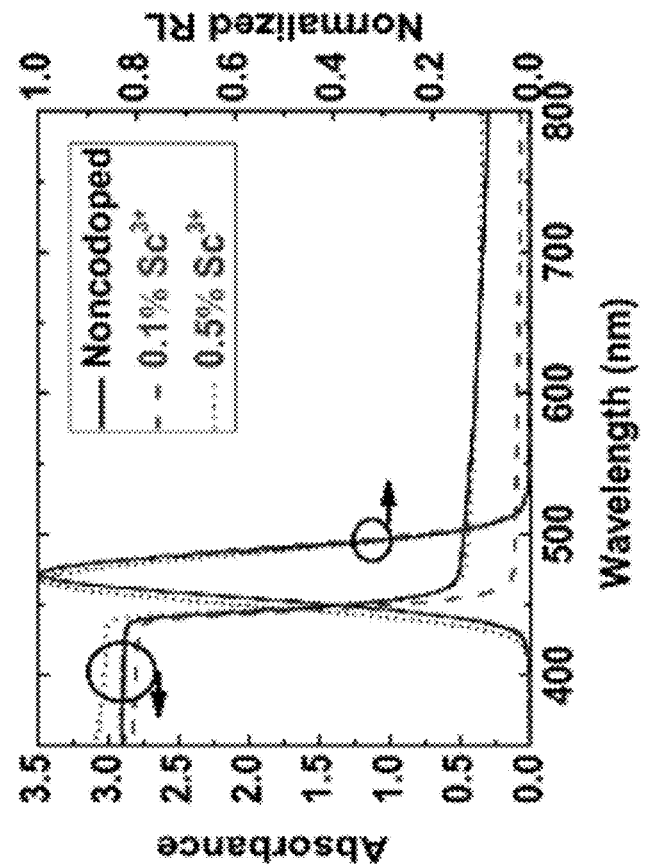
FIG. 1A is a graph showing the optical absorption (data circled with circle next to arrow pointing left) and radioluminescence (RL) (data circled with circle next to arrow pointing right) spectra of 2 millimeter (mm) thick potassium calcium triiodide (KCaI$_3$) single crystals doped with europium ions (Eu$^{2+}$) and codoped with 0.1 mole percent (%) scandium ions (0.1% Sc$^{3+}$, dashed lines) or 0.5 mole % scandium ions (0.5% Sc$^{3+}$, dotted lines). The absorption and RL spectra of noncodoped KCaI$_3$:Eu$^{2+}$ is shown for comparison (solid lines).
Figure 1D:
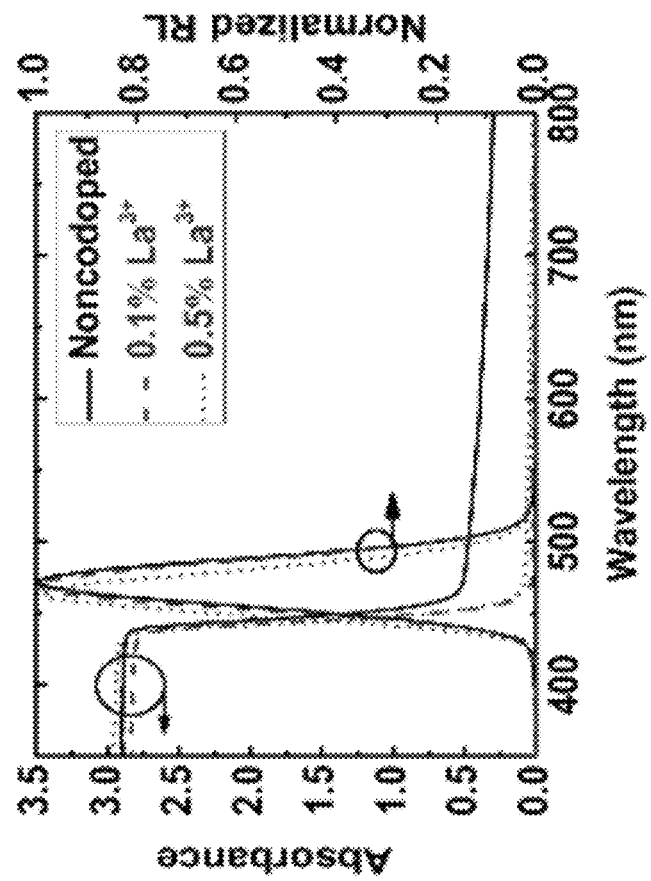
FIG. 1D is a graph showing the optical absorption (data circled with circle next to arrow pointing left) and radioluminescence (RL) (data circled with circle next to arrow pointing right) spectra of 2 millimeter (mm) thick potassium calcium triiodide ($KCaI_3$) single crystals doped with europium ions ($Eu^{2+}$) and codoped with 0.1 mole percent (%) lanthanum ions (0.1% $La^{3+}$, dashed lines) or 0.5 mole % lanthanum ions (0.5% $La^{3+}$, dotted lines). The absorption and RL spectra of noncodoped $KCaI_3$:$Eu^{2+}$ is shown for comparison (solid lines).
Figure 1C:
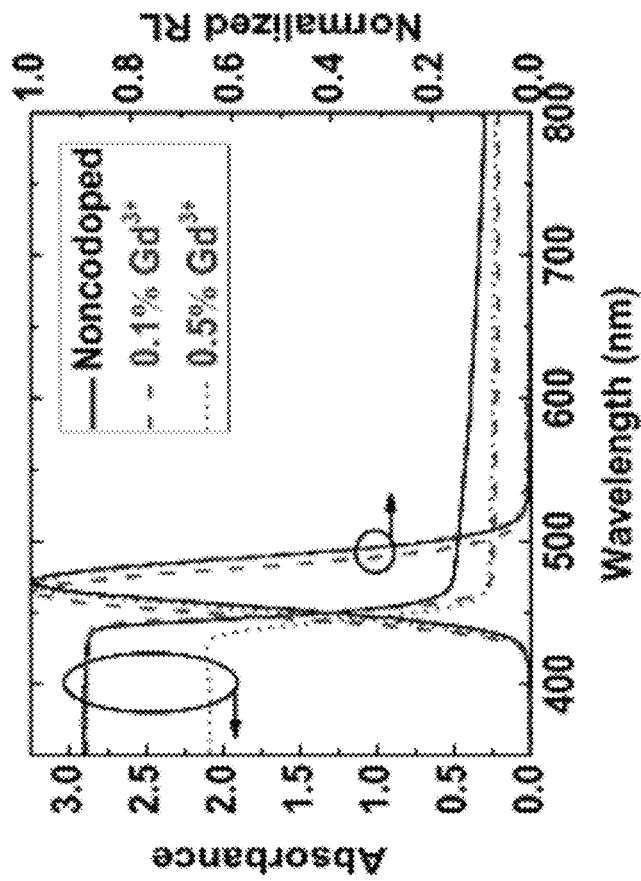
FIG. 1C is a graph showing the optical absorption (data circled with circle next to arrow pointing left) and radioluminescence (RL) (data circled with circle next to arrow pointing right) spectra of 2 millimeter (mm) thick potassium calcium triiodide ($KCaI_3$) single crystals doped with europium ions ($Eu^{2+}$) and codoped with 0.1 mole percent (%) gadolinium ions (0.1% $Gd^{3+}$, dashed lines) or 0.5 mole % gadolinium ions (0.5% $Gd^{3+}$, dotted lines). The absorption and RL spectra of noncodoped $KCaI_3$:$Eu^{2+}$ is shown for comparison (solid lines).

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, light output, atomic (at) or mole (mol) percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "scintillator" refers to a material that emits light (e.g., visible light) in response to stimulation by high energy radiation (e.g., X, α, β, or γ radiation).

The term "phosphor" as used herein refers to a material that emits light (e.g., visible light) in response to irradiation with electromagnetic or particle radiation.

In some embodiments, the compositional formula expression of an optical material (e.g., a scintillation material or a phosphor) can contain a colon ":", wherein the composition of the main optical material is indicated on the left side of the colon, and the activator (or dopant ion) or activator and codopant ion is indicated on the right side of the colon. The atomic percentage of the dopant or activator ion and/or the atomic percentage of the codopant ion can also be indicated to the right side of the colon. For the presently disclosed metal halide materials that comprise an alkali metal and an alkali earth metal, the atomic percentage of a dopant ion (e.g., a divalent europium ion or a monovalent indium ion) can be expressed in atomic percentage relative to the total amount of dopant and alkali earth metal or total amount of dopant and alkali metal. Thus, in some embodiments, the dopant ion can be a divalent ion that substitutes for a percentage of the divalent alkali earth metal ion in the base (i.e., main or un-doped) metal halide composition. For example, $KCaI_3:Eu$ 5% or $KCaI_3:3\%\ Eu$ represents a $KCaI_3$ optical material activated by europium, wherein 3 atomic % of the calcium is replaced by europium. In some embodiments, the dopant is a monovalent ion that substitutes for a percentage of the alkali metal ion in the base metal halide composition. Thus, the atomic % of a monovalent dopant can be expressed as the atomic % relative to the total amount of dopant and alkali metal. The atomic % of the codopant ion can be expressed as the atomic or mole % relative to the total amount of cation (i.e., the total amount of alkali metal, alkali earth metal, dopant ion and codopant ion).

The term "high energy radiation" can refer to electromagnetic radiation having energy higher than that of ultraviolet radiation, including, but not limited to X radiation (i.e., X-ray radiation), alpha (α) particles, gamma (γ) radiation, and beta (β) radiation. In some embodiments, the high energy radiation refers to gamma rays, cosmic rays, X-rays, and/or particles having an energy of 1 keV or greater. Scintillator materials as described herein can be used as components of radiation detectors in apparatuses such as counters, image intensifiers, and computed tomography (CT) scanners.

"Optical coupling" as used herein refers to a physical coupling between a scintillator and a photosensor, e.g., via the presence of optical grease or another optical coupling compound (or index matching compound) that bridges the gap between the scintillator and the photosensor. In addition to optical grease, optical coupling compounds can include, for example, liquids, oils and gels.

"Light output" can refer to the number of light photons produced per unit energy deposited, e.g., by a gamma ray being detected, typically the number of light photons/MeV.

As used herein, chemical ions can be represented simply by their chemical element symbols alone (e.g., Eu for europium ion(s) (e.g., $Eu^{2+}$) or Na for sodium ion(s) (e.g., $Na^+$)). Similarly, the terms "alkali metal" and "alkali earth metal" are used herein to refer to an alkali metal ion or a combination of alkali metal ions and an alkali earth metal ion or a combination of alkali earth metal ions, respectively.

II. General Considerations

Some recently discovered inorganic scintillators have energy resolution ≤3% at 662 keV and light yield of over 60,000 photons/MeV. These scintillators are metal halides, such as $LaBr_3:Ce^{3+}$; $SrI_2:Eu^{2+}$, $KSr_2I_5:Eu^{2+}$, $CsSrI_3:Eu^{2+}$, $KCaI_3:Eu^{2+}$, and $KCa_{0.8}Sr_{0.2}I_3:Eu^{2+}$. The scintillator properties of these inorganic halide materials are believed to be attributable to a combined result of the electronic structure of the host material and high luminescence efficiency of activators. Some of the factors that can contribute to their high light yield include: (1) the narrower band-gaps of bromides or iodides compared to chlorides, fluorides, or oxides; (2) the higher luminescence efficiency of activators such as $Eu^{2+}$ and $Ce^{3+}$; and (3) large enough ionization energy to prevent undesired thermal quenching of electrons trapped in the activators. However, for scintillators with a high light yield, the energy resolution used for detection devices is mainly limited by the non-proportional scintillation response. See Dorenbos, IEEE Trans. Nucl. Sci., 57, 1162 (2010).

With respect to broadening the application of these high performance $Eu^{2+}$ doped iodides from radioisotope identification to medical imaging, such as computed tomography (CT), strong afterglow, which delays the response times of the materials, is a major obstacle. Typically, the afterglow level drops less than two orders of magnitude after X-ray cutoff in the time scale of few hours. See Wu et al., Phys. Chem. Chem. Phys. 18, 8453 (2016; Wu et al., Adv. Optical Mater., 4, 1518 (2016); and Wu et al., Cryst. Growth Des., 15(8), 3929 (2015). A clear understanding of the origin of the afterglow and feasible solutions is still lacking.

III. Optical Materials

According to some embodiments of the presently disclosed subject matter, inorganic optical materials are provided that have modified afterglow and/or other properties. In some embodiments, the afterglow of the materials is modified (increased or decreased) via a codoping strategy. According to some aspects of the presently disclosed subject matter, the afterglow level of halide scintillators in the perovskite-structure family can be reduced by orders of magnitude via a codoping strategy (e.g., an aliovalent codoping strategy). According to some aspects of the presently disclosed subject matter, the afterglow level of halide phosphors in the perovskite-structure family can be increased via a codoping strategy (e.g., an aliovalent codoping strategy), e.g., thereby providing improved persistent phosphors.

In some embodiments, the presently disclosed subject matter provides a optical material that comprises a metal trihalide doped or activated with europium (Eu) and/or one or more other dopants/activators (e.g., a rare earth, heavy pnictogen, or post transition metal activator, such as cerium (Ce), praseodymium (Pr), terbium (Tb), gadolinium (Gd), ytterbium (Yb), thallium (Tl), indium (In), neodymium (Nd), samarium (Sm), bismuth (Bi), and antimony (Sb), as well as any other dopants that can luminesce in response to the absorption of energy) and codoped with at least one type of monovalent, divalent, trivalent or tetravalent cation, in some embodiments at a molar ratio of 5000 ppm or less (for example, between 1 ppm to 5000 ppm) with respect to all cations. For instance, the base metal trihalide being codoped can have a formula $ABX_3$ wherein A is an alkali metal or combination of two or more alkali metals, B is an alkali earth metal or combination of two or more alkali earth metals; and X is a halide or a combination of two or more halides. In some embodiments, the europium dopant, other dopant, or dopant mixture can replace all or a portion of the alkali earth metal (e.g., if the dopant ion is divalent or includes divalent ions) and/or all or a portion of the alkali metal (if the dopant ion is or includes monovalent ions). In some embodiments, the codopant can replace a portion of the alkali earth metal, the alkali metal or the dopant.

In some embodiments, the presently disclosed subject matter provides an optical material that comprises, consists essentially of, or consists of a composition of Formula (I):

$$[(A_{1-x}M_x)(B_{1-y}M'_y)]_{1-z}D_zX_3 \qquad (I),$$

wherein 0≤x≤0.1 and 0≤y≤0.1, subject to the proviso that at least one of x and y is at least 0.0001; 0.0001≤z≤0.1; A is an alkali metal or any combination of alkali metals; B is an alkali earth metal or any combination of alkali earth metals; M is a monovalent activator or a combination thereof; M' is a divalent or higher valency activator or a combination thereof (e.g., a di- or trivalent rare earth element or heavy pnictogen); D is at least one type of monovalent, divalent, trivalent, or tetravalent cation; and X is a halide or any combination thereof. In some embodiments, the optical material is a mixture of two or more materials comprising, consisting essentially of, or consisting of a composition of Formula (I).

Codopant cation D can be any suitable cation, e.g., a monovalent, divalent, trivalent, or tetravalent cation of an alkali metal, alkali earth metal, transition metal, rare earth element or other element, with the proviso that for any particular scintillator material, D is not a cation of the same element used as A, B, M, or M'. Thus, in some embodiments, A is a first alkali metal or combination of alkali metals and D is a cation of a second alkali metal wherein the second alkali metal is a different alkali metal than the first alkali metal or any alkali metal in the combination of alkali metals A. In some embodiments, B is a first alkali earth metal or combination of alkali earth metals and D is a cation of a second alkali earth metal wherein the second alkali earth metal is a different alkali earth metal than the first alkali earth metal or any alkali earth metal in the combination of alkali earth metals B. In some embodiments, M' is a first rare earth element and D is a cation of a second rare earth element that is different than the first rare earth element. Stated another way, if the base metal halide is $KCaI_3$ doped with Eu, the codopant D is a cation other than $K^+$, $Ca^{2+}$, or $Eu^{2+}$.

Generally, any dopant (M or M') or codopant (D) is present in an amount of about 10 atomic or mole percent (at or mol %) or less, while any elements present at above about 10 at or mol % will be considered part of the base metal halide. Thus, when combinations of elements are present as A or B in Formula (I), each alkali metal or alkali earth metal of the combination will be present in more than 10 at or mol %. In some embodiments, D comprises a cation other than $Sr^{2+}$ and/or the material is free of Sr when M' is Eu. In some embodiments, D comprises a cation other than (i.e., instead of or in addition to) $Sr^{2+}$ and/or the material is free of Sr.

Alkali metal A can be any suitable alkali metal or combination of alkali metals. In some embodiments, A is selected from the group comprising lithium (Li), sodium (Na), potassium (K), rubidium (Rb), cesium (Cs), or any combination thereof (i.e., a combination of any two, three, four or all five of Li, Na, K, Rb, and Cs). In some embodiments, A is K or a combination of K and one or more or two or more other alkali metals.

Alkali earth metal B can be any suitable alkali earth metal or combination of alkali earth metals. In some embodiments, B is selected from the group comprising beryllium (Be), magnesium (Mg), calcium (Ca), strontium (Sr), barium (Ba), or any combination thereof (i.e, a combination of two, three, four or all five of Be, Mg, Ca, Sr, and Ba). In some embodiments, B is Ca or a combination of Ca and one or more or two or more other alkali earth metals.

Halide X can be any suitable halide or combination of halides, i.e., F, Cl, Br, I, or any combination thereof (i.e., any two, three or all four of F, Cl, Br, and I). In some embodiments, X is selected from Cl, Br, and I. In some embodiments, X is selected from Br and I. In some embodiments, X is I or a combination of I and one or more or two or more other halides (Br, Cl, and/or F).

In some embodiments, M is selected from the group comprising In, Tl, and combinations thereof. In some embodiments, M' is selected from the group comprising Ce, Pr, Nd, Sm, Eu, Gd, Tb, Yb, Bi, Sb, and combinations of any two or more thereof. In some embodiments M' is Ce, Pr, Eu or a combination thereof.

In some embodiments, the dopant or dopants (i.e., M and/or M') are present in a total amount between about 0.1 atomic (at) or mole (mol) % and about 10 at % or mol %. Typically, unless noted otherwise, the amount of dopant(s) and/or codopant(s) described herein are expressed in terms of the amount in the melt used to prepare the material. In some embodiments, the dopant or dopants are present in a total amount between about 1 at % or mol % and about 10 at % or mol % (e.g., about 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or about 10 at %) or between about 1 at % or mol % and about 5 at % or mol %.

In some embodiments, x is 0 and 0.001≤y≤0.1. In some embodiments, 0.01≤y≤0.1. In some embodiments, 0.01≤y≤0.05. In some embodiments, y is 0 and 0.001≤x≤0.1. In some embodiments, 0.01≤x≤0.1. In some embodiments, 0.01≤x≤0.05.

In some embodiments, the codopant or codopant ions are present in an amount between about 10 ppm and about 5000 ppm. In some embodiments, the codopant ion is present in an amount between about 0.01 at % or mol % and about 0.5 at % or mol %. Thus, in some embodiments, 0.0001≤z≤0.005. In some embodiments, the codopant ion is present in an amount between 0.1 at % or mol % and about 0.5 at % or mol %. In some embodiments, 0.001≤z≤0.005.

In some embodiments, D is selected from Mg, scandium (Sc), yttrium (Y), Gd, lanthanum (La), zirconium (Zr), and combinations thereof. In some embodiments, D is a trivalent cation or mixture thereof (e.g., Sc, Y, Gd, La, or a mixture thereof). In some embodiments, M' is Gd and D is a codopant other than Gd. In some embodiments, D is Sc or a combination of Sc and one or more other codopant ions. In some embodiments, D is Zr or a combination of Zr and one or more other codopant ions. In some embodiments, D is Mg or a combination of Mg and one or more other codopant ions.

In some embodiments, x is 0, M is not present, and the optical material comprises, consists essentially of, or consists of a composition of Formula (II):

$$(AB_{1-y}M'_y)_{1-z}D_zX_3 \quad (II),$$

wherein: 0.0001≤y≤0.1; 0.0001≤z≤0.1; A is an alkali metal or a combination thereof (e.g., Li, Na, K, Rb, Cs, or any combination thereof); B is an alkali earth metal or any combination thereof (e.g., Be, Mg, Ca, Sr, Ba, or any combination thereof); M' is a dopant or activator (e.g., selected from Ce, Br, Nd, Sm, Eu, Gd, Tb, Yb, Bi, Sb, and any combination thereof); D is at least one type of monovalent, divalent, trivalent, or tetravalent cation; and X is a halide or a combination thereof (i.e., F, Cl, Br, I or any combination thereof).

In some embodiments, 0.001≤y≤0.1. In some embodiments, 0.01≤y≤0.1. In some embodiments, 0.01≤y≤0.05. In some embodiments, y is 0.03. In some embodiments, 0.0001≤z≤0.01. In some embodiments, 0.0001≤z≤0.005. In some embodiments, 0.001≤z≤0.005.

In some embodiments, A is K or a combination of K and one or more other alkali metals. In some embodiments, B is Ca, Sr, or a combination thereof. In some embodiments, M' is selected from Eu, Pr, and Ce. In some embodiments, M' is Eu.

In some embodiments, D is a trivalent cation or a combination thereof. In some embodiments, D is selected from the group comprising Sc, Y, Gd, La, and combinations thereof. In some embodiments, D is Sc or comprises Sc and one or more additional codopant ions. In some embodiments, D is Mg or comprises Mg and one or more additional codopant ions. In some embodiments, D is Zr or comprises Zr and one or more additional codopant ions.

In some embodiments, X is Cl, Br, I or combinations thereof. In some embodiments, X is Br, I or combinations thereof. In some embodiments, X is I.

In some embodiments, A is K, B is Ca, M' is Eu and the optical material comprises, consists essentially of, or consists of a composition of Formula (III):

$$(KCa_{1-y}Eu_y)_{1-z}D_zX_3 \quad (III),$$

wherein: 0.01≤y≤0.1; 0.0001≤z≤0.005; D is one or more monovalent, divalent, trivalent or tetravalent ions; and X is a halide or any combination of halides. In some embodiments, D is Mg, one or more trivalent cations, or a combination thereof. In some embodiments, D is selected from the group comprising Mg, Sc, Y, Gd, La, Zr, and combinations thereof. In some embodiments, D is selected from Mg, Sc, Zr, and combinations thereof. In some embodiments, D is Y, Gd, La, or any combination thereof. In some embodiments, X is Cl, Br, I or any combination thereof. In some embodiments, X is I or a combination of I and one or more additional halide ions. In some embodiments, X is I.

In some embodiments, $0.01 \leq y \leq 0.05$. In some embodiments, y is 0.03. In some embodiments, $0.0001 \leq z \leq 0.005$. In some embodiments, z is 0.0003. In some embodiments, $0.001 \leq z \leq 0.005$. In some embodiments, z is 0.001. In some embodiments, z is 0.005.

In some embodiments, the optical material comprising, consisting essentially of, or consisting of a composition of Formula (I), (II), or (III) has reduced afterglow compared to the optical material where D is absent (i.e., the corresponding noncodoped material). For example, the composition of Formula (I) can have reduced afterglow compared to the compound $(A_{1-x}M_x)(B_{1-y}M'_y)X_3$, wherein x, y, A, M, B, M', and X are the same as in the material of Formula (I). In some embodiments, the material comprising, consisting essentially of, or consisting of a composition of Formula (I), (II), or (III) can have an afterglow after 6000 seconds that is at least 2, 3, 4, 5, or 10 times less than the afterglow of the noncodoped material (i.e., the same material where D is absent). In some embodiments, the presently disclosed materials can have a scintillation decay of about 1.12 microseconds (μs) or less. In some embodiments, the material comprising, consisting essentially of, or consisting of a composition of Formula (I), (II) or (III) can have a scintillation decay of between about 1.11 and about 0.8 μs.

In some embodiments, the presently disclosed optical materials can have a light yield of about 48,000 photons/MeV or greater. In some embodiments, the presently disclosed materials can have a light yield of between about 48,000 photons/MeV and about 70,000 photons/MeV. In some embodiments, the presently disclosed optical materials can have an energy resolution at 662 keV of about 5.5% or less; about 4.2% or less, or about 4% or less. In some embodiments, the presently disclosed optical material can have an energy resolution of about 3.4% at 662 keV. In some embodiments, the presently disclosed optical material can have an energy resolution of about 2.71% at 662 keV.

In some embodiments, the optical material comprising, consisting essentially of, or consisting of a composition of Formula (I), (II), or (III) has reduced afterglow and can be used as a scintillator material, e.g., in medical imaging or another application where reduced afterglow is beneficial. In some embodiments, the optical material is a scintillator material and D is Sc, Mg, Zr or a combination thereof.

In some embodiments, the optical material comprising, consisting essentially of, or consisting of a composition of Formula (I), (II), or (III) has increased afterglow and can be used as a persistent phosphor, e.g., in a material designed to glow in the dark, such as a toy or as an item or coating material (e.g., a paint) for a personal or transportation safety. For example, the presently disclosed phosphors can be added to coating materials for road markers to increase their night time visibility. In some embodiments, the optical material is a phosphor and D is Y, Gd, La, or a combination thereof.

The optical materials of the presently disclosed subject matter can be a single crystal, a polycrystalline material, and/or a ceramic. By "single crystal" is meant a material manufactured by a liquid phase method having few or no grain boundaries and wherein each adjoining crystal grain generally has the same orientation. In some embodiments, the material can be polycrystalline and/or ceramic and contain crystals of varying size and/or orientation.

IV. Radiation Detectors, Related Devices and Methods

In some embodiments, the presently disclosed subject matter provides a radiation detector comprising an optical material (e.g., a scintillation material) comprising, consisting essentially of, or consisting of a composition of Formula (I), (II), or (III) as described hereinabove or a mixture of such materials. The radiation detector can comprise a scintillator (which absorbs radiation and emits light) and a photodetector (which detects said emitted light). The photodetector can be any suitable detector or detectors and can be or not be optically coupled to the scintillator material for producing an electrical signal in response to emission of light from the scintillator material. Thus, the photodetector can be configured to convert photons to an electrical signal. For example, a signal amplifier can be provided to convert an output signal from a photodiode into a voltage signal. The signal amplifier can also be designed to amplify the voltage signal. Electronics associated with the photodetector can be used to shape and digitize the electronic signal.

Figure 15:
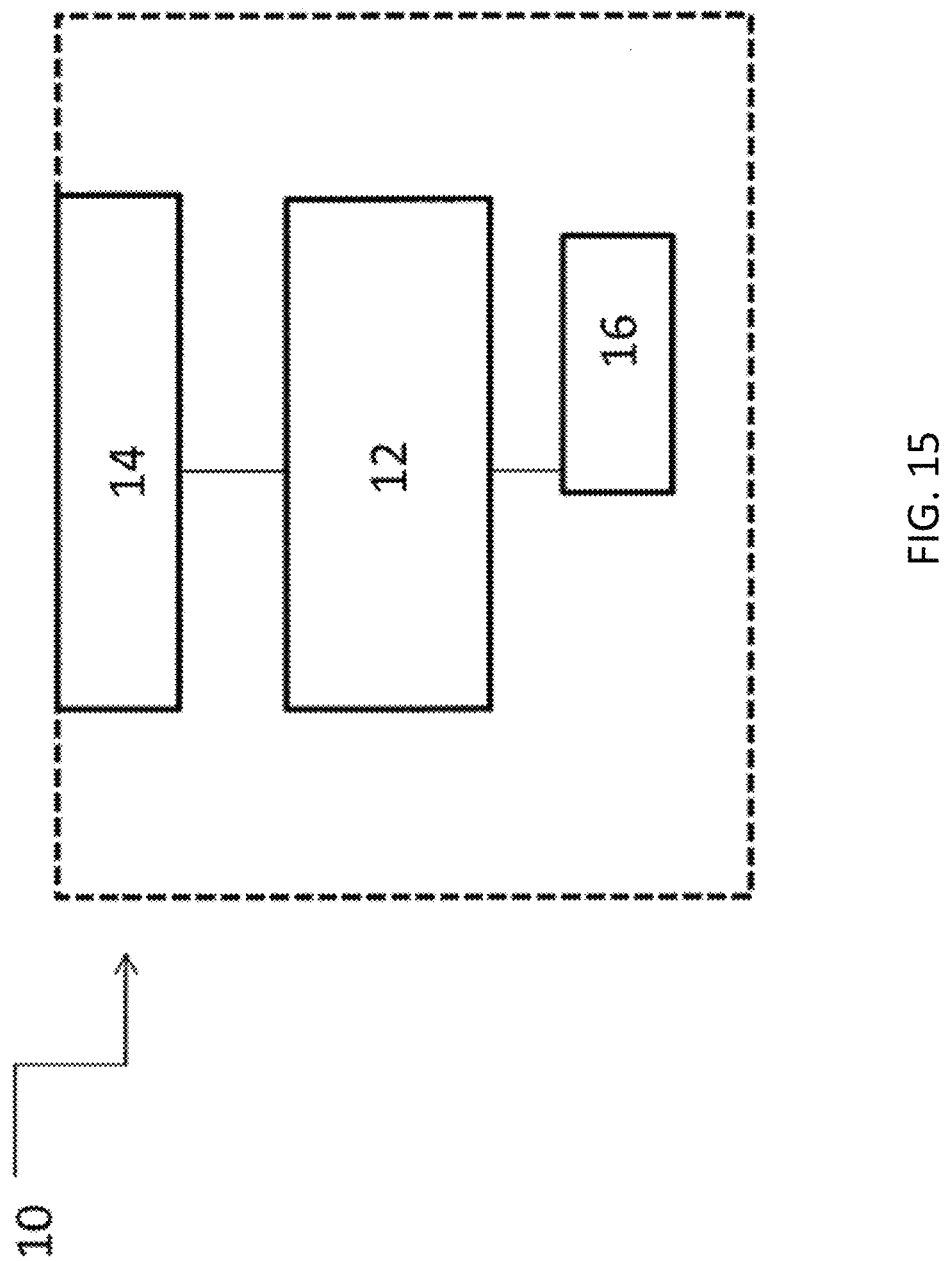
FIG. 15 is a schematic drawing of an apparatus for detecting radiation according to the presently disclosed subject matter. Apparatus 10 includes photon detector 12 optically coupled to scintillator material 14. Apparatus 10 can optionally include electronics 16 for recording and/or displaying electronic signal from photon detector 12. Thus, optional electronics 16 can be in electronic communication with photon detector 12.

Referring now to FIG. 15, in some embodiments, the presently disclosed subject matter provides an apparatus 10 for detecting radiation wherein the apparatus comprises a photon detector 12 and a scintillator material 14 (e.g., a codoped metal trihalide). Scintillator material 14 can convert radiation to light that can be collected by a charge-coupled device (CCD) or a photomultiplier tube (PMT) or other photon detector 12 efficiently and at a fast rate.

Referring again to FIG. 15, photon detector 12 can be any suitable detector or detectors and can be optically coupled (e.g., via optical grease or another optical coupling compound, such as an optical coupling oil or liquid) to the scintillator (e.g., a codoped metal trihalide) for producing an electrical signal in response to emission of light from the scintillator. Thus, photon detector 12 can be configured to convert photons to an electrical signal. Electronics associated with photon detector 12 can be used to shape and digitize the electronic signal. Suitable photon detectors 12 include, but are not limited to, photomultiplier tubes, photodiodes, CCD sensors, and image intensifiers. Apparatus 10 can also include electronics 16 for recording and/or displaying the electronic signal.

In some embodiments, the radiation detector is configured for use as part of a medical or veterinary diagnostic device, a device for oil or other geological exploration (e.g., oil well logging probes), or as a device for security and/or military-related purposes (e.g., as a device for container, vehicle, or baggage scanning or for scanning humans or other animals). In some embodiments, the medical or veterinary diagnostic device is selected from, but not limited to, a positron emission tomography (PET) device, an X-ray computed tomography (CT) device, a single photon emission computed tomography (SPECT) device, or a planar nuclear medical imaging device. For example, the radiation detector can be configured to move (e.g., via mechanical and/or electronic controls) over and/or around a sample, such as a human or animal subject, such that it can detect radiation emitted from any desired site or sites on the sample. In some embodiments, the detector can be set or mounted on a rotating body to rotate the detector around a sample.

In some embodiments, the device can also include a radiation source. For instance, an X-ray CT device of the presently disclosed subject matter can include an X-ray source for radiating X-rays and a detector for detecting said X-rays. In some embodiments, the device can comprise a plurality of radiation detectors. The plurality of radiation detectors can be arranged, for example, in a cylindrical or other desired shape, for detecting radiation emitted from various positions on the surface of a sample.

In some embodiments, the presently disclosed subject matter provides a method for detecting radiation (or the absence of radiation) using a radiation detector comprising a scintillator as described hereinabove (e.g., a codoped metal trihalide material). Thus, in some embodiments, the presently disclosed subject matter provides a method of detecting gamma rays, X-rays, cosmic rays and particles having an energy of 1 keV or greater, wherein the method comprises using a radiation detector comprising a material comprising a composition of one of Formulas (I), (II), or (III).

In some embodiments, the method can comprise providing a radiation detector comprising a photodetector and an optical (e.g., scintillator) material of the presently disclosed subject matter; positioning the detector, wherein the positioning comprises placing the detector in a location wherein the optical material is in the path of a beam of radiation (or the suspected path of a beam of radiation); and detecting light (or detecting the absence of light) emitted by the optical material with the photodetector. Detecting the light emitted by the optical material can comprise converting photons to an electrical signal. Detecting can also comprise processing the electrical signal to shape, digitize, or amplify the signal. The method can further comprise displaying the electrical signal or processed electrical signal.

In some embodiments, the presently disclosed subject matter provides a device comprising a photodetector and a scintillator material as described hereinabove, such as an optical material comprising a codoped metal trihalide, such as a material comprising a composition of one of Formulas (I), (II), or (III), or a mixture of such materials. In some embodiments, the device comprising the photodetector and the scintillator material is adapted for use in medical imaging, geological exploration, or homeland security. In some embodiments, the presently disclosed subject matter provides a method of detecting high energy photons and particles, wherein the method comprises using the device comprising the photodetector and the optical material comprising a composition of one of Formulas (I), (II), or (III), or a mixture of such materials.

V. Methods of Preparation

The presently disclosed optical materials can be prepared via any suitable method. Typically, the appropriate reactants (e.g., metal halides, such as, but not limited to KI, $CaI_2$, $EuI_2$, CsBr, NaBr, CsI, NaI, $SrI_2$, $BaI_2$, $EuBr_2$, $ScBr_3$, $YBr_3$, $GdBr_3$, $LaBr_3$, and $MgBr_2$, and the like) are melted at a temperature sufficient to form a congruent, molten composition. The melting temperature will depend on the identity of the reactants themselves (e.g., on the melting points of the individual reactants), but is usually in the range of from about 300° C. to about 1350° C. Exemplary techniques for preparing the materials include, but are not limited to, the Bridgman or Bridgman-Stockbarger method, the Czochralski method, the zone-melting method (or "floating zone" method), the vertical gradient freeze (VGF) method, and temperature gradient methods.

For instance, in some embodiments, high purity reactants can be mixed and melted to synthesize a compound of the desired composition. A single crystal or polycrystalline material can be grown from the synthesized compound by the Bridgman method, in which a sealed ampoule containing the synthesized compound is transported from a hot zone to a cold zone through a controlled temperature gradient at a controlled speed. In some embodiments, high purity reactants can be mixed in stoichiometric ratios depending upon the desired composition of the optical material and loaded into an ampoule, which is then sealed. After sealing, the ampoule is heated and then cooled at a controlled speed.

In some embodiments, the presently disclosed subject matter provides a method of preparing an optical material comprising a codoped metal trihalide (e.g., a composition of Formula (I), (II) or (III)). In some embodiments, the method comprises heating a mixture of raw materials (e.g., a mixture of metal halides in a stoichiometric ratio depending upon the formula of the desired scintillation material) above their respective melting temperatures (i.e., above the melting temperature of the raw material with the highest melting temperature). In some embodiments, the raw materials are dried prior to, during, or after mixing. In some embodiments, the raw materials are mixed under low humidity and/or low oxygen conditions. In some embodiments, the raw materials are mixed in a dry box and/or under conditions of less than about 0.1 parts-per-million (ppm) moisture and/or oxygen (e.g., less than about 0.1 ppm, 0.09 ppm, 0.08 ppm, 0.07 ppm, 0.06 ppm, 0.05 ppm, 0.04 ppm, 0.03 ppm, 0.02 ppm, or less than 0.01 ppm moisture and/or oxygen).

The mixture of raw materials can be sealed in a container (e.g., a quartz ampoule) that can withstand the subsequent heating of the mixture and which is chemically inert to the mixture of raw materials. The mixture can be heated at a predetermined rate to a temperature above the melting temperature of the individual raw materials. In some embodiments, the mixture can be heated to a temperature that is between about 10° C. and about 40° C. (e.g., about 10, 12, 14, 16, 18, 20, 22, 24, 26, 28, 30, 32, 34, 36, 38, or about 40° C.) above the melting temperature of the raw material with the highest melting temperature. In some embodiments, the mixture is heated to about 20° C. above the melting temperature of the raw material with the highest melting temperature. This temperature can be maintained for a period of time, such as between about 2 and about 12 hours (e.g., about 2, 3, 4, 5, 6, 7, 8, 9, 10, 11, or about 12 hours). Then the mixture can be cooled at a predetermined rate until the mixture reaches about room temperature (e.g., between about 20° C. and about 25° C.). If desired, the sealed container can be rotated or inverted. Then the heating and cooling can be repeated, e.g., to provide further mixing of all of the components in the mixture. The rotating or inverting and heating/cooling steps can be repeated one or more additional times, as desired.

Accordingly, in some embodiments, the method comprises:

(a) providing a mixture of raw materials, wherein the raw materials are provided in a stoichiometric ratio according to one of Formulas (I), (II), or (III);

(b) sealing said mixture in a sealed container;

(c) heating the mixture to about 20° C. above the melting point of the raw material having the highest melting point for a period of time;

(d) cooling the mixture to about room temperature; and (e) optionally repeating steps (c) and (d).

In some embodiments, steps (c) and (d) are repeated one or more times.

In some embodiments, the optical material comprises a composition of one of Formulas (I), (II), or (III). In some embodiments, A is K. In some embodiments, B is Ca. In some embodiments, M' is Eu. In some embodiments, X is selected from the group comprising Cl, Br, and I or a combination thereof. In some embodiments, X is I. In some embodiments, D is a trivalent ion (e.g., a trivalent rare earth element ion). In some embodiments, D is Sc, Zr, Gd, La, or Y. In some embodiments, D is Sc. In some embodiments, D is Mg. In some embodiments, D is Zr.

In some embodiments, the material comprises a composition of one of Formulas (II) or (III). In some embodiments $0.01 \leq y \leq 0.1$. In some embodiments, $0.025 \leq y \leq 0.05$. In some embodiments, y is 0.03. In some embodiments, $0.0001 \leq z \leq 0.005$. In some embodiments, $0.001 \leq z \leq 0.005$. In some embodiments, M' is Eu or Pr. In some embodiments, D is Sc, Zr, or Mg.

In some embodiments, the material is $KCaX_3$:Eu,Sc, wherein X is Cl, Br, I or a combination thereof. In some embodiments, the material is $KCaI_3$:Eu,Sc. In some embodiments, the material is $KCaI_3$:1-10% Eu,0.1-0.5% Sc. In some embodiments, the material is $KCaI_3$:3% Eu,0.1-0.5% Sc. In some embodiments, the material is $KCaI_3$:3% Eu,0.1% Sc or $KCaI_3$:3% Eu,0.5% Sc.

In some embodiments, the material is $KCaX_3$:Eu,Zr, wherein X is Cl, Br, I or a combination thereof. In some embodiments, the material is $KCaI_3$:Eu,Zr. In some embodiments, the material is $KCaI_3$:1-10% Eu,0.01-0.5% Zr. In some embodiments, the material is $KCaI_3$:3% Eu,0.01-0.5% Zr. In some embodiments, the material is $KCaI_3$:3% Eu,0.03% Zr or $KCaI_3$:3% Eu,0.5% Zr.

The optical materials can be provided as single crystals, as a polycrystalline material, and/or as a ceramic material. In some embodiments, the material is provided as a polycrystalline material. The polycrystalline material can have analogous physical, optical and scintillation properties as a single crystal otherwise having the same chemical composition.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Preparation and Characterization of Optical Materials

Crystal Growth:

The vertical Bridgman technique was used to grow non-codoped $K(Ca_{0.97}Eu_{0.03})I_3$ and $K(Ca_{0.97}Eu_{0.03})I_3$ codoped with 0.1 or 0.5 at % M (M=$Sc^{3+}$, $Y^{3+}$, $Gd^{3+}$, $La^{3+}$, or $Mg^{2+}$) single crystals. The codopant concentrations given refer to the initial starting melt, and calculations are based on the assumption that the codopants substituted for Ca based on atomic-size matching. High-purity anhydrous KI, $CaI_2$ and $EuI_2$ beads (5N) from APL Engineered Materials Inc. (Urbana, Ill., United States of America) and $ScBr_3$, $YBr_3$, $GdBr_3$, $LaBr_3$, and $MgBr_2$ beads (4N) from Sigma-Aldrich (St. Louis, Mo., United States of America) were used. These beads were loaded and mixed in the quartz ampoules according to the particular composition. The loaded ampoule was evacuated to $10^{-6}$ torr and heated to 250° C. and kept for 12 h at this temperature to remove residual water and oxygen impurities. After baking, the ampoule was sealed and transferred to a Bridgman growth furnace where a temperature gradient of −25° C./cm and a translation rate of 0.5 mm/h was used. The Ø13 or 15 mm grown crystals were cooled to room temperature (RT) at a speed of 10° C./h. The grown crystals were taken out from ampoules, cut and polished in a glovebox with $H_2O$ level of <0.1 ppm and $O_2$ level of <0.1 ppm. For each boule, a 2 mm thick sample for optical measurements and 5×5×5 mm cubic samples for the measurements of $Eu^{2+}$ and codopant concentration, scintillation properties and thermoluminescence were extracted from the initial cylindrical region near the first-to-freeze region. These samples are transparent and inclusion-free. For optical and scintillation measurements, a crystal sample was loaded into a homemade housing filled with mineral oil that protects the sample from degradation. The housing was made of a quartz tube and a borosilicate glass as optical window. The sample handling process was conducted in a glovebox with $H_2O$ level of <0.1 ppm and $O_2$ level of <0.1 ppm.

X-Ray Diffraction (XRD) Measurements:

A Bruker D2 Phaser diffractometer (Bruker Corporation, Billerica, Massachusettes, United States of America) with an X-ray source operated at 30 kV and 10 mA using a copper target which produced K-alpha emission lines detected by a 1-dimensional LYNXEYE detector (Bruker Corporation, Billerica, Massachusettes, United States of America) was used to confirm the phase purity. The crystal samples were grounded into powders, and then loaded into a protective Kapton amorphous polymer domed sample stage that protects the sample from decomposition in ambient air during XRD measurement. The handling process was conducted in a glovebox with $H_2O$ level of <0.1 ppm and $O_2$ level of <0.1 ppm. For these samples, all reflection peaks were in good agreement with the reference pattern of $KCaI_3$, which indicated the phase purity of the synthesized compounds.

Inductively Coupled Plasma Mass Spectrometry (ICP-MS) Measurements.

The Eu, Sc, Y, Gd, and La concentrations in the crystals were measured using a GBC Scientific Optimass 9500 ICP-TOF-MS spectrometer (GBC Scientific Equipment, Braeside, Australia). Samples were prepared by dissolving each crystal in ASTM Type I water, and dilution to 10 µg/mL. All samples also contained Ultra Trace 2% $HNO_3$ (JT Baker Chemical Company, Phillipsburg, N.J., United States of America) to ensure complete dissolution of the analytes. A set of standards, prepared using serial dilution was created from Inorganic Ventures Rare Earth CCS-1 ICP-MS spectrometer and IVStock-21 Multi-Element standards (Inorganic Ventures, Christiansburg, Va., United States of America) to quantify the signal using a linear least-square analysis. The nebulizer flow rate was set to 0.975 L/min, and the skimmer voltage to −1100 V. The data was collected in three replicates, each using a 30 second acquisition time.

Optical Property Measurements:

Optical absorption spectra were measured with a Varian Cary 5000 UV-VIS-NIR spectrophotometer (Varian, Inc., Palo Alto, Calif., United States of America) in the 350-800 nm range.

Example 2

Scintillation and Thermoluminescence Property Measurements

Scintillation Property Measurements:

An X-ray tube operated at 35 kV, and 0.1 mA was used as an excitation source for X-ray excited radioluminescence (RL) measurements. Scintillation decay times were acquired with an Agilent DSO6104A digital oscilloscope (Agilent Technologies, Santa Clara, Calif., United States of America) in single shot mode under $^{137}$Cs source irradiation.

Absolute light yield measurements were recorded by using a pulse processing chain consisting of a Hamamatsu R2059 photomultiplier tube (PMT) (Hamamatsu Photonics, K.K., Hamamatsu City, Japan) operated at −1500 $V_{bias}$, an ORTEC® 672 Amplifier (ORTEC, Oak Ridge, Tenn., United States of America) a Canberra model 2005 pre-Amp (Canberra Industries, Meriden, Conn., United States of America) and a Tukan 8k multi-channel analyzer. Each sample was directly coupled to the PMT using mineral oil, and a dome-shaped SPECTRALON™ reflector (Labsphere, Inc., North Sutton, N.H., United States of America) with a 50 mm radius was used to maximize the collection of light. The photoelectron yields were estimated by using the single photoelectron peak method. Measurements on the samples were made with 10 μs shaping time for current pulse integration. Each sample was measured under irradiation with a 15 μCi $^{137}$Cs source. The reproducibility of the LY measurements is ±5%.

The energy resolution was measured by using a 2-inch diameter high quantum efficiency Hamamatsu R6231-100 PMT (Hamamatsu Photonics, K.K., Hamamatsu City, Japan). This PMT was operated at −1000 $V_{bias}$. $^{137}$Cs (662 keV) and $^{57}$Co (122 keV) γ-ray sources were used to irradiate the crystals. The energy resolution (ER) was calculated as the full width at half maximum (FWHM) divided by the photopeak centroid. Nonproportionality (nPR) was also evaluated with the same setup. Discrete $^{133}$Ba (31 and 356 keV), $^{241}$Am (59.5 keV), $^{57}$Co (122 keV), $^{22}$Na (511 keV), and $^{137}$Cs (662 keV) X- and γ-ray sources were used to excite the crystals at energies from 31 to 662 keV.

Thermoluminescence Measurements:

For each thermoluminescence (TL) measurement, a 5×5×5 mm cube sample was transferred from a glovebox by using a sealed amber jar, and then quickly taken out and mounted on the cold finger of the cryostat. The pressure was reduced to 20 mTorr, and the sample was then heated to 600 K to ensure that all traps were empty in the temperature range of interest. The samples were cooled to 5 K and irradiated by an X-ray generator (X-ray Model; CMX003) at 35 kV and 0.1 mA for 3 min. Subsequently, the sample was again heated to 600 K at a rate of 9 K/min; noise due to thermionic emissions precluded the acquisition of high-quality data above this temperature. A Hamamatsu H3177 PMT (Hamamatsu Photonics, K.K., Hamamatsu City, Japan) optically coupled to the cryostat's light transport interface was used to measure the spectrally unresolved emission from the sample. The PMT current signal was transformed into a voltage signal using standard NIM electronics. A National Instruments 6002-E data acquisition card (National Instruments, Austin, Tex., United States of America) was then used to digitize this voltage signal. The sample temperature was correlated with the signal intensity.

Example 3

Computational Methods

Density functional calculations were carried out using the QUANTUM ESPRESSO (QE) package (see Giannozzi et al., J. Phys. Condens. Matter., 21, 395592 (2009) with norm-conserving pseudopotentials and generalized gradient approximation (GGA) exchange-correlation functionals parameterized by Perdew-Burke-Enzerhof (PBE). See Perdew et al., Phys. Rev. Lett., 77, 3865 (1996). A self-consistency convergence criterion of 10$^{-8}$ eV was used for all calculations. All the structures were fully relaxed until the force components on any atoms were less than 10$^{-3}$ eV/A. The number of plane-waves was determined by a kinetic energy cutoff of 300 eV. Monkhorst-Pack grids with a maximum separation of 0.04 Å$^{-1}$ between k-points were used for sampling the Brillouin zone. See Monkhorst and Pack, Phys. Rev. B, 13, 5188 (1976). This sampling density was checked with respect to the convergence of the bulk KCaI$_3$ total energy, corresponding to a 6×2×2 k-point grid for the reciprocal space of a 20 atom KCaI$_3$ primitive cell. DFT+U type on-site potentials (see Dudarev et al., Phys. Re. B, 57, 1505 (1998)) were included for Sc-3d, Y-4d, La-4f, Gd-4f states, the U parameters were determined by a previously described constrained random phase approximation. See Anisimov et al., J. Phys. Condens. Matter., 9, 767 (1997); and Sasioğlu et al., Phys. Rev. B, 83, 121101 (2011). All the defect structures were simulated in a 4×1×1 80-atom supercell.

At thermodynamic equilibrium, the concentration of each type of defect follows the Boltzmann distribution described by equation (1):

$$c = c_0 \exp\left(-\frac{\Delta G_f}{k_B T}\right) \quad (1)$$

where $c_0$ denotes the concentration of possible defect sites, $k_B$ is the Boltzmann constant, and T is the the temperature (797 K) under which the crystal was grown. See Erhart et al., Phys. Rev. B, 81, 195216 (2010). The formation free energy $\Delta G_f$ was approximated by the formation energy $\Delta E_f$, given that the vibrational entropy contribution and the pressure-volume term are small.

The defect formation energies were calculated by equation (2)[41,42]

$$\Delta E_f = E_{def} - E_{lat} + q(\epsilon_{VBM} + \mu_e) - \Sigma_i \Delta n_i \mu_i \quad (2)$$

(see Erhart et al., Phys. Rev. B, 91, 165206 (2015); Li et al., Phys. Status Solid (b), 250, 233 (2013)) where $E_{def}$ is the total energy of the lattice with the defect, $\Sigma_{lat}$ is the total energy of the ideal host lattice with the same size, and q is the charged state of the defect, and $\mu_e$ stands for the electron chemical potential, measured with respect to the valance band minimum $\epsilon_{VBM}$. $\Delta n_i$ stands for the difference between the number of atoms of type i in the defective lattice and the host lattice. The chemical potential $\mu_i$ of constituent i can be expressed as in equation (3):

$$\mu_i = \mu_i^{bulk} + \Delta\mu_i \quad (3)$$

where $\mu_i^{bulk}$ is the chemical potential of constituent i in its standard reference state (fcc Ca metal, bcc K metal etc.), and $\Delta\mu_i$ is the difference in chemical potential upon the crystallization of constituent i. The $\Delta\mu_i$ terms are constrained by the formation enthalpy of the KCaI$_3$ compound. Specifically, the following constraints have to be satisfied for the formation of KCaI$_3$.

$$\Delta\mu_K + \Delta\mu_{Ca} + 3\Delta\mu_I = \Delta H_{KCaI_3} \quad (4)$$

$$\Delta\mu_K + \Delta\mu_I < \Delta H_{KI} \quad (5)$$

$$\Delta\mu_{Ca} + 2\Delta\mu_I < \Delta H_{CaI_2} \quad (6)$$

$$\Delta\mu_K, \Delta\mu_{Ca}, \Delta\mu_I < 0 \quad (7)$$

For the codoping impurities, the formation of $MI_3$ (M=La, Y, Gd, Sc) compounds was assumed as previously described (see Erhart et al., Phys. Rev. B, 91, 165206 (2015)), or as in equation (8):

$$\Delta\mu_M + 3\Delta\mu_I = \Delta H_{MI_3} \quad (8)$$

To compensate for the spurious interactions between the defects in neighboring cells, the finite-size correction scheme based on a multipole expansion (see Erhart et al., Phys. Rev. B, 91, 165206 (2015); and Li et al., Phys. Status Solid (b), 250, 233 (2013)) was used as described by equation (9):

$$\Delta E_f(L) = \Delta E_f(L \to \infty) - \frac{\alpha_{Md} q^2}{2\varepsilon L} - \frac{2\pi q Q}{3\varepsilon L^3} + O(L^{-5}) \quad (9)$$

where q is the charge of the defect, Q is the quadrupole moment, and the effective supercell size L is defined as the cubic root of the supercell volumes. The $1^{st}$-order term can be determined from the Madelung constant $\alpha_{Md}$ of the Bravais lattice of the supercell and the static dielectric constant of the material. The $3^{rd}$-order term is fit by calculated formation energies of the defects in 5 supercells with different sizes (40, 80, 160, 320 and 640 atoms respectively).

The exact position of the electron chemical potential $\mu_e$ is solved self-consistently by using the charged neutral constraint (see Erhart et al., Phys. Rev. B, 81, 195216 (2010)) described by equation (10):

$$n_e - n_h - \Sigma_i q_i c_i = 0 \quad (10)$$

where the index i runs over all the possible defects (both intrinsic and extrinsic), $q_i$ is the charge of defect i, and $c_i$ is the concentration solved by the Boltzmann distribution discussed above. $n_e$ and $n_h$ are the concentration of the free electron and holes, which follows Fermi-Dirac distribution. In the codoping case, an additional constraint can be applied as described by equation (11):

$$\Sigma_i c_{Mi} = c_M \quad (11)$$

where M=La, Y, Gd, or Sc, and the index i runs over all the possible defects related to codoping element M.

Finally, the thermodynamic transition energy is defined by the value of electron chemical potential at which the charge state of the vacancy switches from $q_1$ to $q_2$, and was calculated by equation (12):

$$\Delta\varepsilon_{th}\left(\frac{q_1}{q_2}\right) = \frac{\Delta E_f(q_1) - \Delta E_f(q_1)}{q_2 - q_1} - \varepsilon_{VBM} \quad (12)$$

The calculated thermodynamic transition energies can be compared with the thermal trapping depth of various defects derived from the experimental thermoluminescence studies described in Example 2.

Example 4

Discussion of Examples 1-3

Optical Properties of the Grown Crystals: Single crystals of $KCaI_3:Eu^{2+}$ codoped with different concentrations of $M^{3+}$ (M=Sc, Y, Gd, or La) ions were grown. All crystals were transparent, colorless, and inclusion-free except the 0.5% $Sc^{3+}$ codoped sample, which had a brownish-red crystal surface. The measured concentrations of $Eu^{2+}$ and codopants are listed in Table 1, below. The concentration of Eu in noncodoped and codoped samples was determined to be 1.4-1.7 at % except for 2.2 at % for the 0.5% Sc codoped sample. The codopant concentration in the crystal was found to be about 100 ppm for the 0.1 at % $M^{3+}$ (M=Sc, Y, Gd, or La) codoped samples. The codopant concentration of Y, Gd, or La in the 0.5 at % $M^{3+}$ codoped sample was 300-400 ppm. In contrast, the Sc concentration was determined to be 870 ppm in the 0.5 at % Sc codoped sample.

TABLE 1

Compositions of Noncodoped and Codoped Materials.

| Composition | $Eu^{2+}$ Concentration (at %) | | Codopant concentration (ppm) | |
|---|---|---|---|---|
| | In the melt | In the crystal | In the melt | In the crystal |
| $KCaI_3:Eu^{2+}$ | 3 | 1.4 | — | — |
| $KCaI_3:Eu^{2+}, Sc^{3+}$ | 3 | 1.7 | 1000 | 90 |
| $KCaI_3:Eu^{2+}, Sc^{3+}$ | 3 | 2.2 | 5000 | 870 |
| $KCaI_3:Eu^{2+}, Y^{3+}$ | 3 | 1.7 | 1000 | 80 |
| $KCaI_3:Eu^{2+}, Y^{3+}$ | 3 | 1.6 | 5000 | 290 |
| $KCaI_3:Eu^{2+}, Gd^{3+}$ | 3 | 1.6 | 1000 | 90 |
| $KCaI_3:Eu^{2+}, Gd^{3+}$ | 3 | 1.4 | 5000 | 390 |
| $KCaI_3:Eu^{2+}, La^{3+}$ | 3 | 1.6 | 1000 | 10 |
| $KCaI_3:Eu^{2+}, La^{3+}$ | 3 | 1.5 | 5000 | 290 |

The optical absorption and RL spectra of $M^{3+}$ (M=Sc, Y, Gd, or La) codoped $K(Ca_{0.97}Eu_{0.03})I_3$ in the range of 350-800 nm are plotted in FIGS. 1A-1D. As can be seen in FIGS. 1A-1D, the shapes of the absorption spectra with and without codoping were almost the same. Without being bound to any one theory, this result suggests that these codopants do not induce color centers. For noncodoped $KCaI_3:Eu^{2+}$, the RL emission maximum at 470 nm is believed to be associated with $Eu^{2+}$ 5d-4f de-excitation, consistent with a previously reported result. See Lindsey et al., Opt. Mater., 48, 1 (2015). Only a slight blueshift of $Eu^{2+}$ 5d-4f emission was observed in the codoped samples.

Figure 2:
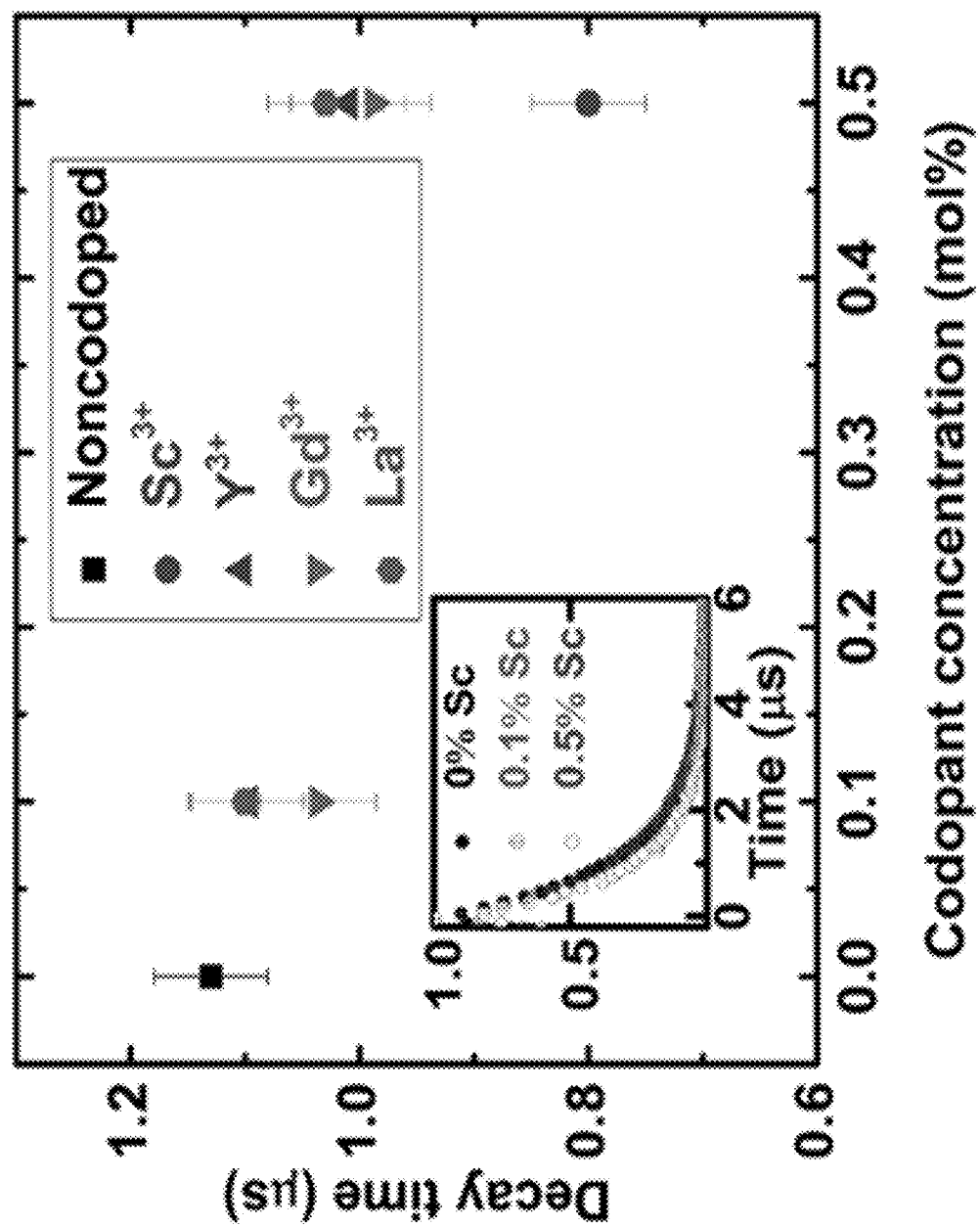
FIG. 2 is a graph showing the scintillation decay time (in microseconds, μs) of noncodoped and $M^{3+}$ codoped europium doped potassium calcium triiodide ($KCaI_3$:$Eu^{2+}$) single crystals acquired by a digital oscilloscope. Data is provided when $M^{3+}$ is trivalent scandium ($Sc^{3+}$, circles), trivalent yttrium ($Y^{3+}$, upward pointing triangles), trivalent gadolinium ($Gd^{3+}$, downward pointing triangles), and trivalent lanthanum ($La^{3+}$, hexagons). Codopant concentration varied from 0 mole percent (mol %), to 0.1 mol %, to 0.5 mol %. The inset is a graph of the scintillation decay curves of $KCaI_3$:$Eu^{2+}$ codoped with different $Sc^{3+}$ concentrations (0 mol % Sc, filled circles; 0.1 mol % Sc, circles with vertical lines, and 0.5 mol % Sc, unfilled circles).

Effects of Codopants on Scintillation Properties:

The scintillation decay profiles of 5×5×5 mm crystals of noncodoped and $M^{3+}$ (M=Sc, Y, Gd, or La) codoped $KCaI_3:Eu^{2+}$ were measured. The decay profiles of $Sc^{3+}$ codoped $KCaI_3:Eu^{2+}$ are shown in the FIG. 2 inset. All of the decay profiles could be fit well by single exponential functions, and the constant decay data for all samples are presented in FIG. 2 and Table 2, below. The decay constant of noncodoped $KCaI_3:Eu^{2+}$ was 1.1 µs, close to the previously reported result. See Lindsey et al., Opt. Mater., 48, 1 (2015). Decay time shortening is observed in all of the codoped samples, but the degree of impact relies on the codopant type and concentration. For instance, the reduction of decay time by tens of ns was observed in $Y^{3+}$, $Gd^{3+}$, or $La^{3+}$ codoped samples, but a more pronounced effect was seen in $Sc^{3+}$ codoped samples, such as decreasing by approximately 300 ns for the 0.5 at % codoped sample compared to the noncodoped one.

TABLE 2

Scintillation Properties of Noncodoped and Codoped Materials.

| Composition | RL em. (nm) | Light Yield (ph/MeV) | Energy resolution (%) | | Scint. decay (µS) |
|---|---|---|---|---|---|
| | | | 122 keV | 662 keV | |
| $KCaI_3:Eu^{2+}$ | 470 | 65,000 ± 3000 | 6.3 | 3.25 | 1.13 ± 0.05 |
| $KCaI_3:Eu^{2+}, Sc^{3+}$ (1000 ppm) | 470 | 57,000 ± 3000 | 6.6 | 3.4 | 1.10 ± 0.05 |

TABLE 2-continued

Scintillation Properties of Noncodoped and Codoped Materials.

| Composition | RL em. (nm) | Light Yield (ph/MeV) | Energy resolution (%) 122 keV | Energy resolution (%) 662 keV | Scint. decay (μS) |
|---|---|---|---|---|---|
| $KCaI_3:Eu^{2+}, Sc^{3+}$ (5000 ppm) | 468 | 51,000 ± 3000 | 12.0 | 7.8 | 0.80 ± 0.05 |
| $KCaI_3:Eu^{2+}, Y^{3+}$ (1000 ppm) | 470 | 59,000 ± 3000 | 8.3 | 4.2 | 1.11 ± 0.05 |
| $KCaI_3:Eu^{2+}, Y^{3+}$ (5000 ppm) | 469 | 53,000 ± 3000 | 9.0 | 5.8 | 1.01 ± 0.05 |
| $KCaI_3:Eu^{2+}, Gd^{3+}$ (1000 ppm) | 466 | 58,000 ± 3000 | 10.0 | 5.5 | 1.04 ± 0.05 |
| $KCaI_3:Eu^{2+}, Gd^{3+}$ (5000 ppm) | 470 | 48,000 ± 3000 | 10.7 | 6.1 | 0.99 ± 0.05 |
| $KCaI_3:Eu^{2+}, La^{3+}$ (1000 ppm) | 469 | 60,000 ± 3000 | 7.5 | 4.0 | 1.10 ± 0.05 |
| $KCaI_3:Eu^{2+}, La^{3+}$ (5000 ppm) | 464 | 58,000 ± 3000 | 11.9 | 7.4 | 1.03 ± 0.05 |

Figure 3:
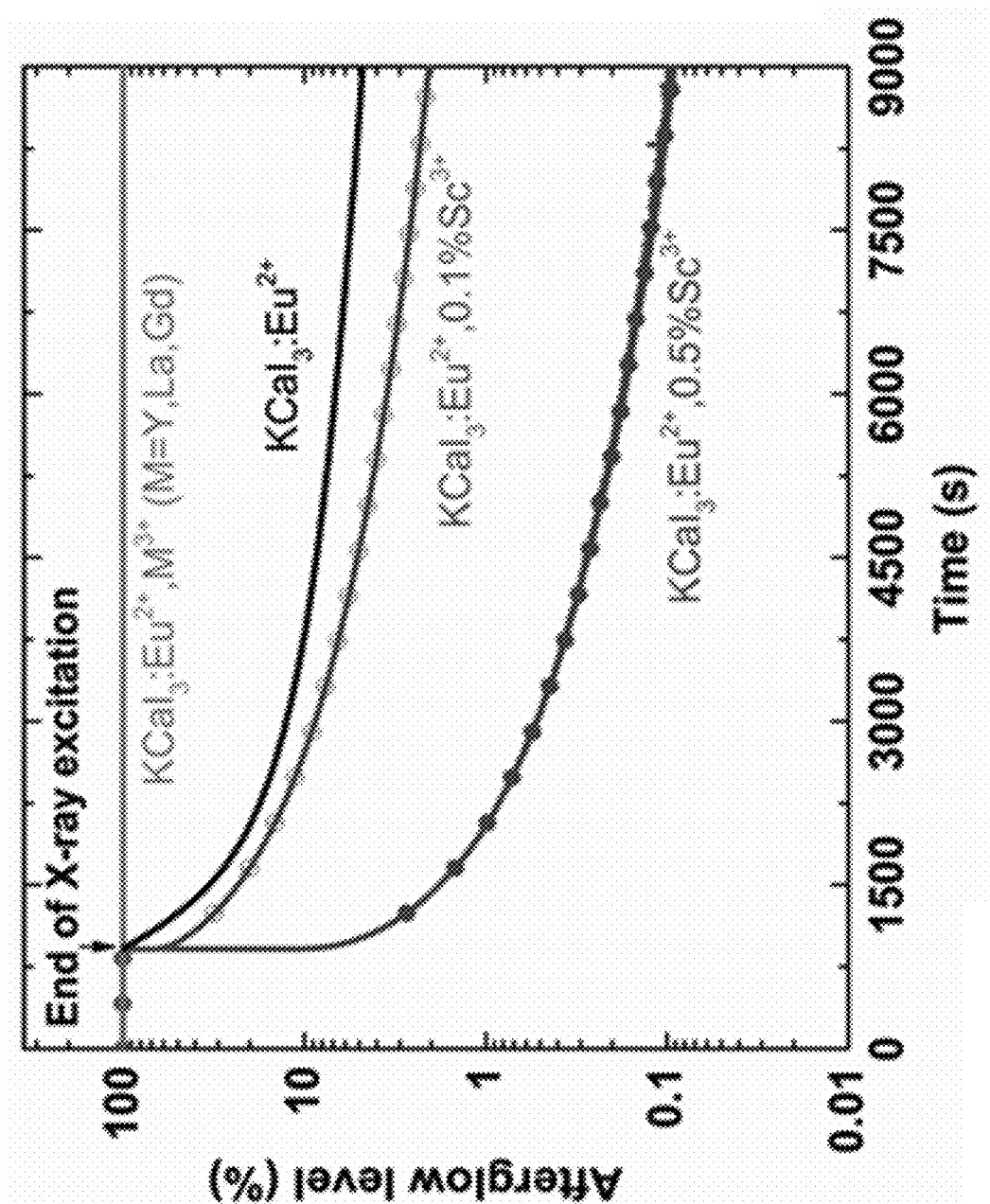
FIG. 3 is a graph showing the X-ray induced afterglow profiles (percent (%) afterglow level versus time in seconds (s)) of noncodoped europium doped potassium calcium triiodide ($KCaI_3$:$Eu^{2+}$) and trivalent ion ($M^{3+}$) codoped $KCaI_3$:$Eu^{2+}$ single crystals. The afterglow profile for a noncodoped crystal ($KCaI_3$:$Eu^{2+}$) is shown with the upper solid line. The afterglow profiles of crystals codoped with yttrium (Y), lanthanum (La) or gadolinium (Gd) (i.e., $KCaI_3$:$Eu^{2+}$,$M^{3+}$ (M=Y,La,Gd)) is shown with the lower solid line. The afterglow profile of a crystal codoped with 0.1 mole percent (%) scandium ($KCaI_3$:$Eu^{2+}$, 0.1% $Sc^{3+}$) is shown with the line with unfilled circles. The afterglow profile of a crystal codoped with 0.1 mole percent (%) scandium ($KCaI_3$:$Eu^{2+}$, 0.5% $Sc^{3+}$) is shown with the line with filled circles.
Figure 4D:
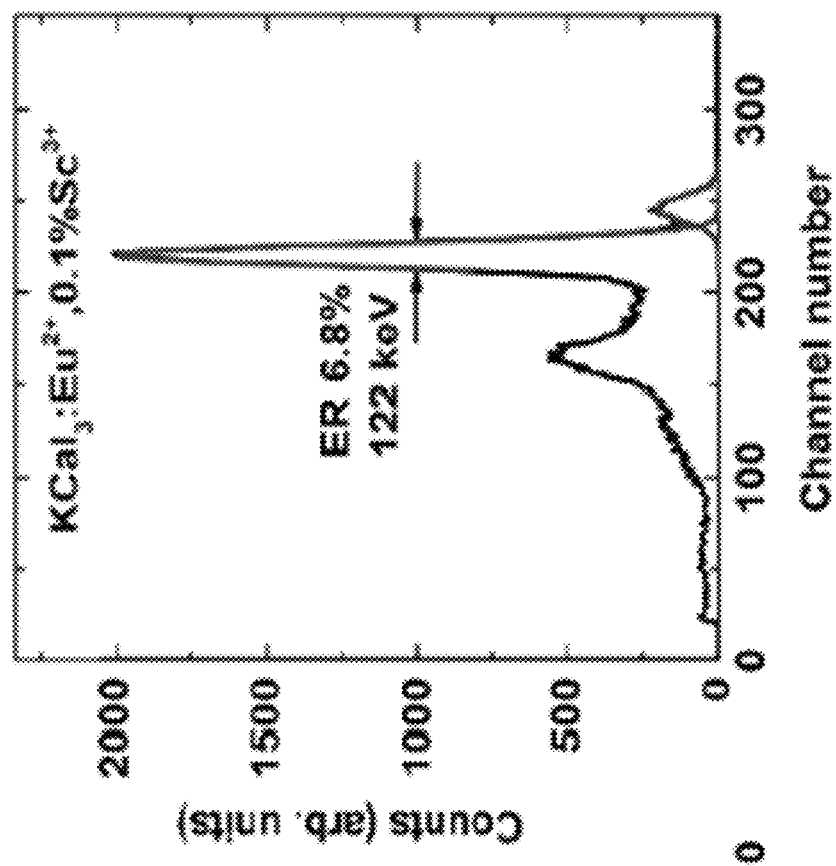
FIG. 4D is a graph showing the pulse height spectra of europium doped potassium calcium triiodide single crystals codoped with 0.1 mole percent (%) scandium ($KCaI_3$:$Eu^{2+}$, 0.1% $Sc^{3+}$) under irradiation from a cobalt 57 source ($^{57}Co$). Counts are provided in arbitrary units (arb. units). The energy resolution (ER) at 122 kiloelectronvolts (keV) is 6.8%.
Figure 4C:
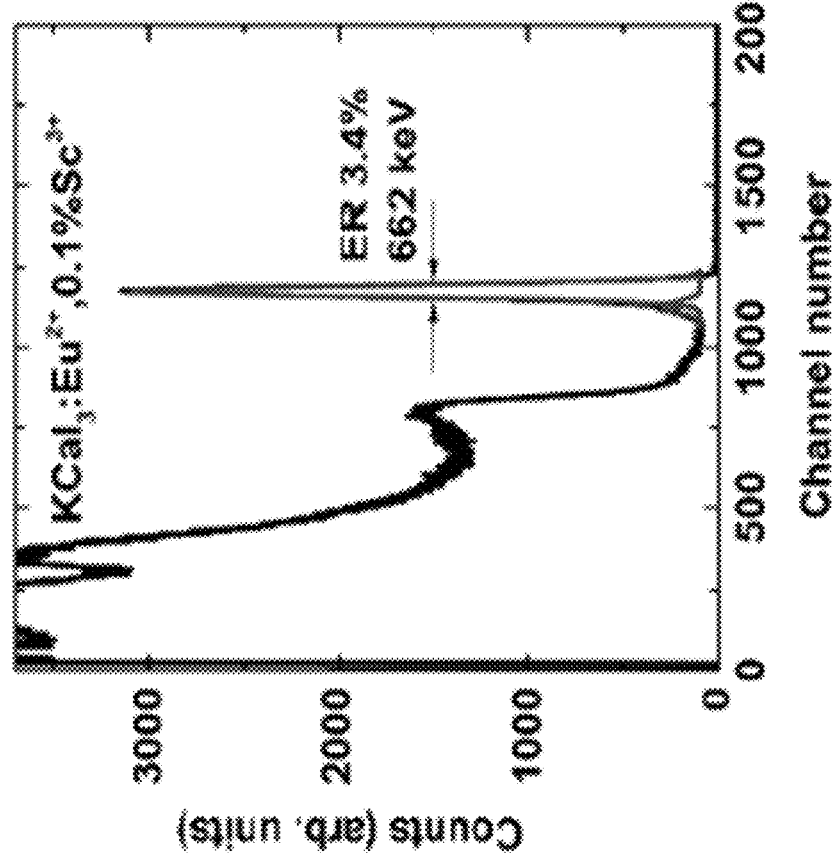
FIG. 4C is a graph showing the pulse height spectra of europium doped potassium calcium triiodide single crystals codoped with 0.1 mole percent (%) scandium ($KCaI_3$:$Eu^{2+}$, 0.1% $Sc^{3+}$) under irradiation from a cesium 137 source ($^{137}Cs$). Counts are provided in arbitrary units (arb. units). The energy resolution (ER) at 662 kiloelectronvolts (keV) is 3.4%.
Figures 4E, 4F:
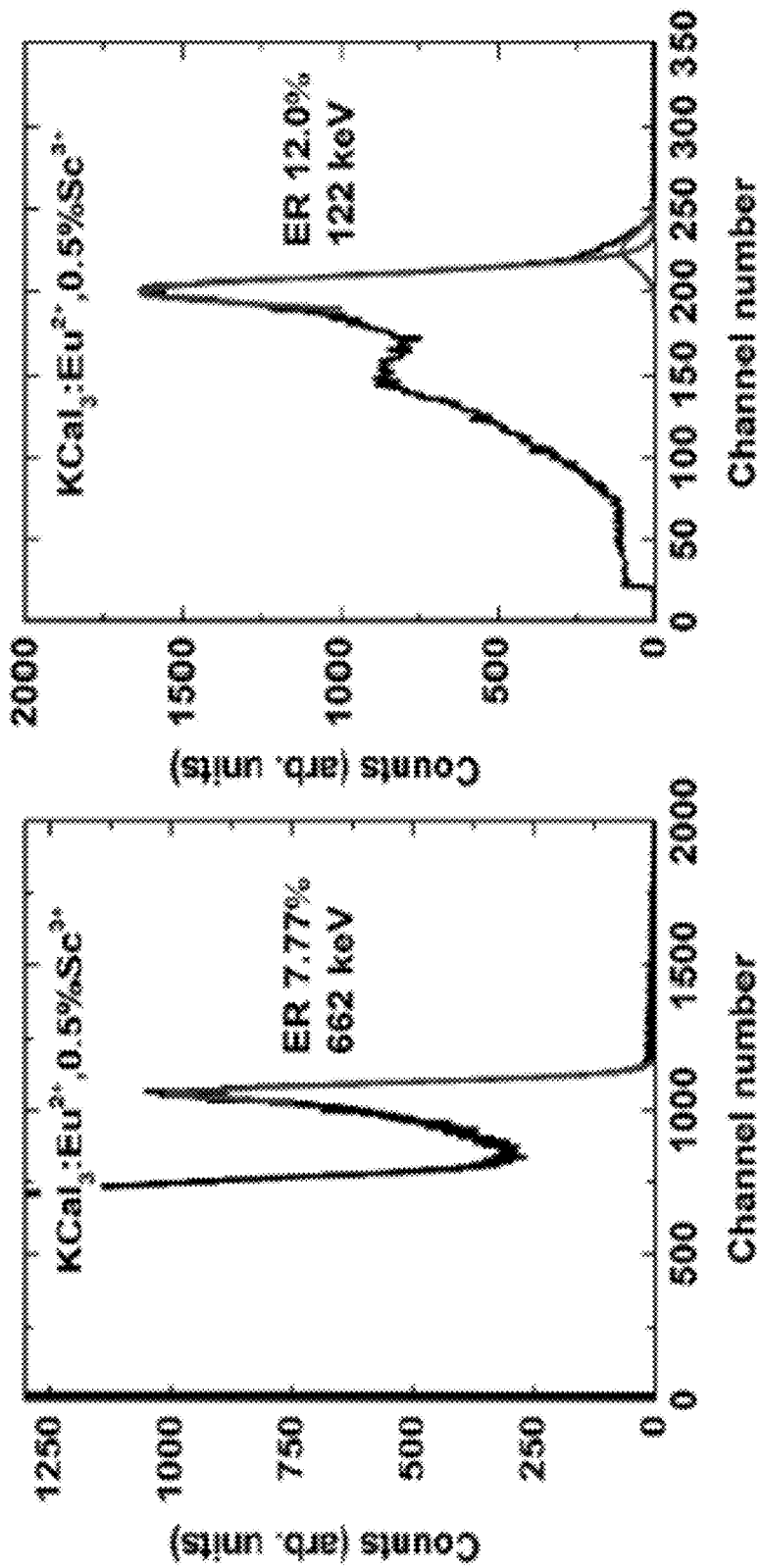
FIG. 4E is a graph showing the pulse height spectra of europium doped potassium calcium triiodide single crystals codoped with 0.5 mole percent (%) scandium ($KCaI_3$:$Eu^{2+}$, 0.5% $Sc^{3+}$) under irradiation from a cesium 137 source ($^{137}Cs$). Counts are provided in arbitrary units (arb. units). The energy resolution (ER) at 662 kiloelectronvolts (keV) is 7.77%.
FIG. 4F is a graph showing the pulse height spectra of europium doped potassium calcium triiodide single crystals codoped with 0.5 mole percent (%) scandium ($KCaI_3$:$Eu^{2+}$, 0.5% $Sc^{3+}$) under irradiation from a cobalt 57 source ($^{57}Co$). Counts are provided in arbitrary units (arb. units). The energy resolution (ER) at 122 kiloelectronvolts (keV) is 12.0%.

Scintillation afterglow is an important parameter in CT imaging, which requires at least three orders of magnitude reduction of afterglow in several milliseconds after X-ray cutoff. However, as a major obstacle, strong afterglow is a common feature for $Eu^{2+}$ doped iodides. See Wu et al., Phys. Chem. Chem. Phys., 18, (2016); Wu et al., Adv. Optical Mater., 4, 1518 (2016); and Wu et al., Cryst. Growth Des., 15(8), 3929 (2015). X-ray induced afterglow profiles of noncodoped and $M^{3+}$ (M=Sc, Y, Gd, or La) codoped $KCaI_3$: $Eu^{2+}$ are shown in FIG. 3. For noncodoped $KCaI_3:Eu^{2+}$, the reduction in afterglow signal was only about one order of magnitude in the first three hours after X-ray cutoff. A beneficial effect on afterglow suppression was observed with $Sc^{3+}$ codoping. The rate of initial decay increased after $Sc^{3+}$ codoping and the afterglow level afterward decreased substantially, namely after hours the residual signal decreased by two orders of magnitude in the 0.1% $Sc^{3+}$ codoped sample and three orders of magnitude in the 0.5% $Sc^{3+}$ codoped sample. This is believed to be the first successful use of codoping to achieve an order of magnitude reduction of afterglow in $Eu^{2+}$ doped metal halides. Interestingly, the $Y^{3+}$, $Gd^{3+}$ and $La^{3+}$ codopants, which have the same valence state as $Sc^{3+}$, exert an opposite influence on the afterglow performance. Their enhanced afterglow signal was maintained throughout the entire measurement time region for several hours.

Figure 5:
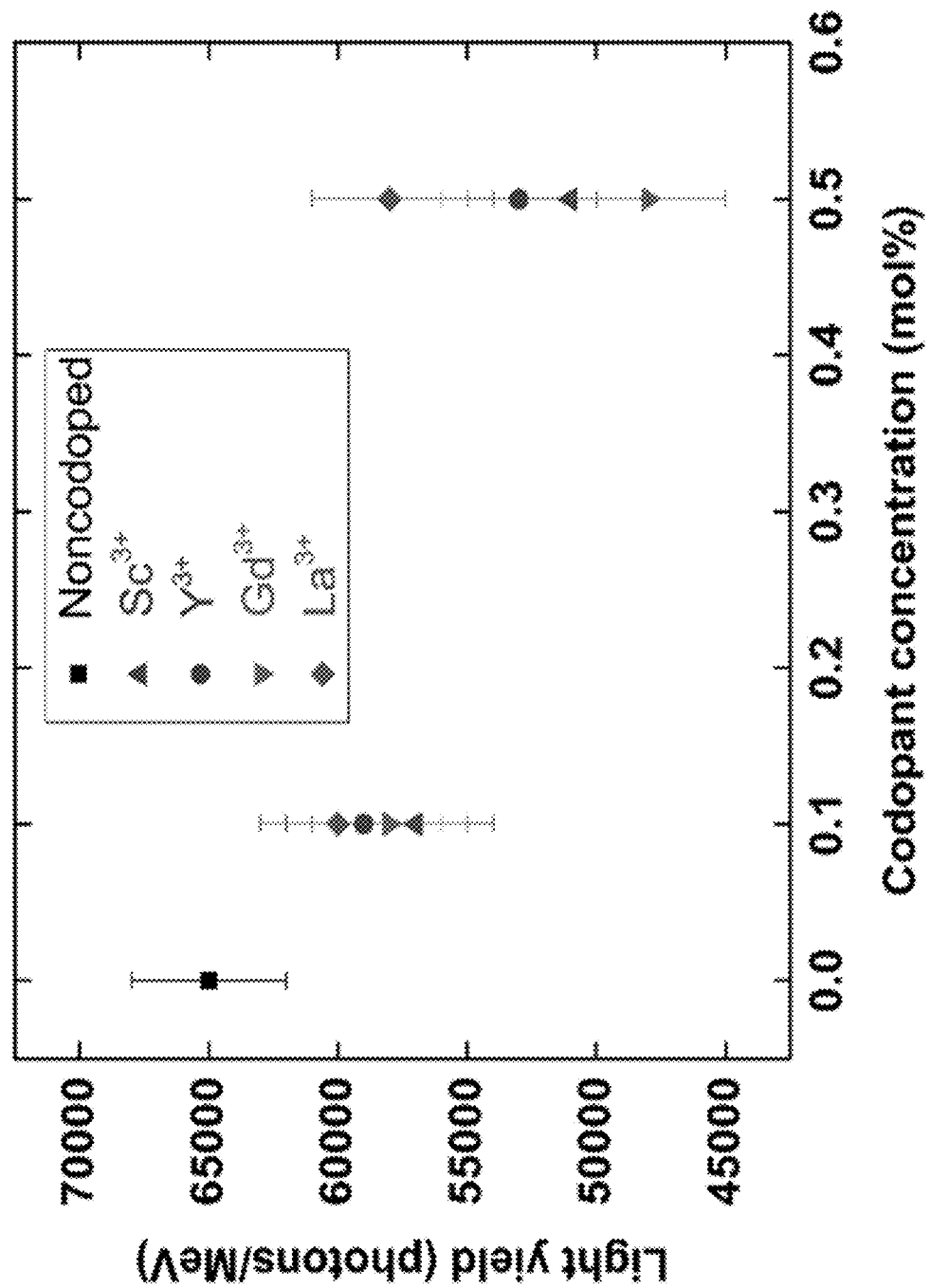
FIG. 5 is a graph showing the absolute light yield (LY, in photons per megaelectronvolt (MeV)) of 5 millimeter (mm) cubes of noncodoped europium doped potassium calcium triiodide ($KCaI_3$:$Eu^{2+}$) crystals (squares) and of europium doped potassium calcium triiodide crystals codoped with different trivalent ions: scandium ($Sc^{3+}$, upward pointing triangles), yttrium ($Y^{3+}$, circles), gadolinium ($Gd^{3+}$, downward pointing triangles), or lanthanum ($La^{3+}$, diamonds). Codopant concentration was either 0.1 mole percent (mol %) or 0.5 mol %.
Figures 6A, 6B:
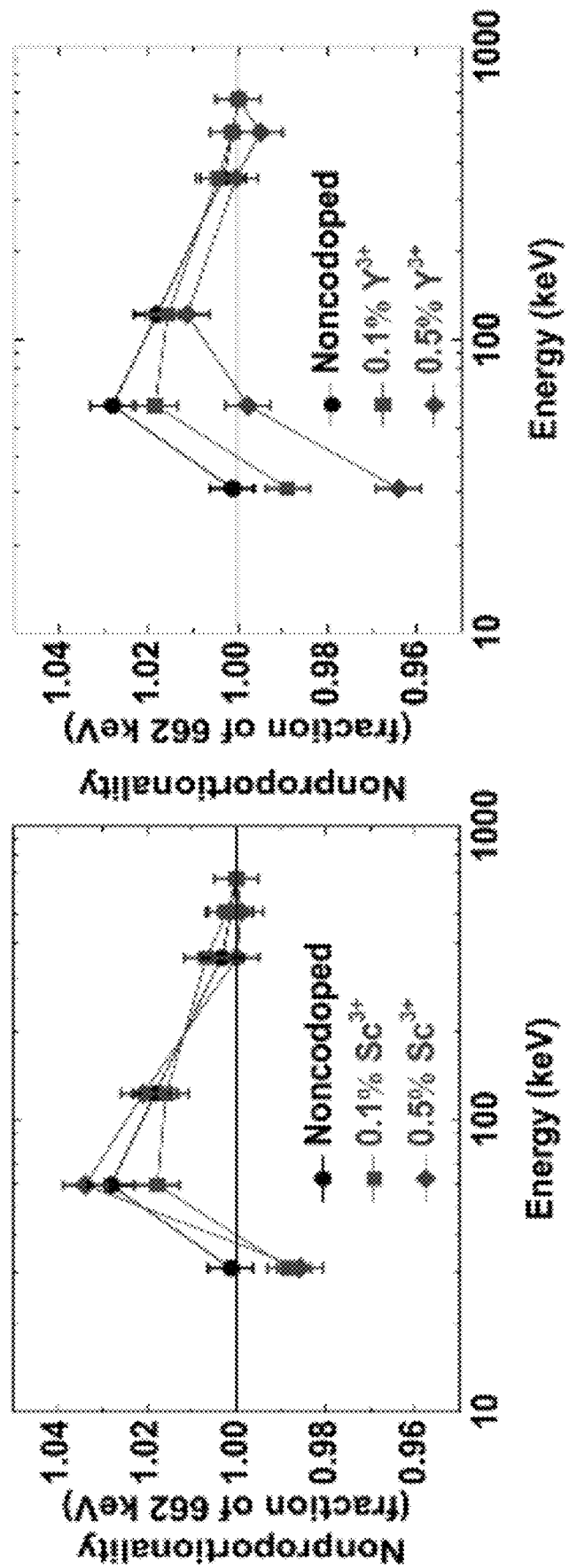
FIG. 6A is a graph showing the nonproportionality response of potassium calcium triiodide ($KCaI_3$) single crystals doped with europium ions ($Eu^{2+}$) and codoped with 0.1 mole percent (%) scandium ions (0.1% $Sc^{3+}$, line with squares) or 0.5 mole % scandium ions (0.5% $Sc^{3+}$, line with diamonds). The absorption and RL spectra of noncodoped $KCaI_3$:$Eu^{2+}$ is shown for comparison (line with circles). Nonproportionality response is shown as nonproportionality (expressed as a fraction of the response at 662 kiloelectron volts keV) versus energy (keV).
FIG. 6B is a graph showing the nonproportionality response of potassium calcium triiodide ($KCaI_3$) single crystals doped with europium ions ($Eu^{2+}$) and codoped with 0.1 mole percent (%) yttrium ions (0.1% $Y^{3+}$, line with squares) or 0.5 mole % yttrium ions (0.5% $Y^{3+}$, line with diamonds). The absorption and RL spectra of noncodoped $KCaI_3$:$Eu^{2+}$ is shown for comparison (line with circles). Nonproportionality response is shown as nonproportionality (expressed as a fraction of the response at 662 kiloelectron volts keV) versus energy (keV).
Figures 6C, 6D:
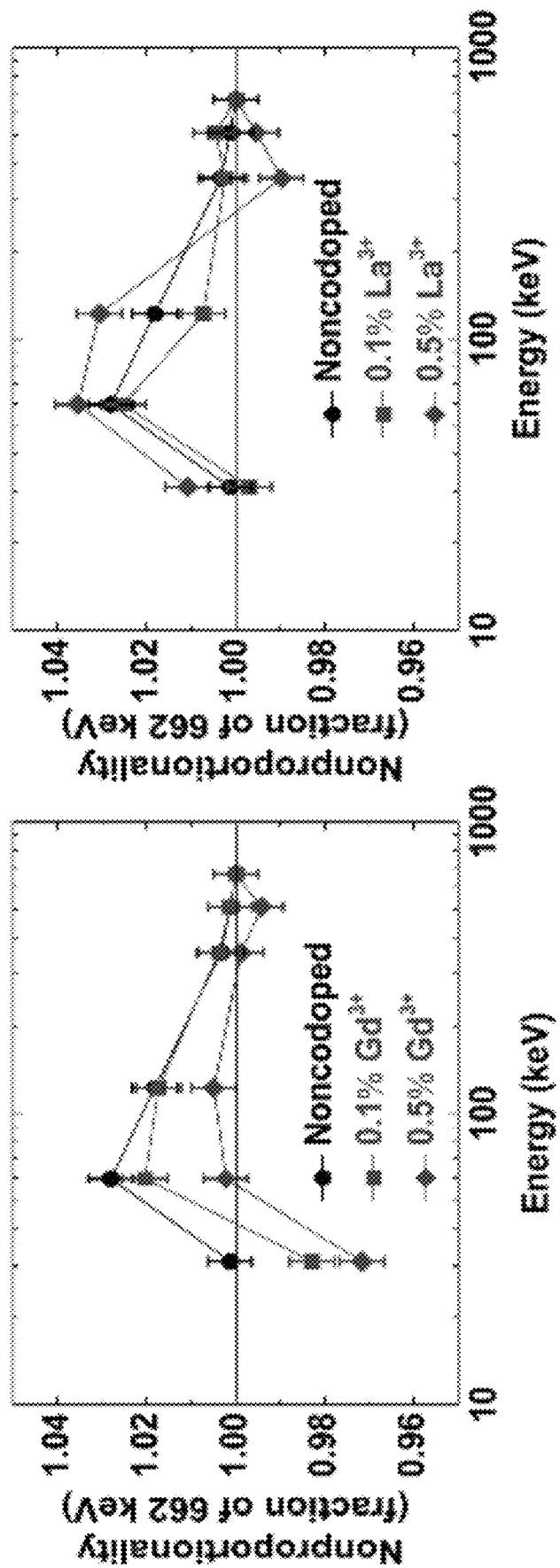
FIG. 6C is a graph showing the nonproportionality response of potassium calcium triiodide ($KCaI_3$) single crystals doped with europium ions ($Eu^{2+}$) and codoped with 0.1 mole percent (%) gadolinium ions (0.1% $Gd^{3+}$, line with squares) or 0.5 mole % gadolinium ions (0.5% $Gd^{3+}$, line with diamonds). The absorption and RL spectra of noncodoped $KCaI_3$:$Eu^{2+}$ is shown for comparison (line with circles). Nonproportionality response is shown as nonproportionality (expressed as a fraction of the response at 662 kiloelectron volts keV) versus energy (keV).
FIG. 6D is a graph showing the nonproportionality response of potassium calcium triiodide ($KCaI_3$) single crystals doped with europium ions ($Eu^{2+}$) and codoped with 0.1 mole percent (%) lanthanum ions (0.1% $La^{3+}$, line with squares) or 0.5 mole % lanthanum ions (0.5% $La^{3+}$, line with diamonds). The absorption and RL spectra of noncodoped $KCaI_3$:$Eu^{2+}$ is shown for comparison (line with circles). Nonproportionality response is shown as nonproportionality (expressed as a fraction of the response at 662 kiloelectron volts keV) versus energy (keV).
Figure 7A:
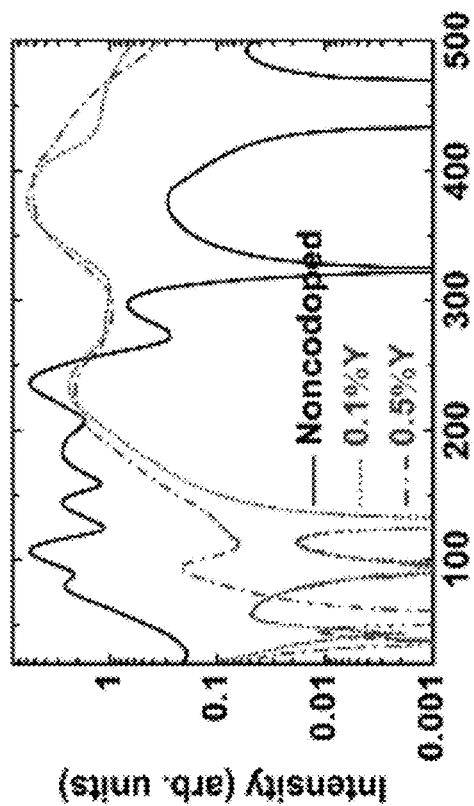
FIG. 7A is a graph showing the thermoluminescence (TL) glow curves (intensity (in arbitrary (arb.) units) versus temperature (in Kelvin (K)) of potassium calcium triiodide ($KCaI_3$) single crystals doped with europium ions ($Eu^{2+}$) and codoped with 0.1 mole percent (%) scandium ions (0.1% $Sc^{3+}$ dotted line) or 0.5 mole % scandium ions (0.5% $Sc^{3+}$, line with dots and dashes). The TL glow curve of noncodoped $KCaI_3$:$Eu^{2+}$ is shown for comparison (solid line).
Figure 7C:
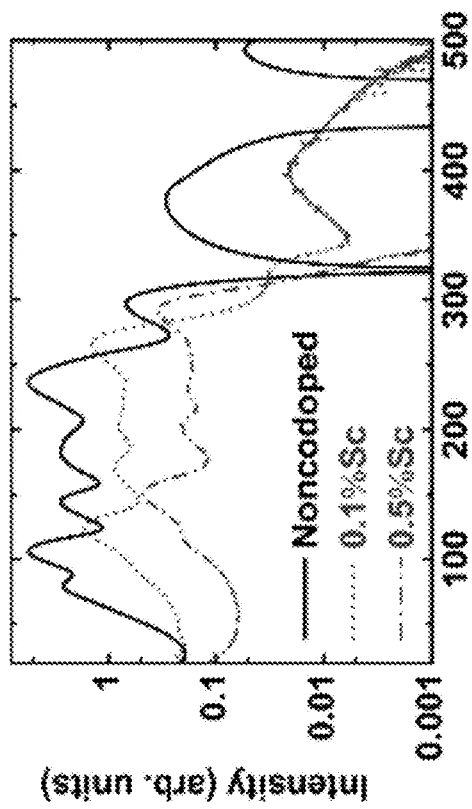
FIG. 7C is a graph showing the thermoluminescence (TL) glow curves (intensity (in arbitrary (arb.) units) versus temperature (in Kelvin (K)) of potassium calcium triiodide ($KCaI_3$) single crystals doped with europium ions ($Eu^{2+}$) and codoped with 0.1 mole percent (%) gadolinium ions (0.1% $Gd^{3+}$, dotted line) or 0.5 mole % gadolinium ions (0.5% $Gd^{3+}$, line with dots and dashes). The TL glow curve of noncodoped $KCaI_3$:$Eu^{2+}$ is shown for comparison (solid line).
Figure 7B:
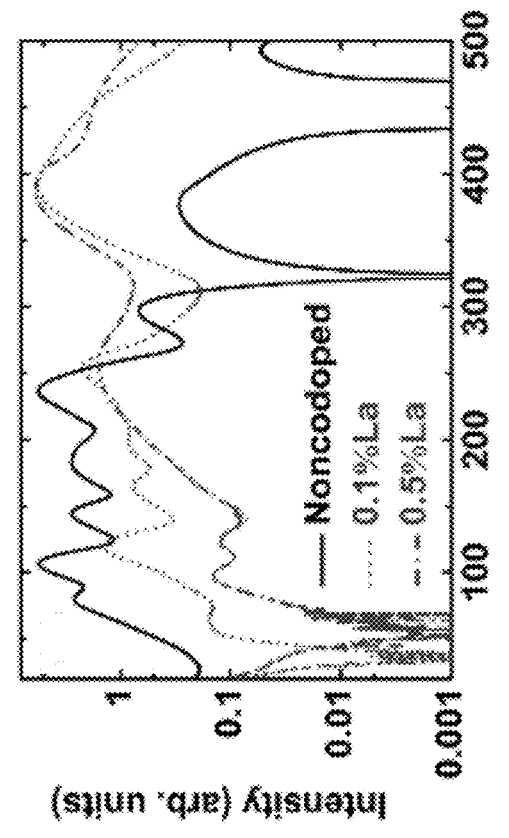
FIG. 7B is a graph showing the thermoluminescence (TL) glow curves (intensity (in arbitrary (arb.) units) versus temperature (in Kelvin (K)) of potassium calcium triiodide ($KCaI_3$) single crystals doped with europium ions ($Eu^{2+}$) and codoped with 0.1 mole percent (%) yttrium ions (0.1% $Y^{3+}$, dotted line) or 0.5 mole % yttrium ions (0.5% $Y^{3+}$, line with dots and dashes). The TL glow curve of noncodoped $KCaI_3$:$Eu^{2+}$ is shown for comparison (solid line).
Figure 7D:
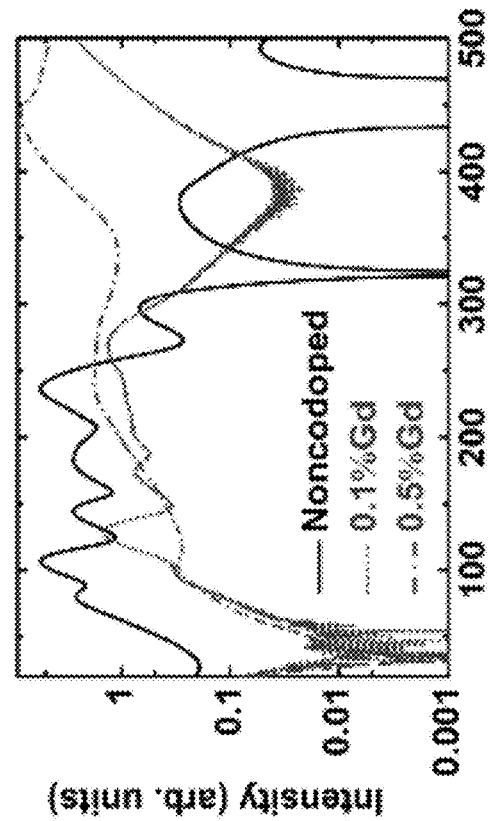
FIG. 7D is a graph showing the thermoluminescence (TL) glow curves (intensity (in arbitrary (arb.) units) versus temperature (in Kelvin (K)) of potassium calcium triiodide ($KCaI_3$) single crystals doped with europium ions ($Eu^{2+}$) and codoped with 0.1 mole percent (%) lanthanum ions (0.1% $La^{3+}$, dotted line) or 0.5 mole % lanthanum ions (0.5% $La^{3+}$, line with dots and dashes). The TL glow curve of noncodoped $KCaI_3$:$Eu^{2+}$ is shown for comparison (solid line).

The effects of $Sc^{3+}$, $Y^{3+}$, $Gd^{3+}$ and $La^{3+}$ codopants on light yield and energy resolution were also evaluated. The energy resolution of noncodoped and codoped $KCaI_3:Eu^{2+}$ crystals at 122 and 662 keV was measured by irradiation with $^{57}Co$ and $^{137}Cs$ gamma-ray sources, respectively. The derived energy resolutions at 122 and 662 keV are listed in Table 2, above, and the pulse height spectra of noncodoped and $Sc^{3+}$ codoped samples are shown in FIGS. 4A-4F. The noncodoped sample has an energy resolution of 6.3% at 122 keV and 3.25% at 662 keV, close to the previously reported values. See Lindsey et al., Opt. Mater., 48, 1 (2015). With $Y^{3+}$, $Gd^{3+}$, or $La^{3+}$ codoping, the energy resolutions became worse, such as 4-7% at 662 keV and 8-12% at 122 keV. For $Sc^{3+}$ codoped samples, an energy resolution of 3.4% at 662 keV and 6.6% at 122 keV still can be obtained in the 0.1 at % $Sc^{3+}$ codoped sample, but is degraded to 7.8% at 662 keV and 12% at 122 keV when the $Sc^{3+}$ content is increased to 0.5 at %. By considering the wavelength-weighted quantum efficiency of R2059 PMT for noncodoped and codoped $KCaI_3:Eu^{2+}$ (about 21.6%) the absolute light yields were estimated and presented in Table 2, above. Light yield as a function of codopant concentration is shown in FIG. 5. An absolute light yield of 65,000±3000 photons/MeV is estimated for noncodoped $KCaI_3:Eu^{2+}$. Codoped samples had a decreased light yield of 50,000-60,000 photons/MeV.

Theoretically, the energy resolution is believed to be mainly determined by three factors: i) a statistical contribution from the variance in the number of photoelectrons produced in the PMT; ii) the degree of non-proportionality (nPR); and iii) the extent of inhomogeneity of LY response across the crystal and inhomogeneous light collection. See Dorenbos, IEEE Trans. Nucl. Sci., 57, 1162 (2010). In the case of a high light yield scintillator, the energy resolution is thought to be mainly influenced by nPR. Here, the codoped sample with lowest light yield still has about 50,000 photons/MeV. Consequently, a limited influence of statistical contribution on energy resolution is expected. To evaluate the contribution of nPR, the measured channel number of the full energy peak at each gamma-ray energy was determined. The data points were then normalized to the response at 662 keV. It can be observed from the nPR curves plotted in FIGS. 6A-6D that codoping affects nPR in two general patterns. In the first case, seen in the $Sc^{3+}$ and $La^{3+}$ codoped samples, the nPR curves maintained nearly the same shape compared to the noncodoped sample. The second case, seen in the nonproportionality curves for $Y^{3+}$ and $Gd^{3+}$ codoped samples, involved a flattening of the "halide hump" with increasing codopant concentration, as well as a greater deviation from the ideal line at lower energies. Despite the difference, the calculated response deviation $\sigma_{nPR}$ (see Bizarri et al., IEEE Trans. Nucl. Sci., 58, 3403 (2011)) only has a slightly difference between the noncodoped and codoped samples. Without being bound to any one theory, this could be due to the limitation of predicting nPR solely by calculating $\sigma_{nPR}$.

Defect Structure:

To explain the decay time shortening and afterglow variation after codoping, an understanding of the defect structures is useful because the defects can lead to localized trap levels within the band gap and the associated trapping effect can influence the energy transfer processes of free charge carriers. For instance, shallow traps can delay the electron/hole capture at the activator and result in a prolonged scintillation decay, and electron/hole detrapping from the populated deep traps after irradiation can give rise to afterglow. The afterglow mechanism of $Eu^{2+}$ doped optical materials can be related to electron trapping and releasing. Due to the electronic configuration of $Eu^{2+}$, it is likely to trap holes. Thus, the electrons freed from the traps located close to the conduction band can recombine at europium centers to generate $Eu^{2+}$ emission. The thermoluminescence technique can be used to experimentally study the thermal trapping depth and afterglow-related detrapping time in noncodoped and codoped samples.

Thermal trapping levels evaluated by thermoluminescence technique.

The spectrally unresolved TL glow curves of $M^{3+}$ (M=Sc, Y, Gd, or La) codoped $KCaI_3:Eu^{2+}$ are shown in FIGS. 7A-7D as along with that of the noncodoped sample. The noncodoped sample has TL maxima at temperatures of about 78, 106, 145, 183, 236, 296, 362, 383, and 491 K, and their positions are consistent with those previously reported. See Wu et al., Adv. Optical Mater., 4, 1518 (2016). Considering the variation of TL intensity with codoping, the entire TL glow curve could be divided into three temperature intervals. First, below 100 K, for all codoped samples there is a trend in decreasing TL intensity with increasing $M^{3+}$ concentration. The diminishing and/or removal of corresponding shallow traps could be responsible for the decay time shortening phenomenon. Second, between 100 and 300 K, a decrease of TL intensity is also observed in all codoped samples, but is more pronounced in $Sc^{3+}$ codoped samples. Third, above 300 K, $Y^{3+}$, $Gd^{3+}$, or $La^{3+}$ codoping enhances the intensity of a TL peak at 380-400 K and induces TL peaks at higher temperatures. Without being bound to any one theory, it is believed that this can explain the intensified afterglow performance and the reduced light yield in these codoped samples. In the case of $Sc^{3+}$ codoping, the decrease of TL intensity by orders of magnitude with increasing $Sc^{3+}$ concentration in comparison to the noncodoped sample can contribute to the observed afterglow suppression at room temperature.

To quantitatively investigate the thermal trapping levels in noncodoped and codoped samples, the parameters of the electron traps corresponding to TL peaks were obtained by analysing the glow curves. The similarity of TL curves of $Y^{3+}$, $Gd^{3+}$, or $La^{3+}$ codoped samples implies an analogous effect of these codopants on structural defects. Thus, the TL glow curves of noncodoped, 0.1 at % $Sc^{3+}$, and 0.1 at % $La^{3+}$ codoped $KCaI_3$:$Eu^{2+}$ were selected for study. Generally, the TL intensity I as a function of temperature T can be expressed according to equation (13) (see Cooke et al., Appl. Phys. Lett., 70, 3594 (1997)):

$$I(T) = sn_0 \exp\left(-\frac{E_t}{\kappa_B T}\right) \times \left[\frac{(l-1)s}{\beta} \int_{T_0}^{T} \exp\left(-\frac{E_t}{\kappa_B T}\right) dT + 1\right]^{-l/(l-1)} \quad (13)$$

Equation (13) is a general form of the TL intensity I, as a function of temperature T. In the above equations, $n_0$ is the initial occupied trap concentrations, $E_t$ is the thermal trapping depth, $\kappa_B$ is the Boltzmann constant, I is the kinetic order, s is the frequency factor, and $\beta$ is the heating rate, 9 $Kmin^{-1}$ in this measurement. Because equation (13) cannot be directly used to fit the experimental data, the equation below was adapted in the fitting process (see Fenq et al., J. Appl., Phys., 103, 083109 (2008)) according to equation (14):

$$I(T) = sn_0 \exp\left(-\frac{E}{k_B T}\right) \times$$
$$\left\{\frac{(l-1)s}{\beta} \times T \times \exp\left(\frac{-E_t}{k_B T}\right) \times \left[\left(\frac{k_B T}{E_t}\right) - 2\left(\frac{k_B T}{E_t}\right)^2 + 6\left(\frac{k_B T}{E_t}\right)^3\right] + 1\right\}^{-l/(l-1)} \quad (14)$$

Figure 8:
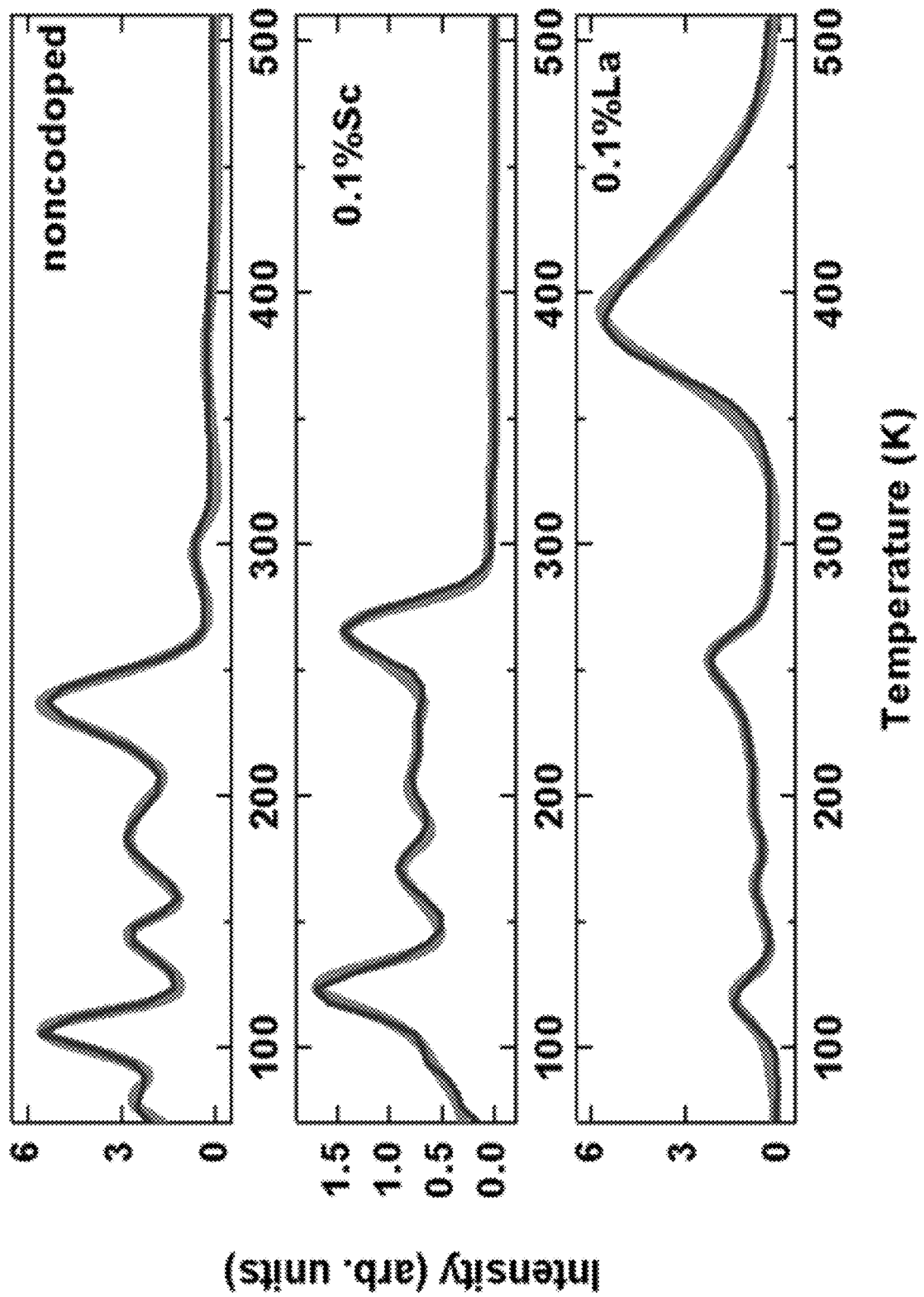
FIG. 8 is a series of graphs showing the fitted glow curves (black lines) and experimental glow curves (grey lines) of (top) noncodoped europium doped potassium calcium triiodide ($KCaI_3$:$Eu^{2+}$); (middle) europium doped 0.1 mole percent scandium codoped potassium calcium triiodide (0.1% Sc); and (bottom) europium doped 0.1 mole percent lanthanum codoped potassium calcium triiodide (0.1% La). The glow curves are provided as intensity (in arbitrary (arb.) units) versus temperature (in Kelvin (K)).

All three TL curves were well fitted by using ORIGIN 8 software, and plotted in FIG. 8. The specific derived parameters are listed in Table 3, below. To correlate the traps with afterglow, the detrapping time z of the trap at the temperature T can be calculated as in equation (15) (see McKeever, Thermoluminescence of Solids, Cambridge University Press, Cambridge, 1985):

$$\tau = s^{-1} \times e^{\frac{E}{kT}} \quad (15)$$

The calculated detrapping time for each trap at room temperature is also listed in Table 3. The noncodoped $KCaI_3$:$Eu^{2+}$ has deep traps located at 1, 1.07 and 1.5 eV below the conduction band minimum (CBM) with corresponding detrapping times in the order of $10^4$, $10^5$ and $10^{10}$ s. The first two deep traps could be responsible for the observed afterglow shown in FIG. 3. The $Sc^{3+}$ codoped sample has a deep trap located at 1.12 eV below the CB with a detrapping time of $10^5$ s, but its initial occupied trap concentration drops by 83-87% compared to the trap in the noncodoped sample. In contrast, after $La^{3+}$ codoping, the initial occupied trap concentrations of the deep trap with a depth of 1.07 eV increases by 77 times, and a new deep trap with a depth of 1.2 eV is formed, both of which can contribute to the enhancement the afterglow of the sample.

TABLE 3

Peak temperature $T_m$, initial occupied trap concentration ($n_0$), termal trapping depth ($E_{trap}$), frequency factor (s), and detrapping time ($\tau$) of noncodoped and codoped metal trihalides.

| Sample | $T_m$ (K) | $E_{trap}$ (eV) | $n_0$ | s ($s^{-1}$) | $\tau$ at RT (s) |
|---|---|---|---|---|---|
| $KCaI_3$:Eu | 78 | 0.12 | 795 | $3.1 \times 10^6$ | $3.4 \times 10^{-5}$ |
| | 106 | 0.17 | 259 | $3.5 \times 10^6$ | $1.9 \times 10^{-4}$ |
| | 145 | 0.25 | 101 | $1.9 \times 10^7$ | $6.8 \times 10^{-4}$ |
| | 183 | 0.31 | 167 | $1.3 \times 10^7$ | $1.0 \times 10^{-2}$ |
| | 236 | 0.40 | 254 | $1.9 \times 10^7$ | $3.0 \times 10^{-1}$ |
| | 296 | 0.72 | 16 | $1.3 \times 10^{11}$ | $1.1 \times 10^1$ |
| | 362 | 1.00 | 3 | $6.9 \times 10^{12}$ | $1.0 \times 10^4$ |
| | 383 | 1.07 | 4 | $7.4 \times 10^{12}$ | $1.2 \times 10^5$ |
| | 491 | 1.50 | 1.5 | $2.0 \times 10^{14}$ | $7.4 \times 10^{10}$ |
| $KCaI_3$, 0.1% Sc | 76 | 0.12 | 10 | $5.0 \times 10^5$ | $2.1 \times 10^{-4}$ |
| | 90 | 0.14 | 63 | $9.0 \times 10^5$ | $2.5 \times 10^{-4}$ |
| | 123 | 0.20 | 134 | $9.9 \times 10^6$ | $2.4 \times 10^{-4}$ |
| | 171 | 0.27 | 54 | $5.0 \times 10^6$ | $7.3 \times 10^{-3}$ |
| | 203 | 0.31 | 29 | $2.8 \times 10^6$ | $6.4 \times 10^{-2}$ |
| | 228 | 0.30 | 35 | $5.0 \times 10^6$ | $2.4 \times 10^{-1}$ |
| | 265 | 0.56 | 62 | $3.2 \times 10^9$ | $9.0 \times 10^{-1}$ |
| | 324 | 0.87 | 1 | $7.4 \times 10^{12}$ | $5.6 \times 10^1$ |
| | 390 | 1.12 | 0.5 | $1.0 \times 10^{13}$ | $6.6 \times 10^5$ |
| $KCaI_3$, 0.1% La | 120 | 0.17 | 113 | $7.3 \times 10^5$ | $9.5 \times 10^{-4}$ |
| | 164 | 0.26 | 39 | $5.4 \times 10^6$ | $4.1 \times 10^{-3}$ |
| | 196 | 0.29 | 47 | $1.9 \times 10^6$ | $4.4 \times 10^{-2}$ |
| | 222 | 0.35 | 33 | $3.2 \times 10^6$ | $2.1 \times 10^{-1}$ |
| | 250 | 0.40 | 163 | $2.8 \times 10^6$ | 1.7 |
| | 256 | 0.57 | 73 | $1.1 \times 10^{10}$ | $3.0 \times 10^{-1}$ |
| | 385 | 1.07 | 311 | $7.9 \times 10^{12}$ | $1.3 \times 10^5$ |
| | 423 | 1.20 | 64 | $1.2 \times 10^{13}$ | $7.6 \times 10^6$ |

From the TL experiments, it is not possible to directly identify the origin of an individual electron trap. Hence, the density functional calculations were employed to determine the type of intrinsic and external defects, and to compare the calculated thermal trapping depth and defect concentrations with the results derived from TL study.

Thermodynamic Boundary Conditions:

Applying the constraints on the relative chemical potentials and the formation enthalpies, the stability region of $KCaI_3$ is quite narrow. Thus, the relative chemical potential of K and Ca respectively can be solved under the I-rich ($\Delta\mu_I$=0 eV) and I-poor ($\Delta\mu_I$=−2.68 eV) limits.

Figure 9A:
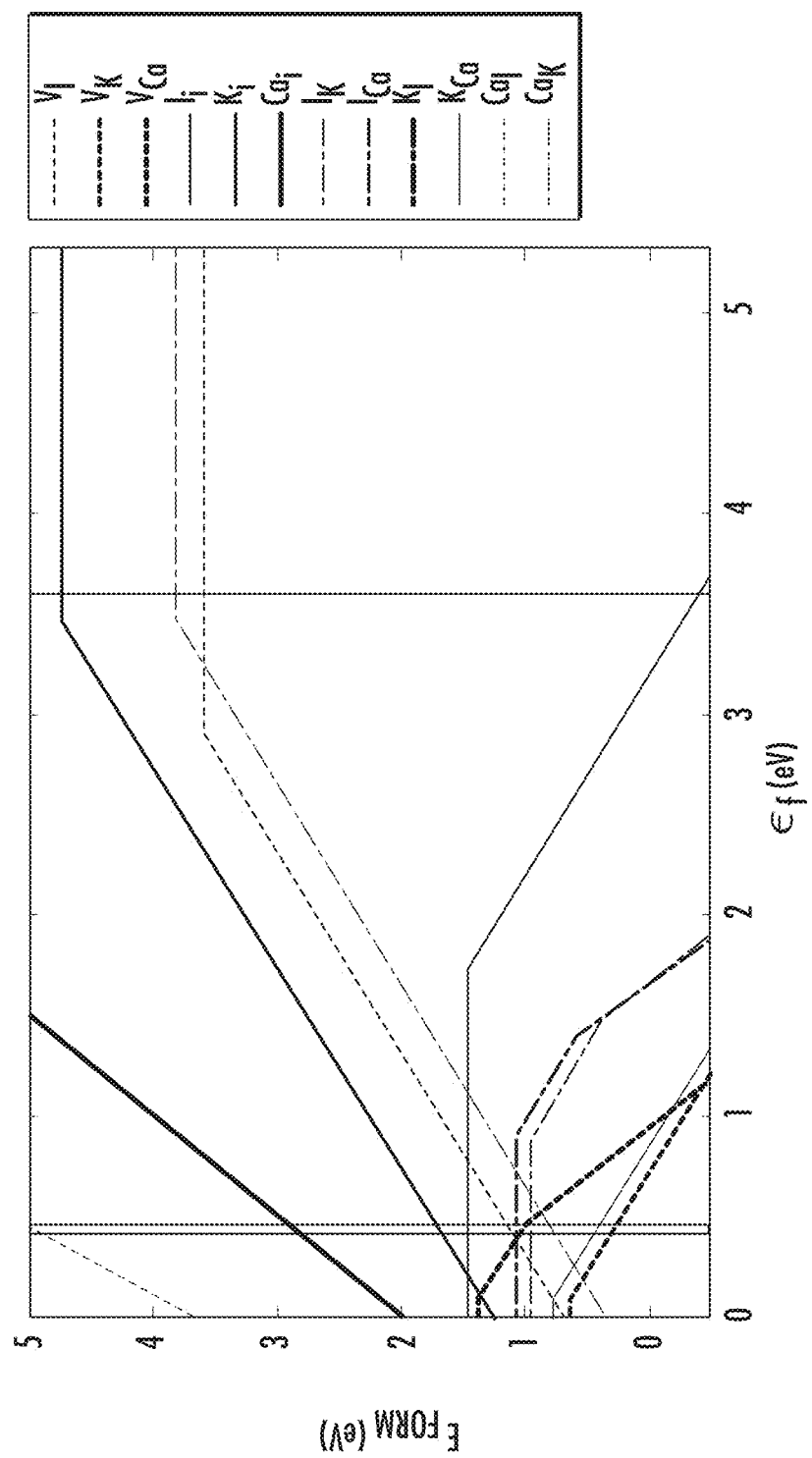
FIG. 9A is a graph showing the calculated formation energies with respect to electron chemical potential $\mu_e$ of intrinsic defects in potassium calcium triiodide ($KCaI_3$) under I-rich condition. The double vertical lines show the calculated $\mu_e$ constrained by charge neutrality condition. The types of defects shown include vacancies ($V_I$ (thin dotted line), $V_K$ (medium dotted line), and $V_{Ca}$ (thick dotted line)), interstitials ($I_i$ (thin solid line), $K_i$ (medium solid line), and $Ca_i$ (thick solid line)), and antisites ($I_K$ (thin dashed and dotted line), $I_{Ca}$ (medium dashed line), $K_I$ (thick dashed and dotted line), $K_{Ca}$ (fine solid line), $Ca_I$ (fine dotted line), and $Ca_K$ (fine dashed and dotted line) as listed in the legend. The area to the right of the single vertical line shows the data extended to the experimental band gap $E_G^{exp}$.
Figure 9B:
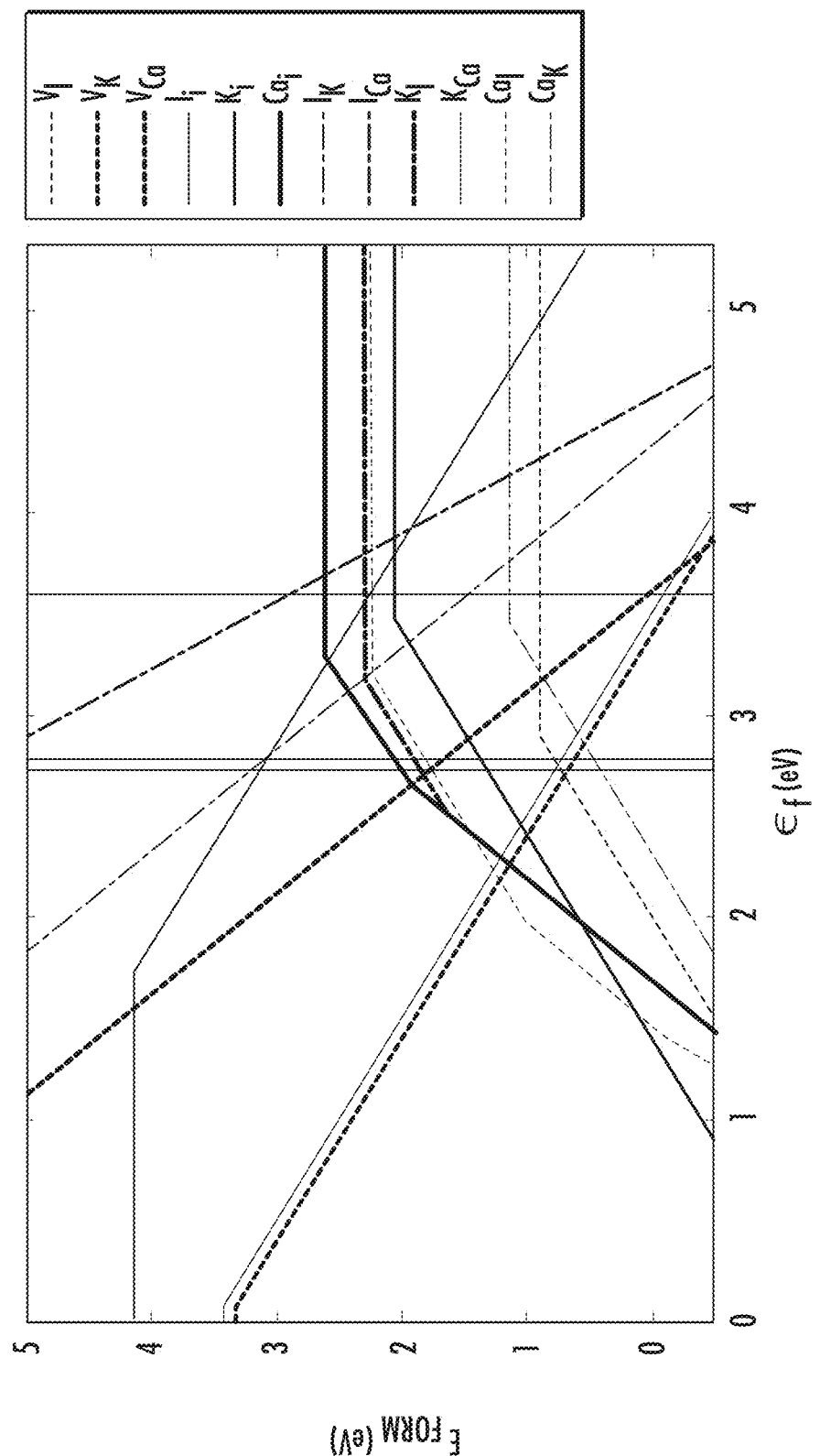
FIG. 9B is a graph showing the calculated formation energies with respect to electron chemical potential $\mu_e$ of intrinsic defects in potassium calcium triiodide ($KCaI_3$) under I-poor condition. The double vertical lines show the calculated $\mu_e$ constrained by charge neutrality condition. The types of defects shown include vacancies ($V_I$ (thin dotted line), $V_K$ (medium dotted line), and $V_{Ca}$ (thick dotted line)), interstitials ($I_i$ (thin solid line), $K_i$ (medium solid line), and $Ca_i$ (thick solid line)), and antisites ($I_K$ (thin dashed and dotted line), $I_{Ca}$ (medium dashed and dotted line), $K_I$ (thick dashed and dotted line), $K_{Ca}$ (fine solid line), $Ca_I$ (fine dotted line), and $Ca_K$ (fine dashed and dotted line) as listed in the legend. The area to the right of the single vertical line shows the data extended to the experimental band gap $E_G^{exp}$.

Intrinsic Defects:

All possible intrinsic defects (vacancies, interstitials and antisites) in $KCaI_3$ were considered. The calculated formation energies with respect to electron chemical potential $\mu_e$ under both I-rich and I-poor conditions are shown in FIGS. 9A and 9B. The $\mu_e$ ranges from zero to the calculated band gap $E_G^{DFT}$=3.66 eV and also the experimental band gap $E_G^{exp}$=5.32 eV (see Wu et al., Adv. Optical Mater., 4, 1518 (2016)), as shown in the gray area in FIGS. 9A and 9B. Although there are two distinguishable iodine sites at Wyckoff positions $I_1$-8f, $I_2$-4c. The calculated formation energies of the associated defects at $I_1$ and $I_2$ sites are only separated apart by 30 meV at most. Therefore, only the defects with lower formation energies are shown in FIGS. 9A and 9B for simplicity. However, defects related to both $I_1$ and $I_2$ sites are taken into consideration when the electron chemical potential was calculated based on the charge neutrality constraint. At the calculated $\mu_e$ illustrated by the vertical magenta line in FIGS. 9A and 9B, it can be observed that the most important electron traps under both I-rich and I-poor conditions are $Ca_K$ antisite and $V_I$ vacancies.

Codoping Element Related Substitution and Interstitial Defects:

From the ionic radius standpoint, $Y^{3+}$, $Gd^{3+}$, and $La^{3+}$ ions are expected to occupy the six-coordinated $Ca^{2+}$ sites in $KCaI_3$. To be more specific, comparing with the ionic radius of six-coordinated $Ca^{2+}$ ions, the ionic radius difference $\Delta R$, listed in Table 4, is 2% for $Y^{3+}$, 6.2% for $Gd^{3+}$, and 3.2% for $La^{3+}$ ions, respectively. In contrast, the difference is five to ten times larger in comparison to the ionic radius of the eight-coordinated $K^+$ ion. However, the site occupation of $Sc^{3+}$ ions is unable to be determined considering its large values of $\Delta R$, 25.5% for $Ca^{2+}$ substitution site and 42.4% for $K^+$ substitution site. Therefore, theoretical calculations were applied to clarify the site occupation of codopants by considering the formation energies.

TABLE 4

Effective ionic radii of host and codopant ions and the ionic radius differences.

|  | Ion | Ionic radius (pm) 6 CN[a] | 8 CN | $\Delta R$ (%)[b] $Ca^{2+}$ site | $K^+$ site |
|---|---|---|---|---|---|
| Host | $K^+$ | — | 151 | — | — |
|  | $Ca^{2+}$ | 100 | — | — | — |
| Codopant | $Sc^{3+}$ | 74.5 | 87 | 25.5 | 42.4 |
|  | $Y^{3+}$ | 102 | 114 | 2 | 24.5 |
|  | $Gd^{3+}$ | 93.8 | 105.3 | 6.2 | 30.3 |
|  | $La^{3+}$ | 103.2 | 116.0 | 3.2 | 23.2 |

Figure 10A:
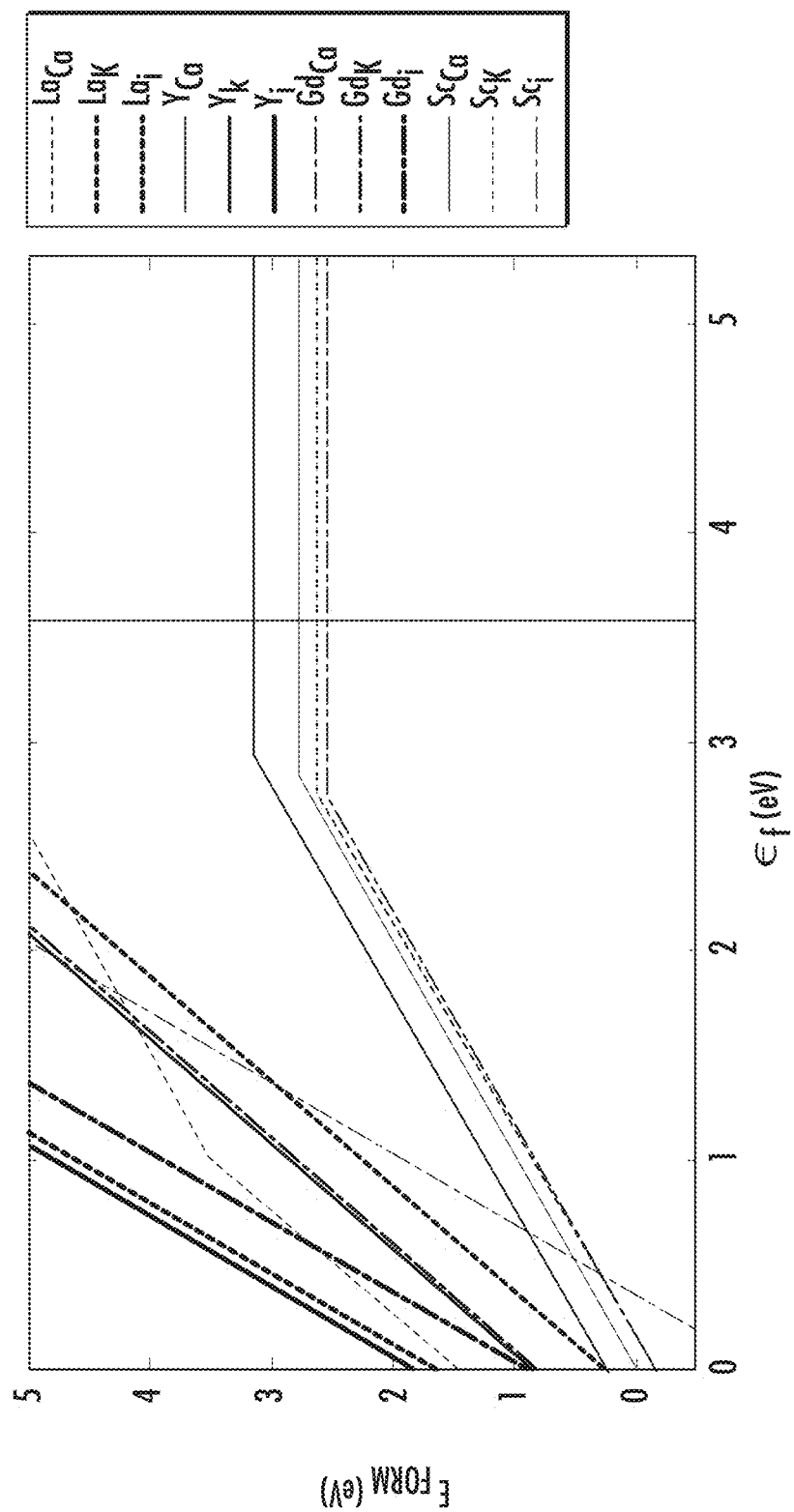
FIG. 10A is a graph showing the calculated formation energies with respect to electron chemical potential $\mu_e$ of substitutional $X_{Ca}$, $X_K$ and $X_i$ interstitial (X=lanthanum (La), yttrium (Y), gadolinium (Gd), or scandium (Sc)) in potassium calcium triiodide ($KCaI_3$) under I-rich condition. The types of defects shown include $La_{Ca}$ (thin dashed line), $La_K$ (medium dashed line), $La_I$ (thick dashed line), $Y_{Ca}$ (thin solid line), $Y_K$ (medium solid line), $Y_I$ (thick solid line), $Gd_{Ca}$ (thin dashed and dotted line), $Gd_K$ (medium dashed and dotted line), $Gd_I$ (thick dashed and dotted line), $Sc_{Ca}$ (fine solid line), $Sc_K$ (fine dashed line), and $Sc_I$ (fine dashed and dotted line). The area to the right of the vertical line shows the data extended to the experimental band gap $E_G^{exp}$.
Figure 10B:
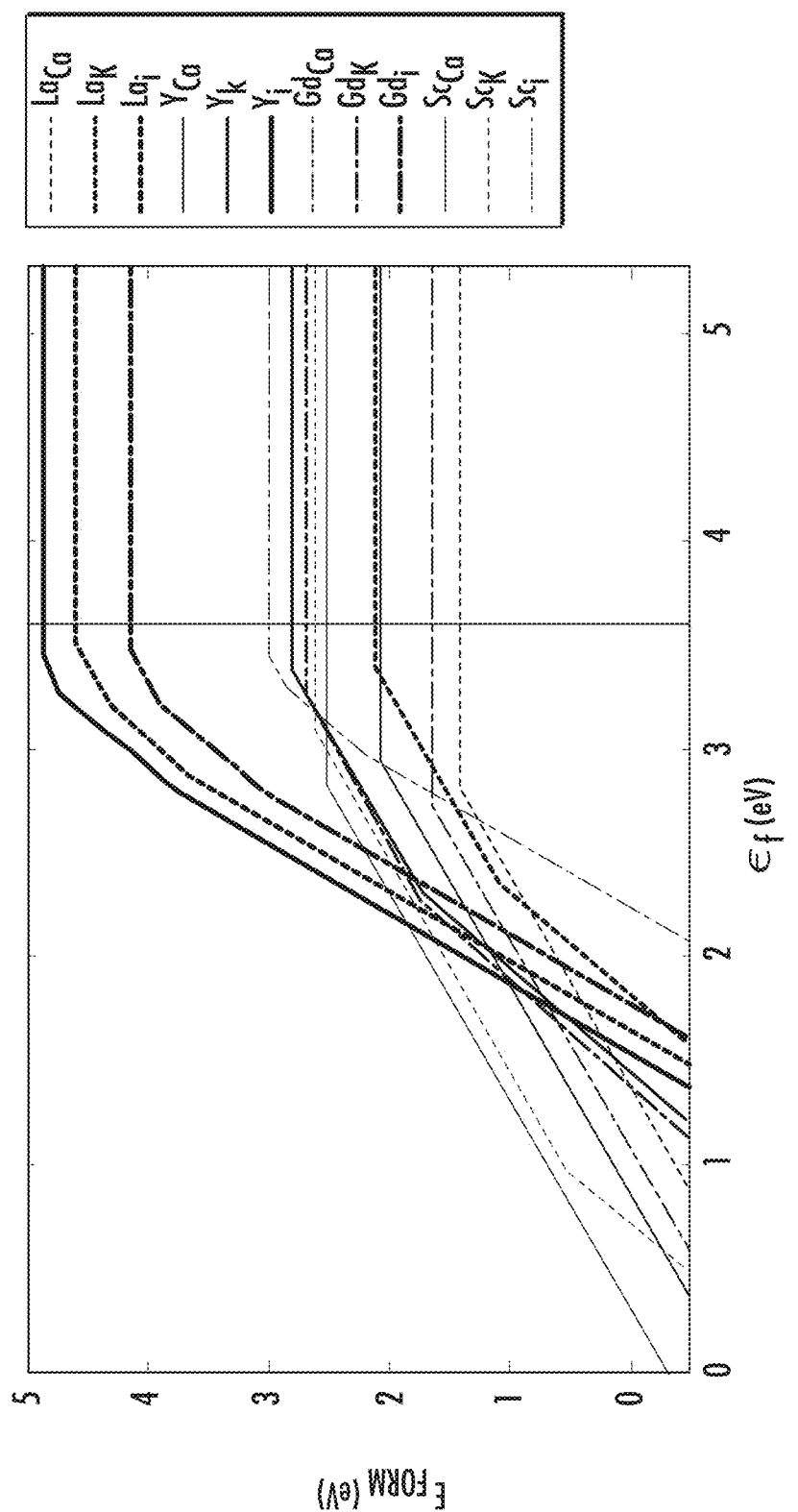
FIG. 10B is a graph showing the calculated formation energies with respect to electron chemical potential $\mu_e$ of substitutional $X_{Ca}$, $X_K$ and $X_i$ interstitial (X=lanthanum (La), yttrium (Y), gadolinium (Gd), or scandium (Sc)) in potassium calcium triiodide ($KCaI_3$) under I-poor condition. The types of defects shown include $La_{Ca}$ (thin dashed line), $La_K$ (medium dashed line), $La_I$ (thick dashed line), $Y_{Ca}$ (thin solid line), $Y_K$ (medium solid line), $Y_I$ (thick solid line), $Gd_{Ca}$ (thin dashed and dotted line), $Gd_K$ (medium dashed and dotted line), $Gd_I$ (thick dashed and dotted line), $Sc_{Ca}$ (fine solid line), $Sc_K$ (fine dashed line), and $Sc_I$ (fine dashed and dotted line). The area to the right of the vertical line shows the data extended to the experimental band gap $E_G^{exp}$.

[a]"CN" represents coordination number;
[b]$\Delta R = |R_{host} - R_{codopant}|/R_{host}$ The formation energies of $M_{Ca}$, $M_K$ substitution and $M_i$ interstitial where M=La, Y, Gd, Sc are shown in FIGS. 10A and 10B. Due to the significant ion radius mismatch between the $Sc^{3+}$ and $Ca^{2+}$ or $K^+$ ions, the formation energies of $Sc_{Ca}$ and $Sc_K$ substitutions are higher than the La/Y/Gd substitutions. On the other hand, $Sc_i$ interstitial is more energetically favorable than the interstitials formed by the other three codopants. To better understand this difference, the structures of $La_i^{3+}$ and $Sc_i^{3+}$ interstitials are illustrated in FIGS. 11A and 11B.

Figure 11A:
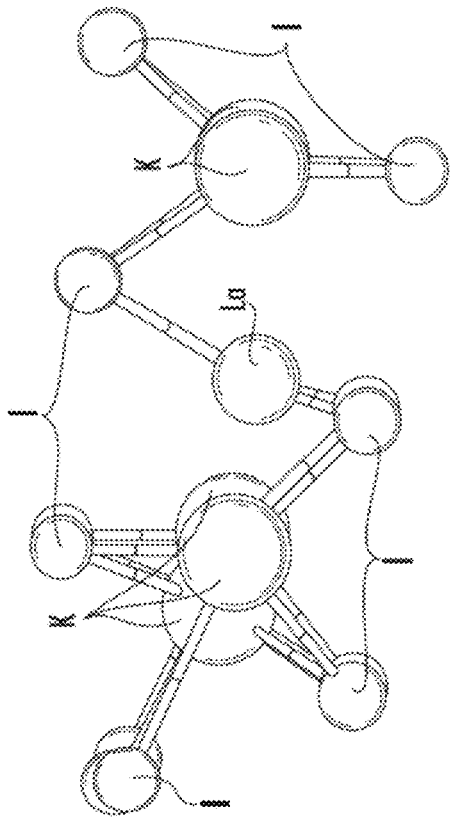
FIG. 11A is a schematic illustration showing a ball and stick model of the local crystal structure of a lanthanum (La) iodide (I) interstitial defect in a $La^{3+}$ codoped potassium calcium triiodide. The medium sphere represents a lanthanum atom, the small spheres represent iodide (I) atoms, and the large spheres represent potassium (K) atoms.
Figure 11B:
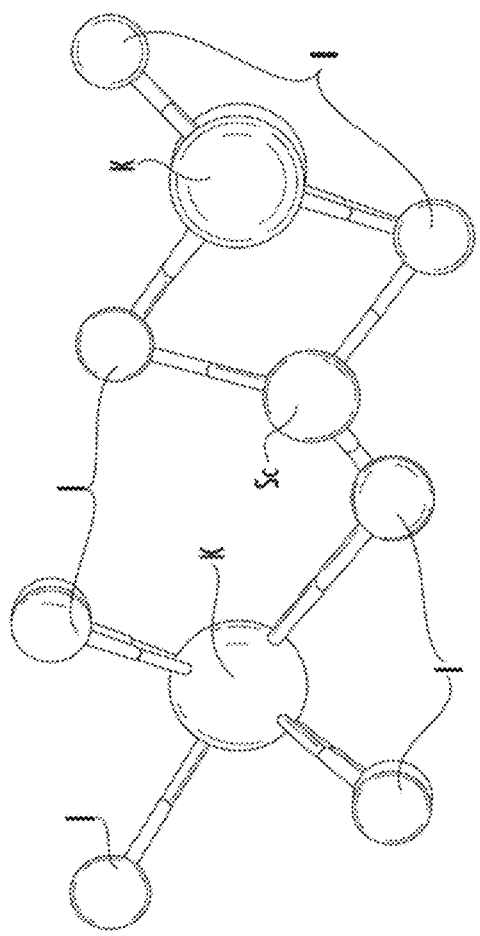
FIG. 11B is a schematic illustration showing a ball and stick model of the local crystal structure of a scandium (Sc) iodide (I) interstitial defect in a $Sc^{3+}$ codoped potassium calcium triiodide. The medium sphere represents a scandium atom, the small spheres represent iodide (I) atoms, and the large spheres represent potassium (K) atoms.

As shown in FIG. 11A, the $La_i^{3+}$ interstitial takes a "split form". The $La^{3+}$ ion pushes the adjacent $I^-$ and $K^+$ ions away and forms a nearly in-plane $C_{3v}$ local structure with its three neighboring $I^-$ ions. On the contrary, the $Sc_i^{3+}$ interstitial takes a "tetrahedral form". See FIG. 11B. The smaller $Sc^{3+}$ ion undergoes less significant structural reconstruction to form the interstitial, therefore, the energy cost is lower.

Codoping Element Related Complex Defects.

A relatively low concentration of codoping can have a large impact on the defect formation and hence the luminescent properties of the scintillators through the formation of complex defects. See Erhart et al., Phys. Rev. B, 91, 165206 (2015). Because all the substitution and interstitial defects introduced by the codoping elements are electron donors, it is reasonable to limit our study of the complex defects to those intrinsic defects forming acceptors. Due to the high formation energy of iodine interstitials and the fact that $M_i+V_{Ca/K}$ complexes are trivial, we concentrate our calculations on $M_{Ca/K}+V_{Ca/K}$ complex defects.

Figure 12A:
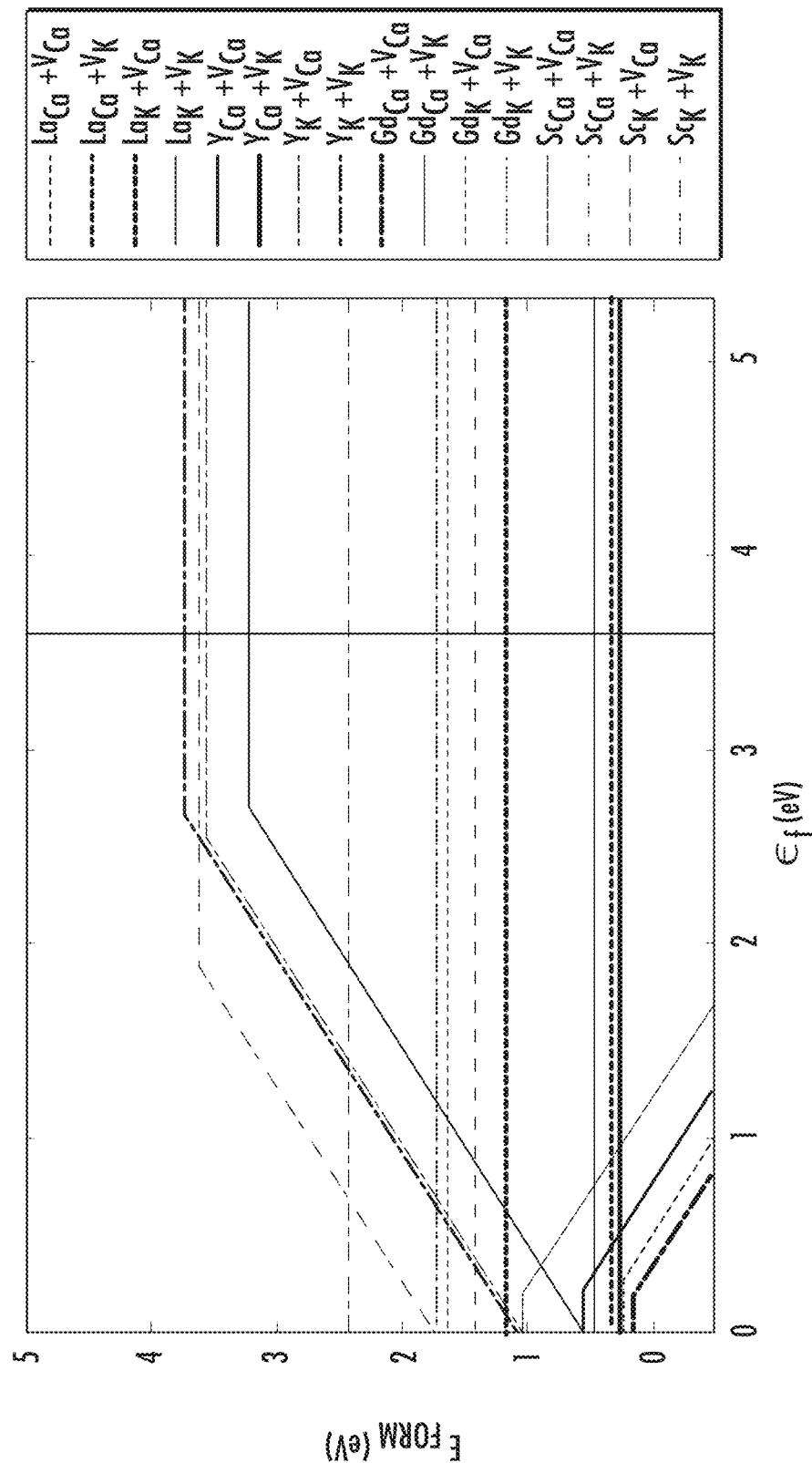
FIG. 12A is a graph showing the calculated formation energies with respect to electron chemical potential $\mu_e$ of complex defects formed by a codopant metal (M) calcium (Ca) or potassium (K) substitution ($M_{Ca/K}$) and a vacancy ($V_{Ca/K}$) in potassium calcium triiodide ($KCaI_3$) under I-rich condition, where M is lanthanum (La), yttrium (Y), gadolinium (Gd), or scandium (Sc). The defects are shown as follows: $La_{Ca}+V_{Ca}$ (thin dashed line), $La_{Ca}+V_K$ (medium dashed line) $La_K+V_{Ca}$ (thick dashed line), $La_K+V_K$ (thin solid line), $Y_{Ca}+V_{Ca}$ (medium solid line), $Y_{Ca}+V_K$ (thick solid line) $Y_K+V_{Ca}$ (thin dashed and dotted line), $Y_K+V_K$ (medium dashed and dotted line), $Gd_{Ca}+V_{Ca}$ (thick dashed and dotted line), $Gd_{Ca}+V_K$ (fine solid line) $Gd_K+V_{Ca}$ (fine short dashed line), $Gd_K+V_K$ (fine dashed and dotted line), $Sc_{Ca}+V_{Ca}$ (fine closely dashed line), $Sc_{Ca}+V_K$ (fine dashed line with greater spaces between dashes) $Sc_K+V_{Ca}$ (fine dashed and double dotted line), and $Sc_K+V_K$ (fine dashed and dotted line with wider spacing). The area to the right of the vertical line shows the data extended to the experimental band gap $E_G^{exp}$.
Figure 12B:
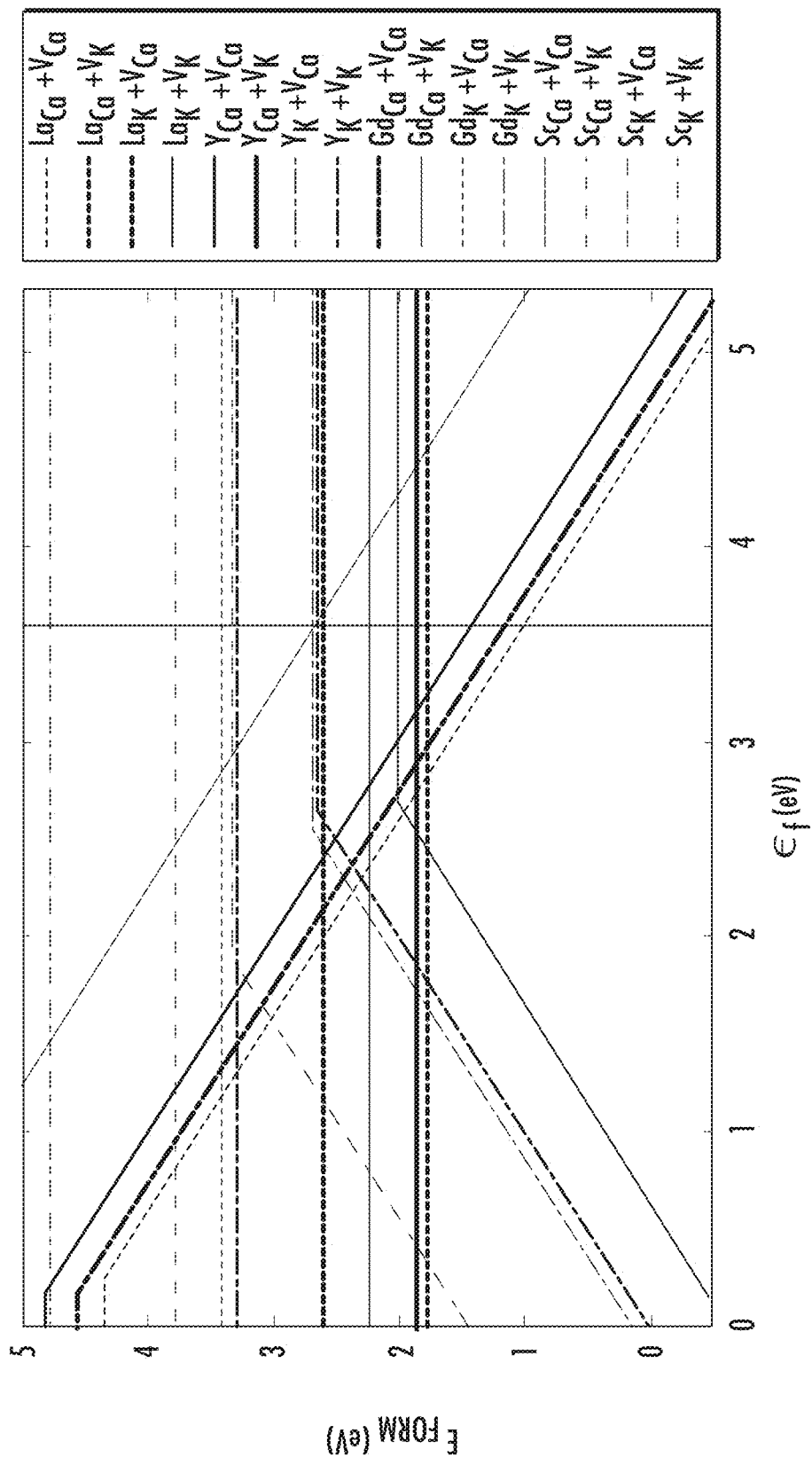
FIG. 12B is a graph showing the calculated formation energies with respect to electron chemical potential $\mu_e$ of complex defects formed by a codopant metal (M) calcium (Ca) or potassium (K) substitution ($M_{Ca/K}$) and a vacancy ($V_{Ca/K}$) in potassium calcium triiodide ($KCaI_3$) under I-poor condition, where M is lanthanum (La), yttrium (Y), gadolinium (Gd), or scandium (Sc). The defects are shown as follows: $La_{Ca}+V_{Ca}$ (thin dashed line), $La_{Ca}+V_K$ (medium dashed line) $La_K+V_{Ca}$ (thick dashed line), $La_K+V_K$ (thin solid line), $Y_{Ca}+V_{Ca}$ (medium solid line), $Y_{Ca}+V_K$ (thick solid line) $Y_K+V_{Ca}$ (thin dashed and dotted line), $Y_K+V_K$ (medium dashed and dotted line), $Gd_{Ca}+V_{Ca}$ (thick dashed and dotted line), $Gd_{Ca}+V_K$ (fine solid line) $Gd_K+V_{Ca}$ (fine dashed line), $Gd_K+V_K$ (fine dashed and dotted line), $Sc_{Ca}+V_{C}a$ (fine closely dashed line), $Sc_{Ca}+V_K$ (fine dashed line with greater spacing between dashes) $Sc_K+V_{Ca}$ (fine dashed and double dotted line), and $Sc_K+V_K$ (fine dashed and dotted line with wider spacing). The area to the right of the vertical line shows the data extended to the experimental band gap $E_G^{exp}$.

As shown in FIGS. 12A and 12B, the complex defects formed by $M_{Ca/K}+V_{Ca/K}$ for M=La, Y, Gd can be very energetically favorable, especially under the I-rich limit. See FIG. 12A. It is worth noting that close to the I-rich limit, the dominant complex $M_{Ca}+V_Ca$ is an acceptor itself. If the formation energy of such a complex is so low (under this condition) that almost all the codoping ions form such structures under thermodynamic equilibrium, the codoping will act counter-intuitively in terms of controlling the Fermi-level and the charged defect concentration of the system. Under the I-poor limit (see FIG. 12B), the formation energies of all types of the complex defects are higher due to the difficulty of forming cation vacancies under this condition. For $Sc^{3+}$, the complex defects are much less possible to form compared to the other three codopants, due to the high formation energies of forming substitutional $Sc_{Ca/K}$. Therefore, without being bound to any one theory, it is believed that most of the $Sc^{3+}$ dopants are likely to form $Sc_i$ interstitials based on the calculation of the formation energies. Since $Sc_i$ tend to exist as $Sc_i^{3+}$, which acts as a donor providing three extra electrons to the system per incorporated Sc, Sc codoping will push the Fermi level of the system closer to the CBM, favoring other acceptor-like defects to form and suppressing other donor-like defects. The quantitative effect of controlling the concentration of other charged defects is discussed further hereinbelow.

Figure 13:
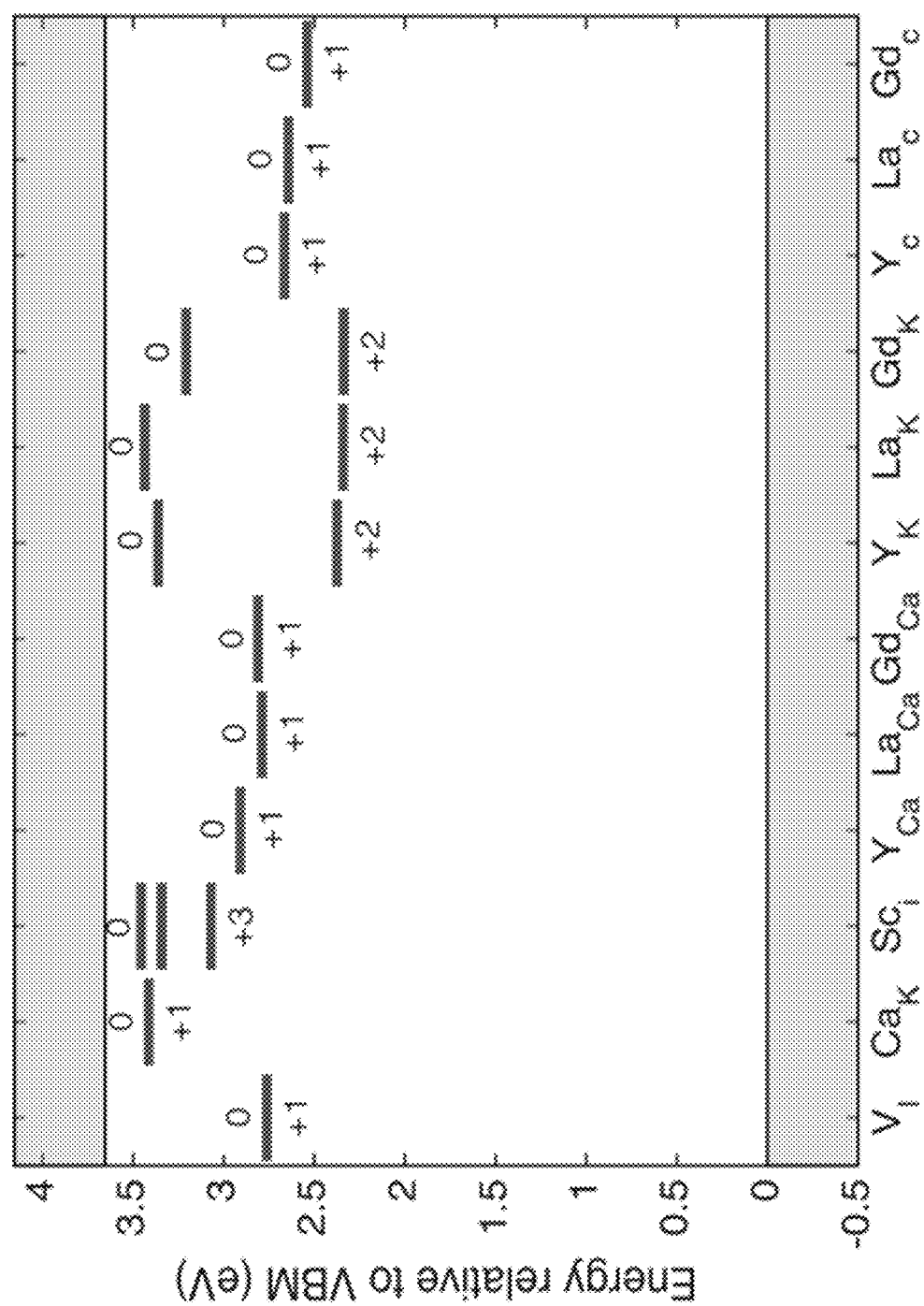
FIG. 13 is a graph showing the thermodynamic equilibrium transition energies calculated for electron traps with low formation energies. The trap designations of the x axis include: $V_I$, which refers to the iodide (I) vacancy; $Ca_K$, which refers to a calcium (Ca) potassium (K) substitution; $M_{I/K/Ca}$, which refers to a codopant metal (M) iodide (I), potassium (K) or calcium (Ca) substitution; and $\mu_c$, which refers to the defect complex formed by the codopant metal (M) potassium (K) substitution ($M_K$) and potassium vacancy ($V_K$) (i.e., $M_K+V_K$). M is yttrium (Y), lanthanum (La), gadolinium (Gd) or scandium (Sc). The energy is expressed in electronvolts (eV) relative to valence bond maximum (VBM).

Thermal Trapping Depth of Important Electron Traps Estimated by Theoretical Calculation:

Electron traps are believed to be the leading factor of the afterglow of the presently disclosed materials. FIG. 13 shows the thermodynamic equilibrium transition energy of electron traps with low formation energies. Thermal trapping depth is defined herein as the energy difference between the current thermodynamic transition energy to the next transition energy level or the DFT calculated CBM.

Among the intrinsic defects, $Ca_K$ is a shallow electron trap with a thermal trapping depth of 0.24 eV. Such a shallow trap can only contribute to the low temperature peaks in the thermal stimulated spectra. Iodine vacancies, on the other hand, provide a relatively deep electron trap with a thermal trapping depth of 0.89 eV. As mentioned in the TL analysis section, a deep electron trap with a depth of ~1 eV is thought to be responsible for the afterglow observed. Therefore, it is reasonable to believe that the iodine vacancies are the main causes of the afterglow in $KCaI_3$:$Eu^{2+}$.

The M=Y, La, Gd codoping introduces a series of deep electron traps, and both $M_{Ca}$ and $M_K$ substitutions and the $M_K+V_K$ complexes produce electron traps with depths ranging from 0.74 eV to 1.12 eV. These newly introduced defects can be added up and associated with the broadened bands over the 300 K regions in the TL glow curves. In fact, the newly formed deep electron traps were indeed found in these codoped samples, such as the trap with a depth of 1.2 eV corresponding to the TL peak at 423 K in the $La^{3+}$ codoped sample.

Although the $Sc_i$ interstitial defect is very likely to form based on the present calculations of the formation energies, the electron thermal trapping depth is quite low as the deepest transition (+3/+2→+2/+1) is only 0.27 eV. As a conclusion, it appears that $Sc^{3+}$ codoping does not introduce any new deep electron traps to the system.

Defect Concentrations:

A quantitative study the movement of the electron Fermi level and the change in the concentration of the important electron traps in the system is now described. The position of the Fermi level is solved after all the codopant $M^{3+}$ (M=La, Y, Gd, Sc) related defects are presented in the crystal based on the charge neutrality constraint, and the calculated Fermi levels with and without codoping for both I-rich and I-poor limits are listed in Table 5 and Table 6, below. Since the effects of La, Y, and Gd codoping are similar, only the comparison between La and Sc codoping is shown.

TABLE 5

Calculated electron chemical potential ($\mu_e$) shift and concentration of electron traps under I-rich conditions for non-codoped (None) and 0.1% or 0.5% lanthanum (La) or scandium (Sc) codoped materials, assuming system thermodynamic equilibrium at 797 K. Sc codoping moves the $\mu_e$ toward CBM and La codoping moves the $\mu_e$ toward the VBM.

|  | None | 0.1% Sc | 0.5% Sc | 0.1% La | 0.5% La |
|---|---|---|---|---|---|
| $\mu_e$ (eV) | 0.437 | 0.464 | 0.499 | 0.348 | 0.277 |
| c $V_I$ (cm$^{-3}$) | $1.18 \times 10^{15}$ | $6.43 \times 10^{14}$ | $1.64 \times 10^{14}$ | $4.61 \times 10^{15}$ | $1.33 \times 10^{16}$ |
| c $Sc_I$ (cm$^{-3}$) | 0 | $3.90 \times 10^{18}$ | $1.69 \times 10^{19}$ | 0 | 0 |
| c $La_{Ca}$ (cm$^{-3}$) | 0 | 0 | 0 | $1.03 \times 10^{18}$ | $6.77 \times 10^{18}$ |
| c $La_K$ (cm$^{-3}$) | 0 | 0 | 0 | $1.53 \times 10^{14}$ | $7.68 \times 10^{14}$ |
| C $La_K + V_K$ (cm$^{-3}$) | 0 | 0 | 0 | $5.52 \times 10^{13}$ | $7.07 \times 10^{14}$ |

TABLE 6

Calculated electron chemical potential ($\mu_e$) shift and concentration of electron traps under I-poor conditions for non-codoped (None) and 0.1% or 0.5% lanthanum (La) or scandium (Sc) codoped materials, assuming system thermodynamic equilibrium at 797 K. Sc codoping moves the $\mu_e$ toward CBM and La codoping moves the $\mu_e$ toward the VBM.

|  | None | 0.1% Sc | 0.5% Sc | 0.1% La | 0.5% La |
|---|---|---|---|---|---|
| $\mu_e$ (eV) | 2.753 | 2.857 | 3.056 | 2.737 | 2.695 |
| c $V_I$ (cm$^{-3}$) | $2.58 \times 10^{17}$ | $3.84 \times 10^{16}$ | $3.04 \times 10^{15}$ | $2.99 \times 10^{17}$ | $5.44 \times 10^{17}$ |
| c $Sc_I$ (cm$^{-3}$) | 0 | $4.70 \times 10^{18}$ | $2.10 \times 10^{19}$ | 0 | 0 |
| c $La_{Ca}$ (cm$^{-3}$) | 0 | 0 | 0 | $1.64 \times 10^{18}$ | $8.22 \times 10^{18}$ |
| c $La_K$ (cm$^{-3}$) | 0 | 0 | 0 | $8.39 \times 10^{17}$ | $4.19 \times 10^{18}$ |
| C $La_K + V_K$ (cm$^{-3}$) | 0 | 0 | 0 | $2.10 \times 10^{14}$ | $7.85 \times 10^{14}$ |

From Tables 5 and 6, it appears that $Sc_i$ is the most important defect in the case of Sc codoping, in which at least 71% of codoped Sc sites form $Sc_i$ under all conditions. This makes the overall Sc codoping donor-like and shifts the Fermi level of the system toward the CBM, which reduces the concentration of other electron traps such as $V_I$ vacancies by orders of magnitude within both the I-rich and I-poor limits. In addition, the $Sc_i$ interstitials primarily formed have shallow thermal electron trapping depths.

In contrast, La (as well as Y and Gd) codoping shifts the Fermi level of the system toward the VBM due to the low formation energies of $La_{Ca}+V_{Ca}$ complexes, which favors the formation of intrinsic electron traps. Additionally, La/Y/Gd codoping also introduces new deep electron traps (mainly substitutional $M_{Ca}$) with remarkably high concentration as shown in Tables 5 and 6. The increased concentration of deep electron traps is expected to broaden the thermoluminescence bands, and to enhance the afterglow of the crystal. This conclusion is consistent with the TL analysis.

Thus, without wishing to be bound by any particular theory of operation, it appears that by intentionally codoping cations with smaller ionic radius with respect to the host ions to preferentially form the positive charged interstitials, the afterglow originated from deep electron traps, such as iodine vacancies, can be reduced or suppressed. To further validate this defect-engineering strategy, another codopant ion with a similar ionic radius to that of $Sc^{3+}$ was selected. Moreover, to exclude a possible situation resulting from aliovalent codoping that the selected codopant ions prefer to occupy at substitution sites and form positive charged centers, which might play the same role as positive charged interstitials, an isovalent codopant was selected. Thus, $Mg^{2+}$ ion was chosen as a codopant ion because it has the same valence state with the host ion $Ca^{2+}$ and a close ionic radius with $Sc^{3+}$ (72 pm for $Mg^{2+}$ vs 74.5 pm for $Sc^{3+}$ under 6 coordination number).

Figure 14A:
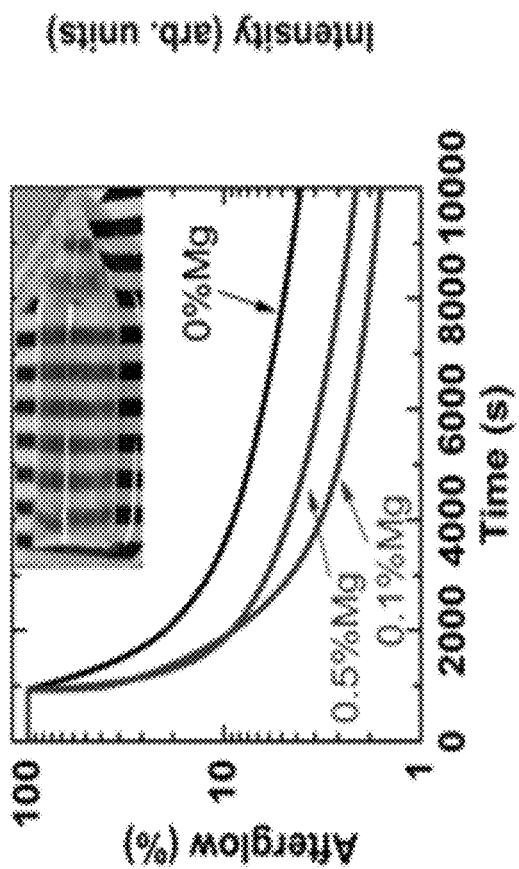
FIG. 14A is a graph showing the X-ray induced afterglow profile (afterglow percent (%) versus time (seconds (s)) of noncodoped europium doped potassium calcium triiodide ($KCaI_3$:$Eu^{2+}$) and magnesium ($Mg^{2+}$) codoped $KCaI_3$:$Eu^{2+}$ single crystals. The afterglow profile for a noncodoped crystal is shown with the line marked 0% Mg. The afterglow profile of a crystal codoped with 0.1 mole percent (%) magnesium is shown with the line marked 0.1% Mg, and the afterglow profile of a crystal codoped with 0.5 mole % magnesium is shown with the line marked 0.5% Mg. The inset is a photograph of an as-grown Mg codoped $KCaI_3$:$Eu^{2+}$ ingot.
Figure 14B:
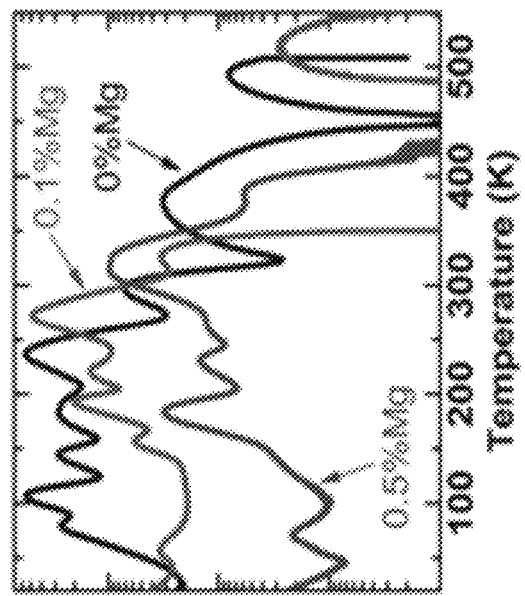
FIG. 14B is a graph showing the thermoluminescence (TL) glow curves (intensity (in arbitrary (arb.) units) versus temperature (in Kelvin (K)) of potassium calcium triiodide ($KCaI_3$) single crystals doped with europium ions ($Eu^{2+}$) and codoped with 0.1 mole percent (%) magnesium ions (0.1% Mg) or 0.5 mole % magnesium ions (0.5% Mg). The TL glow curve of noncodoped $KCaI_3$:$Eu^{2+}$ is shown for comparison.
Figure 14C:
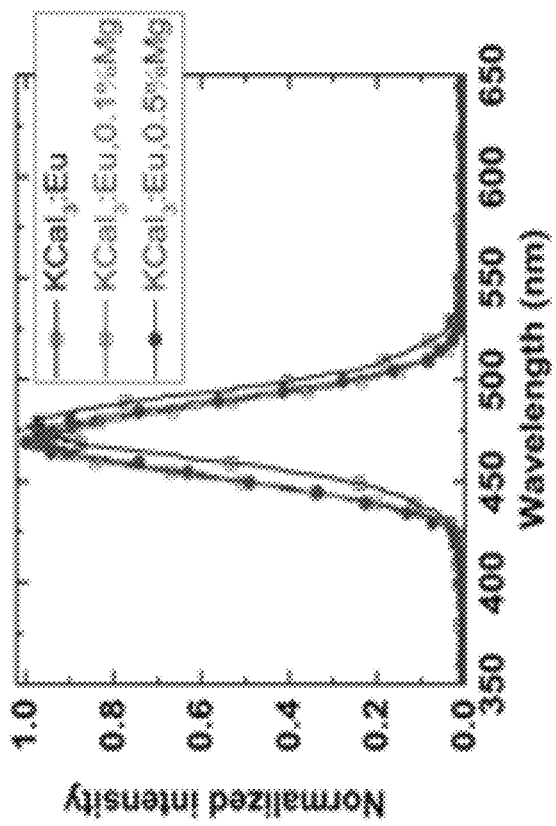
FIG. 14C is a graph showing the normalized radioluminescence (RL) spectra (normalized intensity versus wavelength in nanometers (nm)) of potassium calcium triiodide ($KCaI_3$) doped with europium ions ($Eu^{2+}$) and codoped with 0.1 mole percent (%) magnesium ions ($KCaI_3$:Eu,0.1% Mg, grey line with unfilled squares) or 0.5 mole % magnesium ions ($KCaI_3$:Eu0.5% Mg, line with filled circles). The RL spectra of noncodoped $KCaI_3$:$Eu^{2+}$ is shown for comparison (black line with unfilled squares).
Figure 14D:
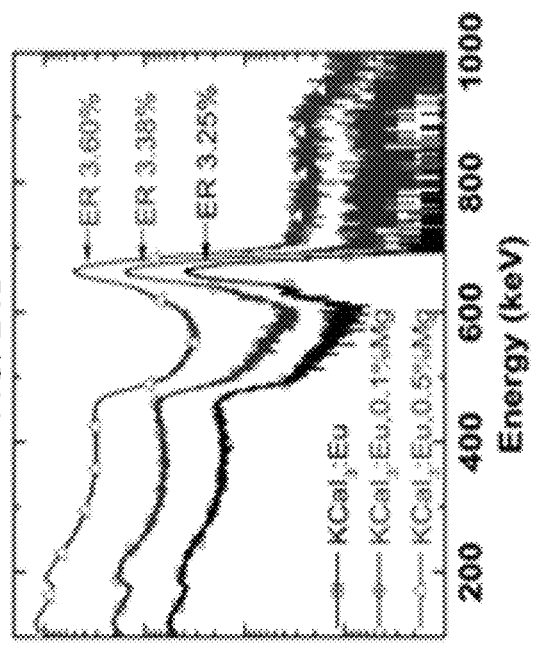
FIG. 14D is a graph showing the pulse height spectra (counts (in arbitrary (arb.) units) versus energy (in kiloelectronvolts (keV))) of potassium calcium triiodide ($KCaI_3$) doped with europium ions ($Eu^{2+}$) and codoped with 0.1 mole percent (%) magnesium ions ($KCaI_3$:Eu,0.1% Mg, line with unfilled diamonds) or 0.5 mole % magnesium ions ($KCaI_3$:Eu0.5% Mg, line with unfilled triangles) under irradiation with a cesium 137 ($Ce^{137}$) source. The pulse height spectra of noncodoped $KCaI_3$:$Eu^{2+}$ is shown for comparison (line with unfilled squares). Energy resolution (ER) at 662 keV was 3.25% for the noncodoped sample, 3.38% for the 0.1% Mg codoped sample, and 3.60% for the 0.5% codoped sample.

High quality $Mg^{2+}$ codoped $KCaI_3:Eu^{2+}$ single crystals were grown by the Bridgman method. The as-grown codoped ingot is shown in the inset of FIG. 14A. Typical sample size is 5 mm×5 mm×5 mm. As observed in FIG. 14A, the afterglow level of $KCaI_3:Eu^{2+}$ is reduced by three-folds plus throughout the entire time period after $Mg^{2+}$ codoping. TL results shown in FIG. 14B indicate that the afterglow suppression should be related to the reduction of the deep traps corresponding the TL peaks above 350 K. These results confirm the validity of the model proposed herein because only the interstitial $Mg^{2+}_i$ can effectively suppress the formation of iodine vacancies, and then lead to a reduced afterglow, which cannot be achieved by the electrically neutral substitution $Mg_{Ca}$. Furthermore, in RL spectra shown in FIG. 14C, the blueshift of $Eu^{2+}$ 5d-4f emission of $Mg^{2+}$ codoped samples is consistent with that observed in $Sc^{3+}$ codoped samples. Without being bound to any one theory, the blueshift is interpreted by a perturbation of $Eu^{2+}$ emission centers via the surrounding $Sc^{3+}_i$ or $Mg^{2+}_i$. As presented in pulse height spectra shown in FIG. 14D, the energy resolution at 662 keV slightly deteriorates from 3.25% for noncodoped sample, to 3.38% for 0.1 mol % $Mg^{2+}$ codoped sample, and then to 3.6% for 0.5 mol % $Mg^{2+}$ codoped sample.

Summary:

High quality $M^{3+}$ (M=Sc, Y, Gd, or La) codoped $KCaI_3$: $Eu^{2+}$ single crystals were grown by the Bridgman method.

Sc$^{3+}$ codoping has beneficial effects on scintillation decay time and afterglow. More particularly, the scintillation decay time is shortened by tens to hundreds of ns, and the afterglow is suppressed by 1-2 orders of magnitude. For low-concentration Sc$^{3+}$ doping, light yield of ~57,000 photons/MeV and energy resolution of ~3.4% at 662 keV can be maintained. Y$^{3+}$, Gd$^{3+}$, or La$^{3+}$ codoping can also accelerate the scintillation decay time by tens of ns, but at the same time can enhance the afterglow intensity. It was found that higher codoping concentrations can deteriorate light yield and energy resolution.

The main electron traps under both I-rich and I-poor conditions in the KCaI$_3$ system are Ca$_K$ antisites (as shallow electron traps) and iodine vacancies (as deep electron traps). The iodine vacancies with a thermal trapping depth of about 1 eV are believed to be responsible for the afterglow observed at room temperature in noncodoped KCaI$_3$:Eu$^{2+}$.

Without being bound to any one theory, Sc$_i$ is an important defect in the case of Sc codoping. The afterglow suppression found in Sc codoping can be because: i) the donor-like Sc$_i$ can shift the Fermi level of the system toward the CBM, which reduces the concentration of other electron traps such as V$_I$ vacancies by orders of magnitude; ii) the primarily formed Sc$_i$ interstitials are shallow electron traps, and hence can have a fast electron detrapping rate.

The prolonged afterglow at room temperature in La, Y, or Gd codoped samples was caused by two factors: i) La (similarly Y and Gd) codoping shifts the Fermi level of the system toward the VBM due to the low formation energies of La$_{Ca}$+V$_{Ca}$ complexes, which favors the formation of intrinsic electron traps such as iodine vacancies; ii) La/Y/Gd codoping introduces new deep electron traps. These deep traps can also be responsible for the reduced light yield.

A successful afterglow suppression achieved in isovalent Mg$^{2+}$ codoped samples supports the belief that codoping a cation with a smaller ionic radius to intentionally form the positive charged interstitial can reduce the formation of halogen vacancies acting as deep electron traps.

Based on the results described herein, it is believed that the presently disclosed cooping strategy can be extended to other high performing scintillators in the perovskite ABX$_3$ family, particularly when the crystal structure of the host can accommodate the cation codopant ions into interstitial sites, which can perform similarly to the Sc$^{3+}$ or Mg$^{2+}$ cooping described herein. The presently disclosed subject matter provides an engineering approach for afterglow suppression that would be particularly useful in the design of scintillator materials for medical imaging applications.

Example 5

Zirconium Codoping

The vertical Bridgman technique was used to grow 12 mm diameter 0, 0.03 and 0.5 mol % Zr$^{4+}$ codoped K(Ca$_{0.97}$Eu$_{0.03}$)I$_3$ crystals. The codopant concentrations given refer to the initial starting melt, and calculations are based on the assumption that the codopants substituted for Ca based on atomic-size matching. High-purity anhydrous KI, CaI$_2$ and EuI$_2$ beads (99.999%) and ZrI$_4$ (99.95%) from APL Engineered Materials Inc. (Urbana, Ill., United States of America) were used. The crystal growth details are as previously described. See Lindsey et al., Opt. Mater., 48, 1 (2015). The as-grown crystals are transparent and crack-free. The typical size of the samples is about 5 mm×5 mm×5 mm.

Figure 19:
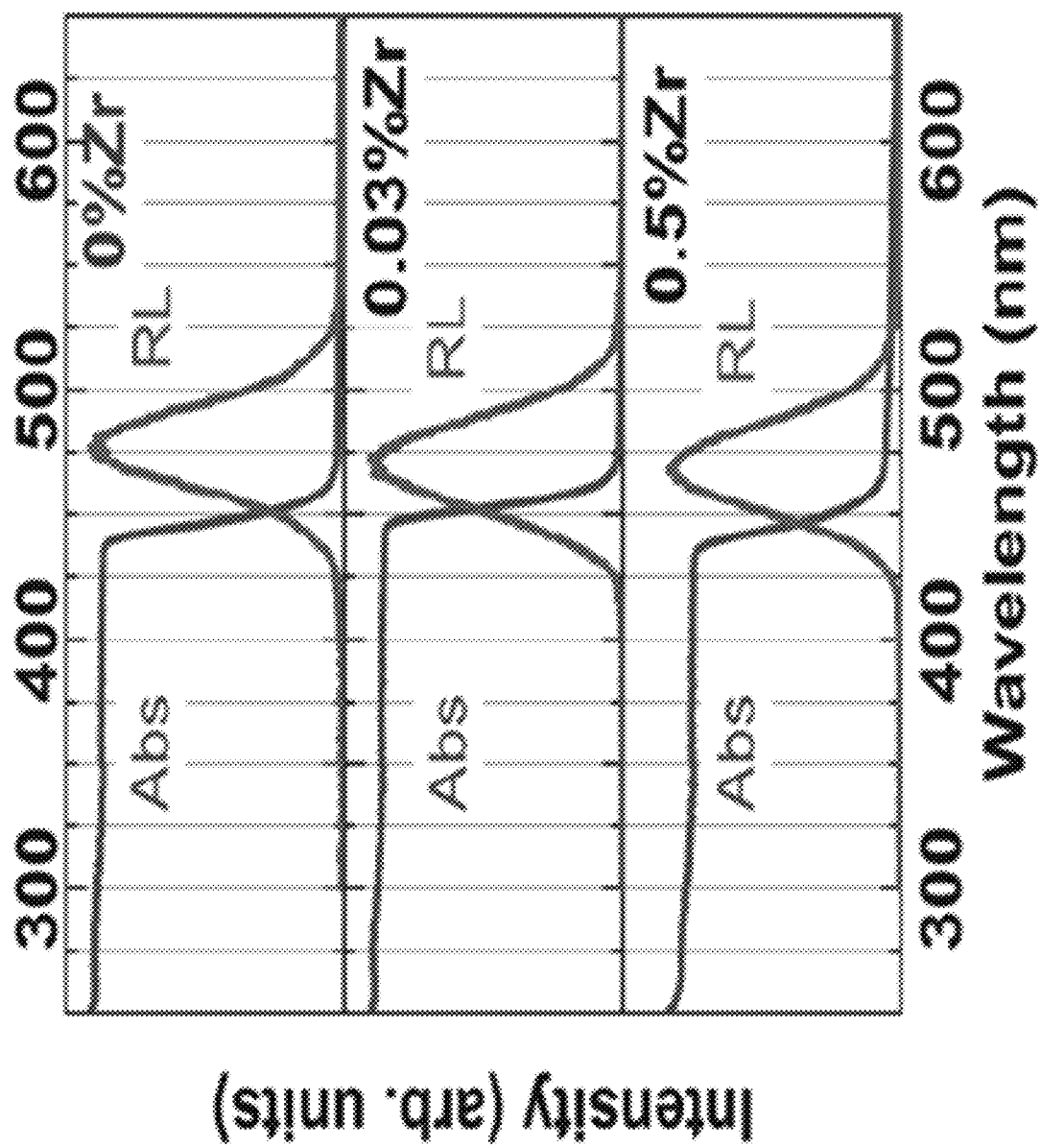
FIG. 19 is a set of graphs showing the optical absorption (Abs) and radioluminescence (RL) spectra (intensity (in arbitrary (arb.) units) versus wavelength (in nanometers (nm)) of (top) noncodoped europium doped potassium calcium triiodide ($KCaI_3:Eu^{2+}$) single crystals (0% Zr); (middle) 0.03 mole percent (mol %) zirconium codoped $KCaI_3:Eu^{2+}$ single crystals (0.03% Zr); and (bottom) 0.5 mol % zirconium codoped $KCaI_3:Eu^{2+}$ single crystals (0.5% Zr).

Optical absorption spectra were measured with a Varian Cary 5000 UV-VIS-NIR spectrophotometer (Varian Inc., Palo Alto, Calif., United States of America) in the 350-650 nm range. See FIG. 19. Photoluminescence (PL) decay was measured on the HORIBA Jobin Yvon Fluorolog-3 spectrofluorometer (Horiba, Ltd., Kyoto, Japan) using a time-correlated-single-photon counting module. HORIBA Jobin Yvon NanoLEDs (pulsed light-emitting diodes) (Horiba, Ltd., Kyoto, Japan) were used as the excitation source. The duration of the light pulse was shorter than 2 ns. Scintillation decay times were acquired with an Agilent DSO6104A digital oscilloscope (Agilent Technologies, Santa Clara, Calif., United States of America) in single shot mode under $^{137}$Cs source irradiation. The measurement setups for X-ray excited radioluminescence (RL), afterglow, absolute light yield, energy resolution, non-proportionality (nPR), and thermoluminescence (TL) were as described above in Example 2. See also, Wu et al., Adv. Optical Mater., 4, 1518 (2016).

Figure 16B:
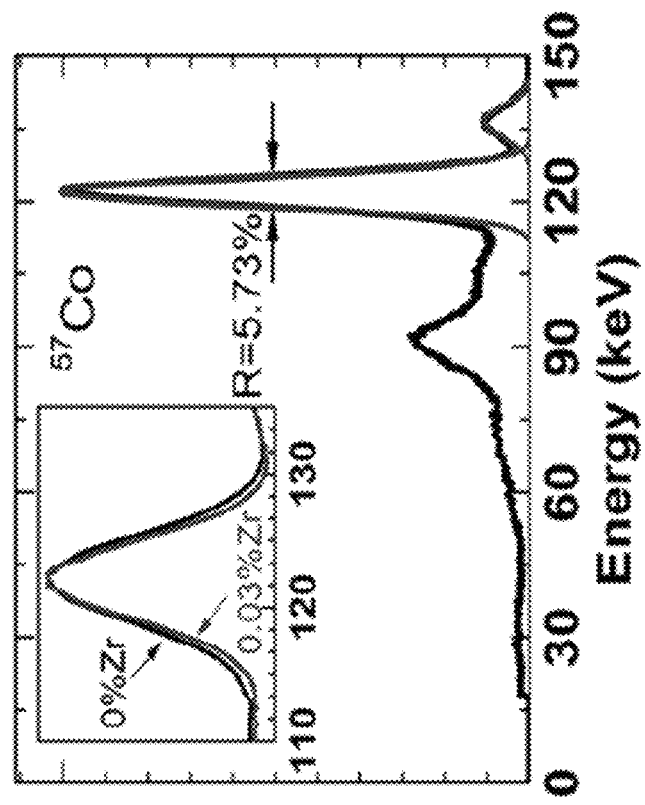
FIG. 16B is a graph showing the pulse height spectra of europium doped potassium calcium triiodide single crystals codoped with 0.03 mole percent (%) zirconium ($KCaI_3$:$Eu^{2+}$,0.03% $Zr^{4+}$) under irradiation from a cobalt 57 source ($^{57}Co$). Counts are provided in arbitrary units (arb. units). The energy resolution (ER) at 122 kiloelectronvolts (keV) is 5.73%. The inset graph shows the comparison between noncodoped and 0.03 mole % codoped samples.
Figure 16A:
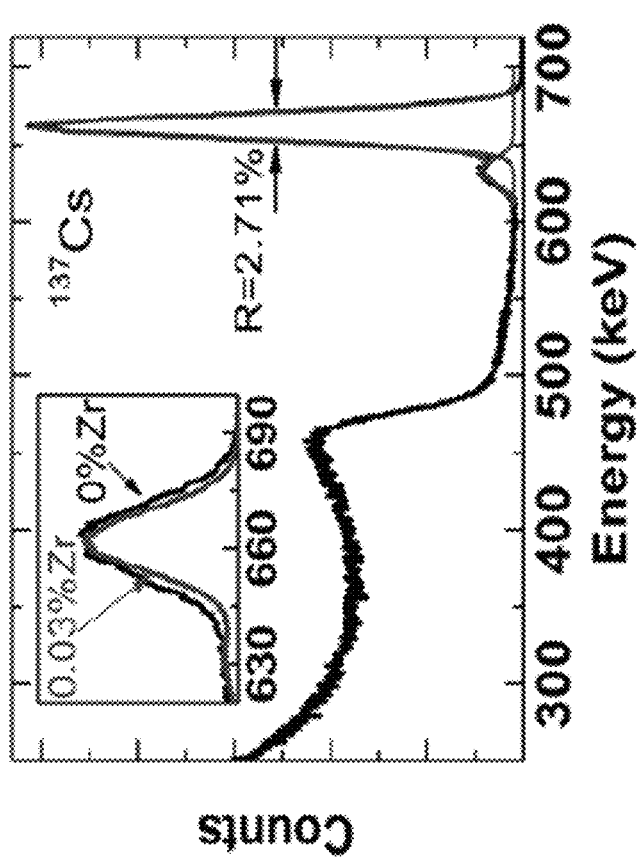
FIG. 16A is a graph showing the pulse height spectra of europium doped potassium calcium triiodide single crystals codoped with 0.03 mole percent (%) zirconium ($KCaI_3$:$Eu^{2+}$,0.03% $Zr^{4+}$) under irradiation from a cesium 137 source ($^{137}Cs$). Counts are provided in arbitrary units (arb. units). The energy resolution (ER) at 662 kiloelectronvolts (keV) is 2.71%. The inset graph shows the comparison between noncodoped and 0.03 mole % codoped samples.
Figure 17:
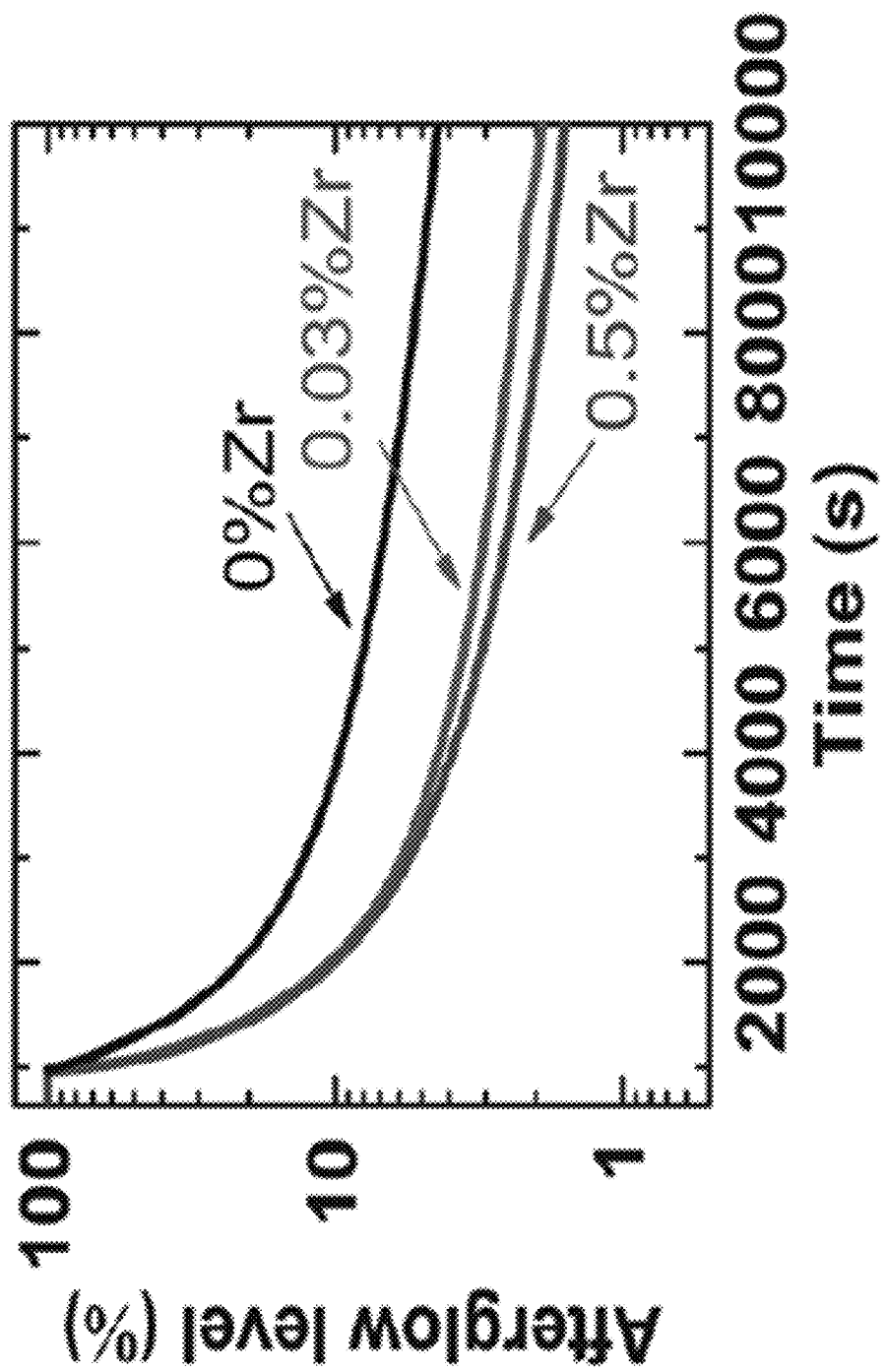
FIG. 17 is a graph showing the X-ray induced afterglow profiles (percent (%) afterglow level versus time in seconds (s)) of noncodoped europium doped potassium calcium triiodide ($KCaI_3$:$Eu^{2+}$) and zirconium ($Zr^{4+}$) codoped $KCaI_3$:$Eu^{2+}$ single crystals. The afterglow profile for a noncodoped crystal (0% Zr) is shown with the black line. The afterglow profile of a crystal codoped with 0.03 mole percent (mol %) zirconium (0.03% Zr) is shown with the upper dark grey line. The afterglow profile of a crystal codoped with 0.5 mol % zirconium (0.5% Zr) is shown with the lower dark grey line.

Pulse height spectra of KCaI$_3$:Eu$^{2+}$,0.03% Zr$^{4+}$ sample under $^{137}$Cs and $^{57}$Co irradiation acquired by Hamamatsu R6231-100 photomultiplier tube (PMT) (Hamamatsu Photonics, K.K., Hamamatsu City, Japan) are shown in FIGS. 16A and 16B. The noncodoped sample has an energy resolution of 6.5% at 122 keV and 3.25% at 662 keV. With 0.03 mol % Zr$^{4+}$ codoping, the energy resolutions at 122 keV and 662 keV can be improved to 5.73% and 2.71%, respectively. When further increasing the Zr$^{4+}$ codoping concentration to 0.5 mol %, the energy resolution worsens to 6.3% at 122 keV and 2.95% at 662 keV. Another beneficial effect of Zr$^{4+}$ codoping is afterglow suppression. As observed in FIG. 17, the rate of initial decay increases, and the residual afterglow signal after three hours decreases by more than two-folds in Zr$^{4+}$ codoped samples compared to that of the non-codoped sample.

Figure 18:
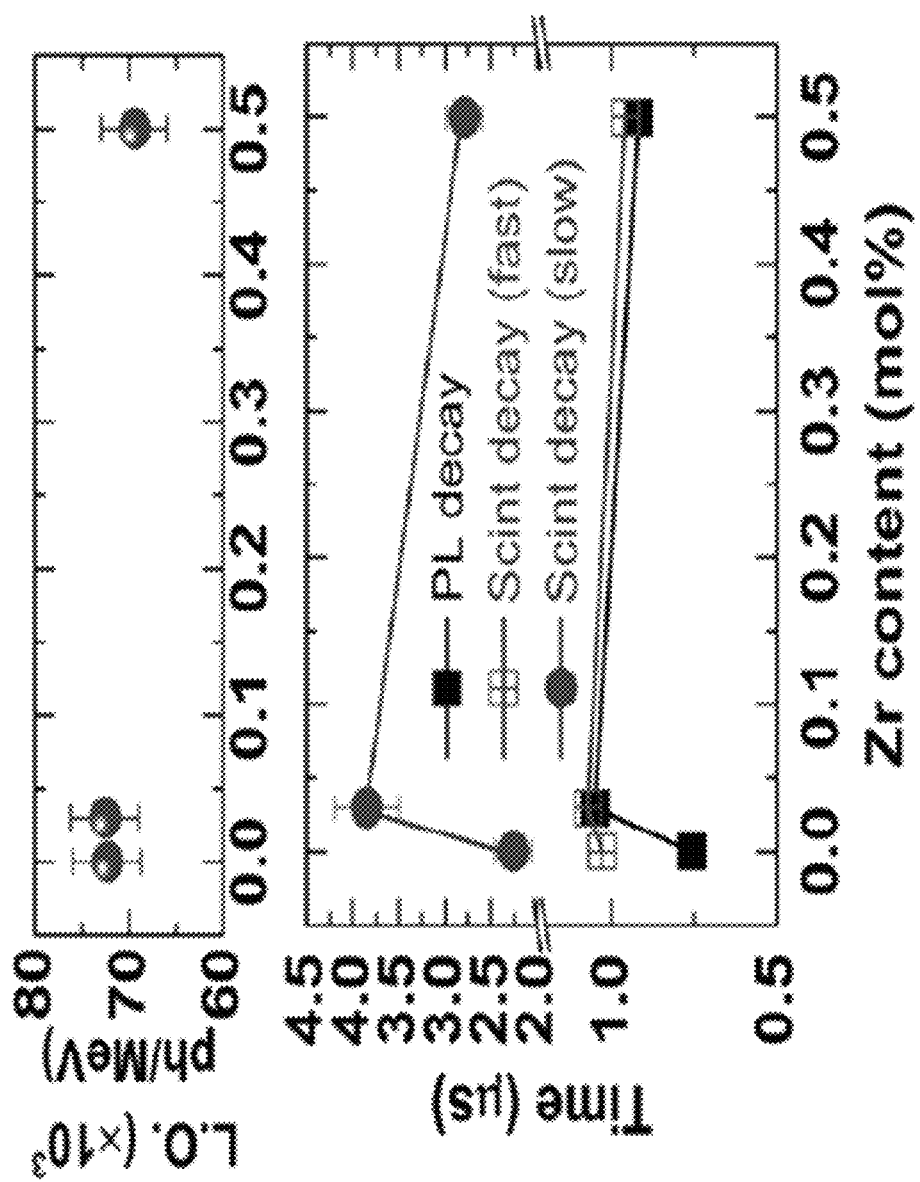
FIG. 18 is a pair of graphs showing (top) the absolute light yield (L.O., in kilophotons (kph) per megaelectronvolt (MeV) of zirconium codoped europium doped potassium calcium triiodide single crystals as a function of zirconium content (i.e., 0 mole percent (mol %), 0.03 mol %, or 0.5 mol %) and (bottom) the photoluminescence (PL) decay time (line with filled squares) and scintillation decay time of the zirconium codoped europium doped potassium calcium triiodide single crystals as a function of zirconium content (i.e., 0 mol %, 0.03 mol %, or 0.5 mol %). The fast scintillation decay curve (Scint decay (fast)) is shown in the line with unfilled squares, while the slow scintillation decay curve (Scint decay (slow)) is show with the line with filled circles. Time is expressed as microseconds (s).
Figure 20:
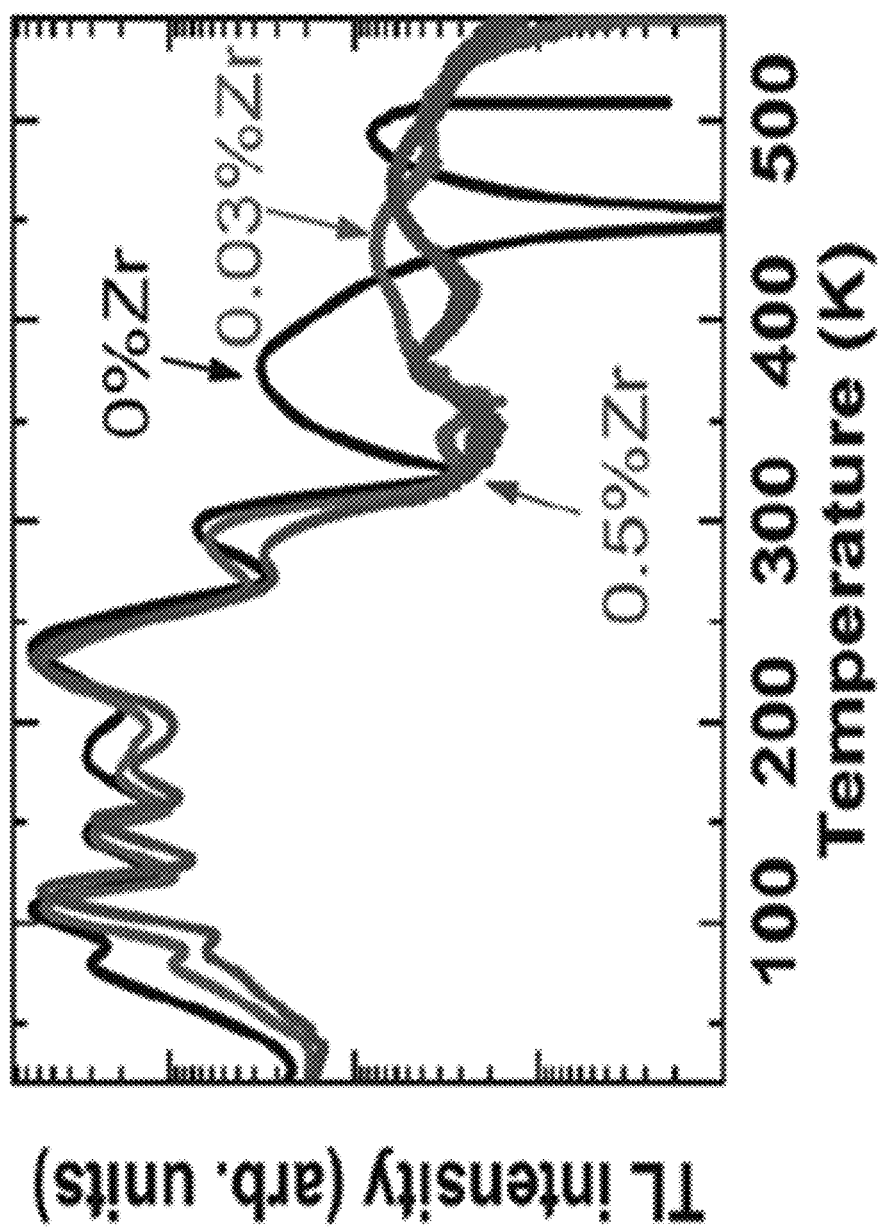
FIG. 20 is a graph showing the thermoluminescence (TL) glow curves (intensity (in arbitrary (arb.) units) versus temperature (in Kelvin (K)) of noncodoped europium doped potassium calcium triiodide ($KCaI_3:Eu^{2+}$) single crystals (0% Zr) and $KCaI_3:Eu^{2+}$ single crystals codoped with 0.03 mole percent (%) zirconium ions (0.03% Zr) or with 0.5 mole % zirconium ions (0.5% Zr).

The absolute light yield of KCaI$_3$:Eu$^{2+}$,Zr$^{4+}$ samples was estimated by using the single photoelectron method (see Moszynski et al., IEEE Trans. Nucl. Sci., 44, 1052 (1997)), and the data were plotted in FIG. 18. The 0.03 mol % and 0.5 mol % Zr$^{4+}$ codoped samples have almost the same light yield as the non-codoped sample, about 72,000±4000 photons/MeV. The measured PL and scintillation decay curves could be fit well by single exponential function and double exponential functions, respectively. The decay constants for all samples are presented in FIG. 18. The scintillation decay constants of non-codoped KCaI$_3$:Eu$^{2+}$ are 1.03 μs (88%) and 2.26 μs (12%), and its PL decay time is 0.76 μs. The PL and scintillation decay constants become longer in both the 0.03 mol % Zr$^{4+}$ and 0.5 mol % Zr$^{4+}$ codoped samples. Without being bound to any one theory, the prolonged decay time can be ascribed to the enhanced self-absorption effect because there is more overlapping between the optical absorption and the RL spectra of the Zr$^{4+}$ codoped samples. The difference between the scintillation fast component and the PL decay constant decreases from 270 ns for non-codoped sample to about 20 ns for Zr$^{4+}$ codoped samples. Again without being bound to any one theory, this seems to imply a more efficient migration of electrons to activator centers. This deduction is supported by the reduced intensity of the TL peaks below 100 K of the Zr$^{4+}$ codoped samples (see FIG. 20) because the partial reduction of corresponding shallow traps is able to suppress the electron trapping and detrapping processes, and then result in an accelerated decay time.

Because the light yield of the 5 mm$^3$ samples is over 70,000 photons/MeV, it is believed that the energy resolution of these samples can be mainly determined by the non-proportionality response. The contributions from the statistical variance in the number of photoelectrons produced in the PMT and the inhomogeneous light collection should be negligible. To evaluate the contribution of nPR, the measured channel number of the full energy peak at each gamma-ray energy was determined. The data points were then normalized to the response at 662 keV, and plotted in FIG. 21. For codoped samples, there is an enhancement of the "halide hump" but much less deviation from the ideal line at lower energies. Despite the difference, the calculated response deviation $\sigma_{nPR}$ (see Bizarri et al., IEEE Trans. Nucl. Sci., 58, 3403 (2011) is almost the same between the non-codoped and codoped samples, suggesting a limitation in predicting nPR solely by calculating $\sigma_{nPR}$.

Figure 21:
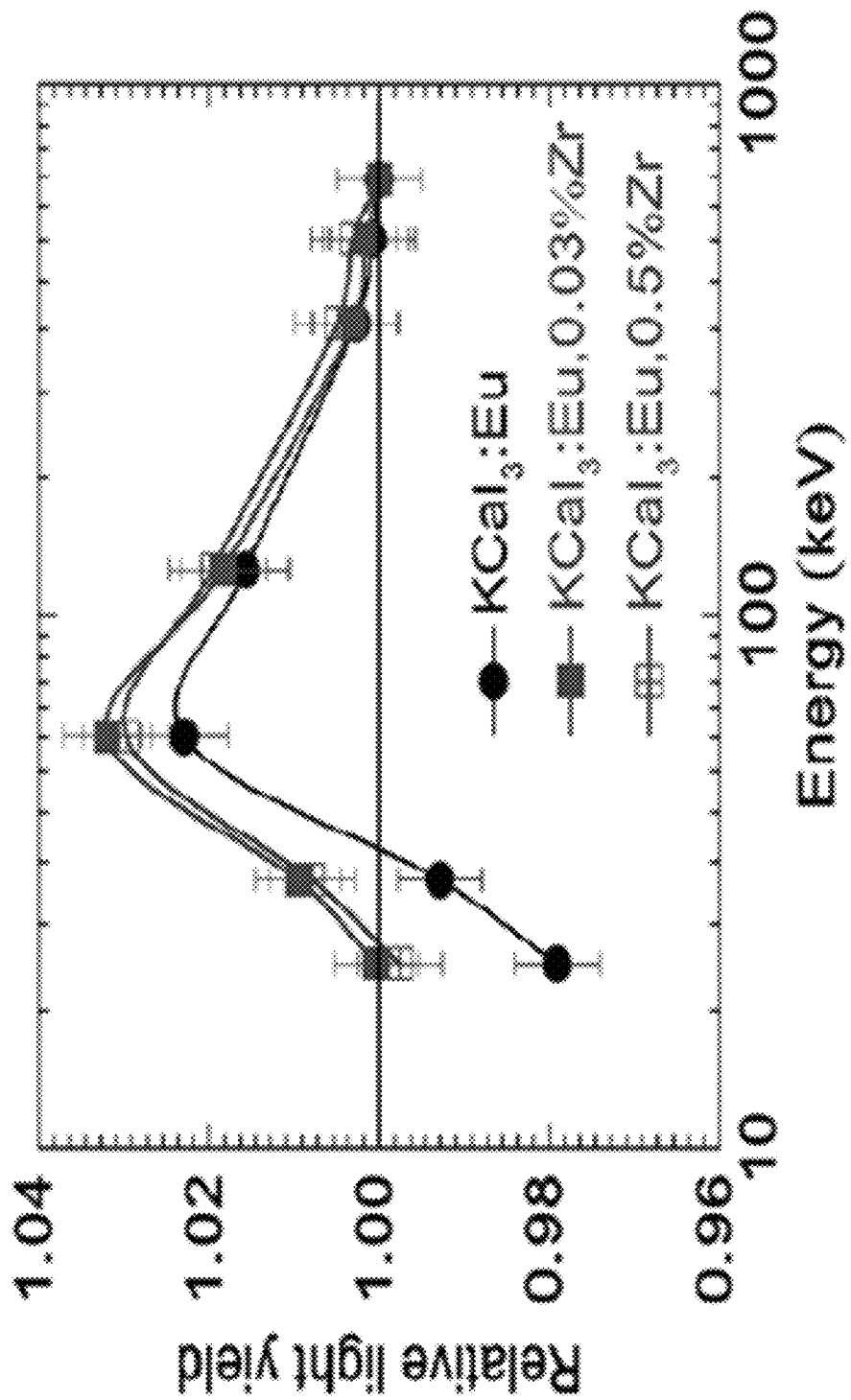
FIG. 21 is a graph showing the nonproportionality (nPr) curves (relative light yield versus energy (in kiloelectron-volts (keV)) of noncodoped europium doped potassium calcium triiodide ($KCaI_3:Eu^{2+}$) single crystals ($KCaI_3:Eu$, line with filled circles) and of $KCaI_3:Eu^{2+}$ single crystals codoped with 0.03 mole percent (%) zirconium ions ($KCaI_3:Eu,0.03\%\ Zr$, line with filed squares) or with 0.5 mole % zirconium ions ($KCaI_3:Eu,0.5\%\ Zr$, line with unfilled squares).

As described above, TL analysis and DFT calculations indicate that the room temperature afterglow of $KCaI_3:Eu^{2+}$ originates from iodine vacancies acting as deep electron traps with a depth of ~1.0 eV below the conduction band minimum. The corresponding TL peaks are located between 300 and 450 K. See Åberq et al., Appl. Phys. Lett., 104, 211908 (2014). In FIG. 21, for $Zr^{4+}$ codoped samples, TL intensity corresponding to the iodine vacancy defects decreases by about one order of magnitude in comparison to that of non-codoped sample. This is in good agreement with the reduced afterglow phenomenon observed.

To provide in-depth physical insight into the effect of $Zr^{4+}$ codoping on the defect structures, planewave-based DFT calculations were performed on the $Zr^{4+}$ related defects in a simulated crystal, using calculation methods previously described. See Example 3 and Wu et al., Phys. Rev., Appl., 8, 034011(2017). The analysis of intrinsic defects and quantitative modelling of the defect concentration under thermodynamic equilibrium is also described in Åberq et al. (Appl. Phys. Lett., 104, 211908 (2014). Based on the calculations, the codoped $Zr^{4+}$ ions seem to prefer to form interstitials rather than substitutions, similar to the case of $Sc^{3+}$ cooping. Without being bound to any one theory, it is believed that the formation of $Zr_i$ as an efficient donor shifts the electron fermi energy toward the conduction band minimum (CBM), and hence suppresses the formation of other electron traps like iodine vacancies. Primarily formed $Zr_i$ interstitial is a shallow electron trap, which has a fast electron detrapping rate. Thus, $Zr_i$ itself does not induce afterglow at room temperature.

In conclusion, high quality $Zr^{4+}$ codoped $KCaI_3:Eu^{2+}$ single crystals were grown by the Bridgman method. A two-fold plus reduction of afterglow level was achieved by $Zr^{4+}$ codoping. Without being bound to any one theory, the afterglow suppression observed is believed to be because: i) the donor-like $Zr_i$ will shift the Fermi level of the system toward the CBM, which reduces the concentration of other electron traps such as $V_I$ vacancies; and ii) the primarily formed $Zr_i$ interstitials are shallow electron traps, and hence would not contribute to afterglow at room temperature. Also, it is found that $Zr^{4+}$ codoping can significantly improve the energy resolution without light yield deterioration. Without being bound to any one theory, tt appears that the improved energy resolution is related to a strong reduction of scintillation light yield loss.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An optical material comprising a composition of Formula (I):

$$[(A_{1-x}M_x)(B_{1-y}M'_y)]_{1-z}D_zX_3 \quad (I),$$

wherein:
0≤x≤0.1 and 0≤y≤0.1, subject to the proviso that at least one of x and y is at least 0.0001;
0.0001≤z≤0.1;

A is Li, Na, K, Rb, Cs, or any combination thereof;
B is Be, Mg, Ca, Sr, Ba, or any combination thereof;
M is In, Tl, or a combination thereof;
M' is Ce, Pr, Nd, Sm, Eu, Gd, Tb, Yb, Bi, Sb, or any combination thereof;
D is at least one type of monovalent, divalent, trivalent, or tetravalent cation; and
X is F, Cl, Br, I, or any combination thereof.

2. The optical material of claim 1, wherein 0.0001≤z≤0.005.

3. The optical material of claim 1, wherein D is a trivalent cation or mixture thereof.

4. The optical material of claim 1, wherein D is selected from the group consisting of Mg, Sc, Y, Gd, La, Zr, and combinations thereof.

5. The optical material of claim 1, wherein the optical material comprises a composition of Formula (II):

$$(AB_{1-y}M'_y)_{1-z}D_zX_3 \quad (II),$$

wherein:
0.0001≤y≤0.1;
0.0001≤z≤0.1;
A is Li, Na, K, Rb, Cs, or any combination thereof;
B is Be, Mg, Ca, Sr, Ba, or any combination thereof;
M' is Ce, Pr, Nd, Sm, Eu, Gd, Tb, Yb, Bi, Sb, or any combination thereof;
D is at least one type of monovalent, divalent, trivalent, or tetravalent cation; and
X is F, Cl, Br, I or any combination thereof.

6. The optical material of claim 5, wherein 0.01≤y≤0.05.
7. The optical material of claim 5, wherein 0.001≤z≤0.005.
8. The optical material of claim 5, wherein A is K.
9. The optical material of claim 5, wherein B is Ca, Sr, or a combination thereof.
10. The optical material of claim 5, wherein M' is Eu.
11. The optical material of claim 5, wherein y is 0.03.
12. The optical material of claim 5, wherein D is a trivalent cation or a combination thereof.
13. The optical material of claim 5, wherein D is Mg, Sc, Y, Gd, La, Zr, or a combination thereof.
14. The optical material of claim 13, wherein D is Sc.
15. The optical material of claim 13, wherein D is Mg or Zr.
16. The optical material of claim 5, wherein X is I.
17. The optical material of claim 1, wherein the optical material comprises a composition of Formula (III):

$$(KCa_{1-y}Eu_y)_{1-z}D_zX_3 \quad (III),$$

wherein:
0.01≤y≤0.1;
0.0001≤z≤0.005;
D is Mg, Zr, one or more trivalent cations, or a combination thereof; and
X is Cl, Br, I or any combination thereof.

18. The optical material of claim 17, wherein y is 0.03.
19. The optical material of claim 17, wherein 0.001≤z≤0.005.
20. The optical material of claim 17, wherein X is I.
21. The optical material of claim 17, wherein D is Mg, Sc, Y, Gd, La, Zr, or any combination thereof.
22. The optical material of claim 21, wherein D is Sc, Zr, or Mg.

23. The optical material of claim 1, wherein the optical material has reduced afterglow compared to an optical material where D is absent.

24. The optical material of claim 1, wherein the optical material has increased afterglow compared to an optical material where D is absent.

25. The optical material of claim 1, wherein the optical material is a single crystal material.

26. A radiation detector comprising a photon detector and an optical material of claim 1.

27. The radiation detector of claim 26, wherein the detector is a medical diagnostic device, a device for oil exploration, or a device for container or baggage scanning.

28. A method of detecting gamma rays, X-rays, cosmic rays and/or particles having an energy of 1 keV or greater, the method comprising using the radiation detector of claim 26.

29. A method of preparing an optical material of claim 1, wherein the method comprises heating a mixture of raw materials above their respective melting temperatures.

30. The method of claim 29, wherein the method comprises:

(a) providing a mixture of raw materials, wherein the raw materials are provided in a stoichiometric ratio according to Formula (I):

$$[(A_{1-x}M_x)(B_{1-y}M'_y)]_{1-z}D_zX_3 \qquad (I),$$

wherein:
  $0 \leq x \leq 0.1$ and $0 \leq y \leq 0.1$, subject to the proviso that at least one of x and y is at least 0.0001;
  $0.0001 \leq z \leq 0.1$;
  A is Li, Na, K, Rb, Cs, or any combination thereof;
  B is Be, Mg, Ca, Sr, Ba, or any combination thereof;
  M is In, Tl, or a combination thereof;
  M' is Ce, Pr, Nd, Sm, Eu, Gd, Tb, Yb, Bi, Sb, or any combination thereof;
  D is at least one type of monovalent, divalent, trivalent, or tetravalent cation; and
  X is F, Cl, Br, I, or any combination thereof;

(b) sealing the mixture in a sealed container;
(c) heating the mixture to about 20° C. above the melting point of the raw material having the highest melting point for a period of time;
(d) cooling the mixture to about room temperature; and
(e) optionally repeating steps (c) and (d).

* * * * *